(12) United States Patent
Shibayama

(10) Patent No.: US 7,158,315 B2
(45) Date of Patent: Jan. 2, 2007

(54) ZOOM LENS SYSTEM

(75) Inventor: Atsushi Shibayama, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/091,652

(22) Filed: Mar. 29, 2005

(65) Prior Publication Data

US 2005/0219708 A1  Oct. 6, 2005

(30) Foreign Application Priority Data

| Mar. 30, 2004 | (JP) | ............................. 2004-099773 |
| Mar. 31, 2004 | (JP) | ............................. 2004-105319 |
| Feb. 14, 2005 | (JP) | ............................. 2005-036624 |
| Feb. 14, 2005 | (JP) | ............................. 2005-036633 |

(51) Int. Cl.
*G02B 15/14* (2006.01)

(52) U.S. Cl. ..................... 359/690; 359/684; 359/686

(58) Field of Classification Search ............... 359/684, 359/686, 690
See application file for complete search history.

(56) References Cited

U.S. PATENT DOCUMENTS

| 5,448,412 A | 9/1995 | Maruyama et al. |
| 5,841,588 A | 11/1998 | Suzuki et al. |
| 6,124,972 A | 9/2000 | Hayakawa et al. |
| 6,373,639 B1 | 4/2002 | Hayakawa et al. |
| 6,563,643 B1 | 5/2003 | Hayakawa et al. |
| 6,646,803 B1 | 11/2003 | Hayakawa et al. |
| 6,778,329 B1* | 8/2004 | Ozaki .......................... 359/684 |

FOREIGN PATENT DOCUMENTS

| JP | 6-27373 A | 2/1994 |
| JP | 6-51202 A | 2/1994 |
| JP | 8-62541 A | 3/1996 |
| JP | 10-133114 A | 5/1998 |
| JP | 2000-019398 A | 1/2000 |
| JP | 2000-284174 A | 10/2000 |

\* cited by examiner

*Primary Examiner*—Jordan Schwartz
*Assistant Examiner*—William Choi
(74) *Attorney, Agent, or Firm*—Miles & Stockbridge P.C.

(57) ABSTRACT

Object is to provide an inner-focusing type zoom lens system carrying out focusing by moving a portion of a first lens group suitable for an auto-focus SLR camera. A zoom lens system includes, in order from an object, a first lens group having positive refractive power, a second lens group having negative refractive power, and a third lens group having positive refractive power. Upon zooming from a wide-angle end state to a telephoto end state, a distance between the first and the second lens groups increases, and a distance between the second and the third lens groups decreases. The first lens group is composed of, in order from the object, a 1A lens group G1A having positive refractive power, and a 1B lens group G1B having positive refractive power. Focusing from infinity to a close-range object is carried out by moving only the 1B lens group G1B to the object.

13 Claims, 64 Drawing Sheets

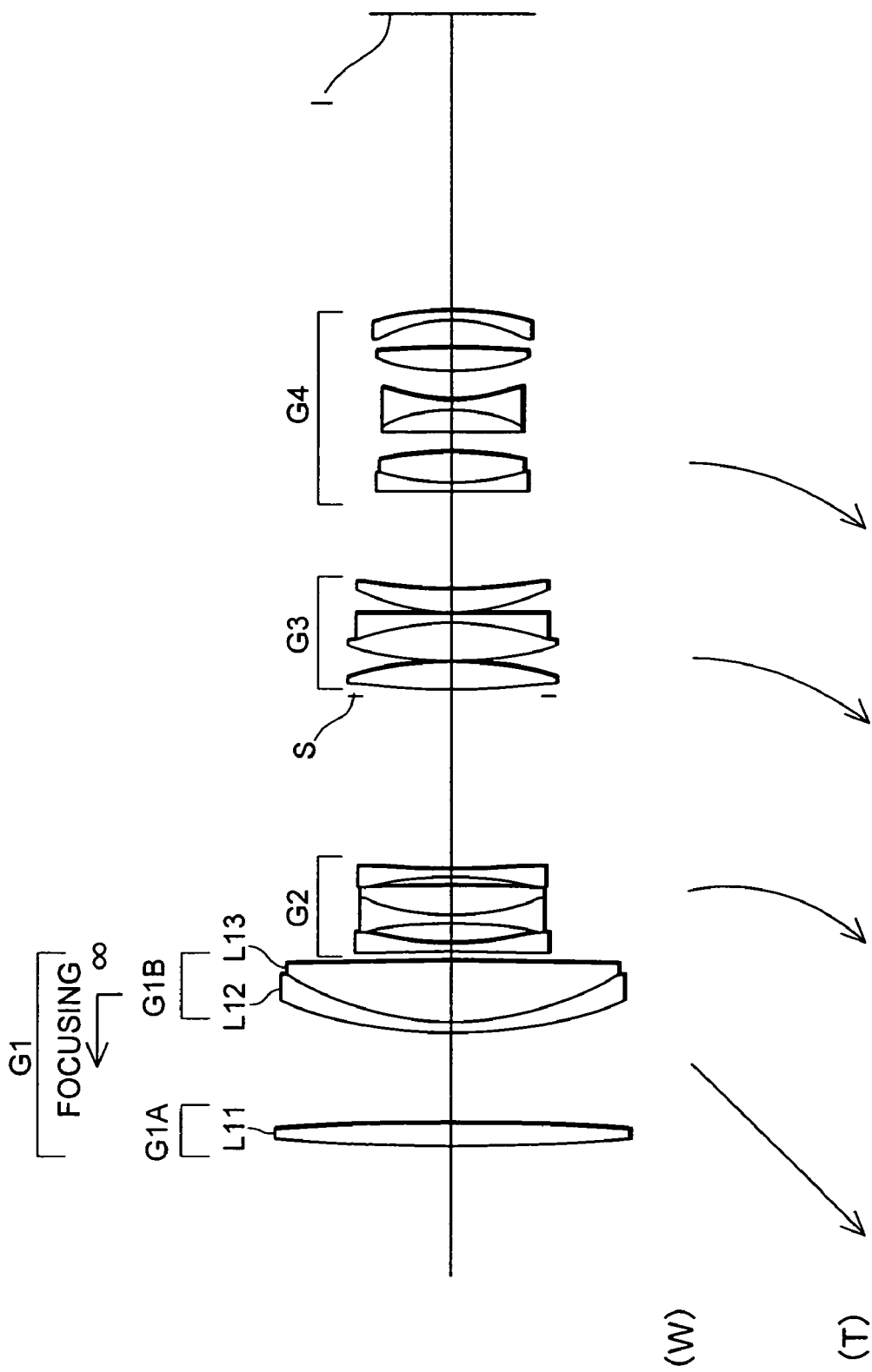

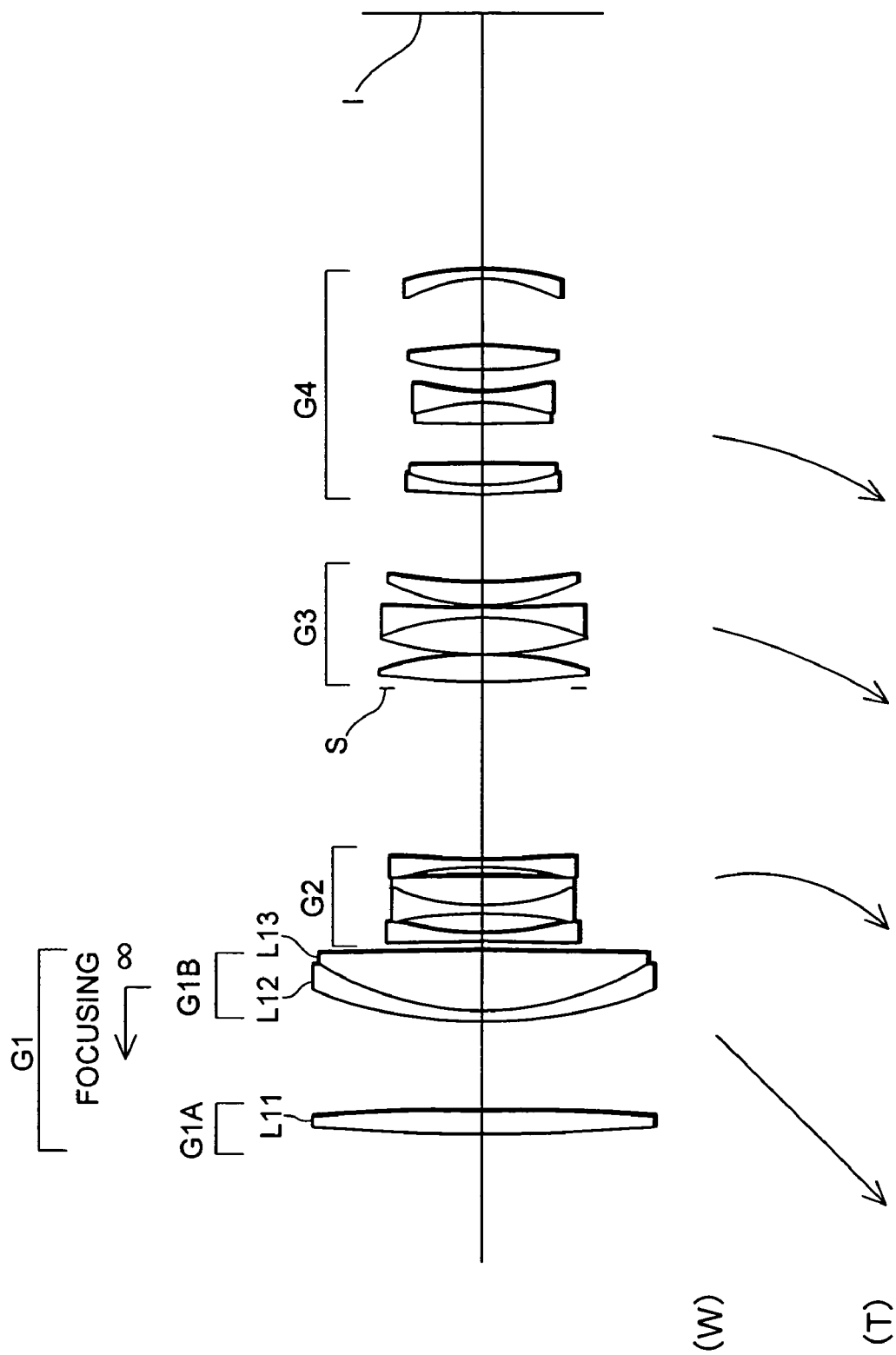

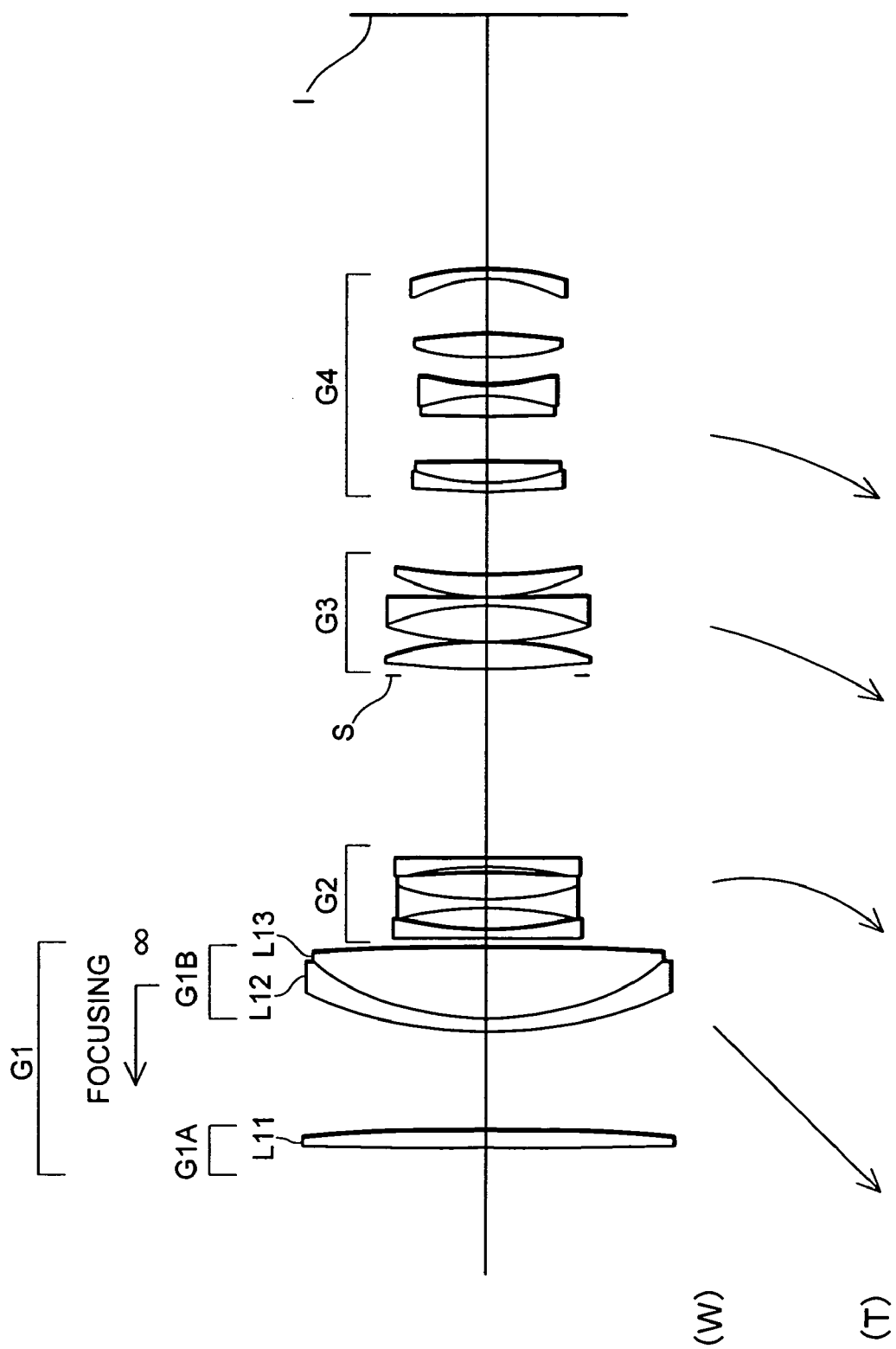

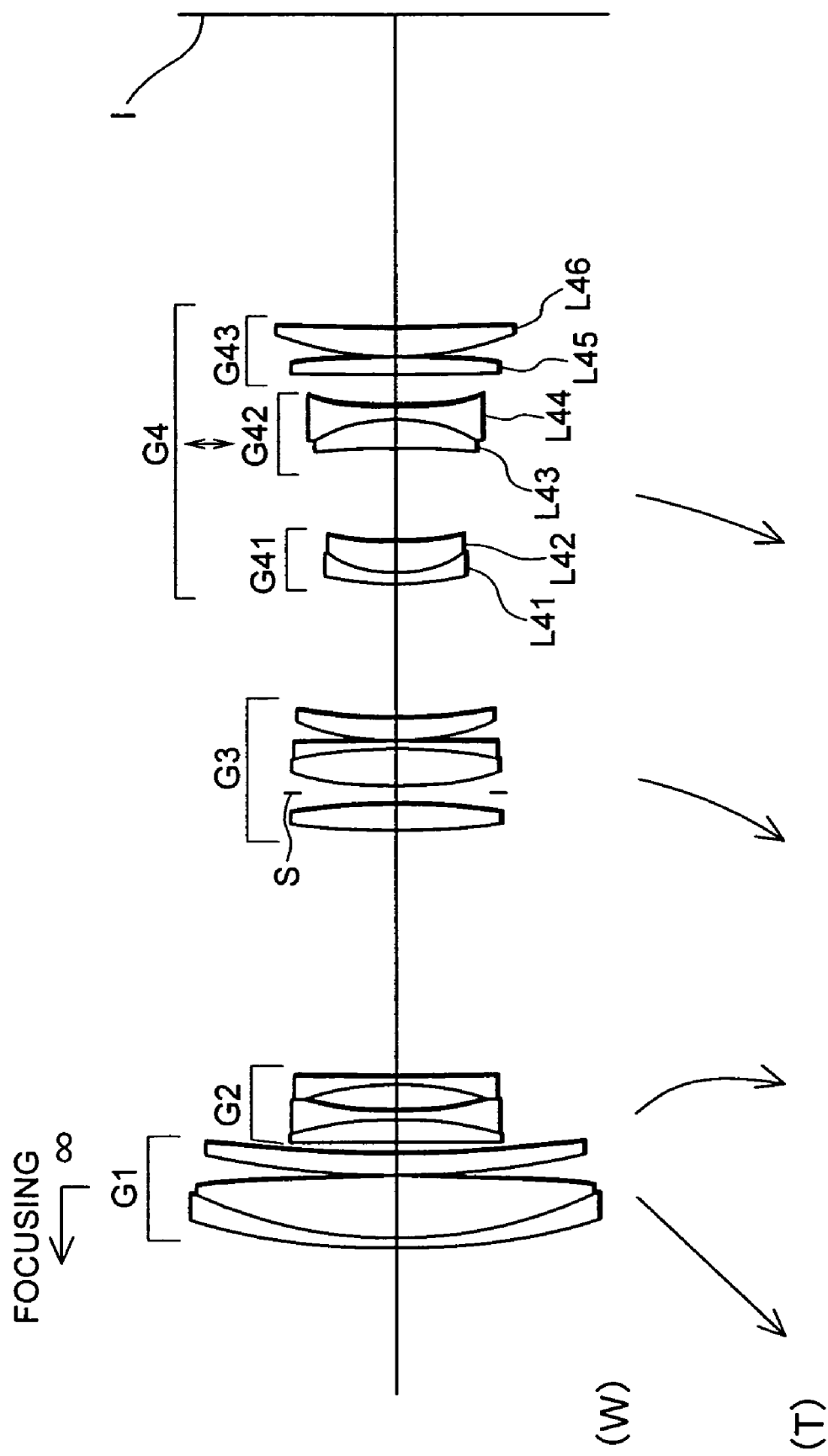

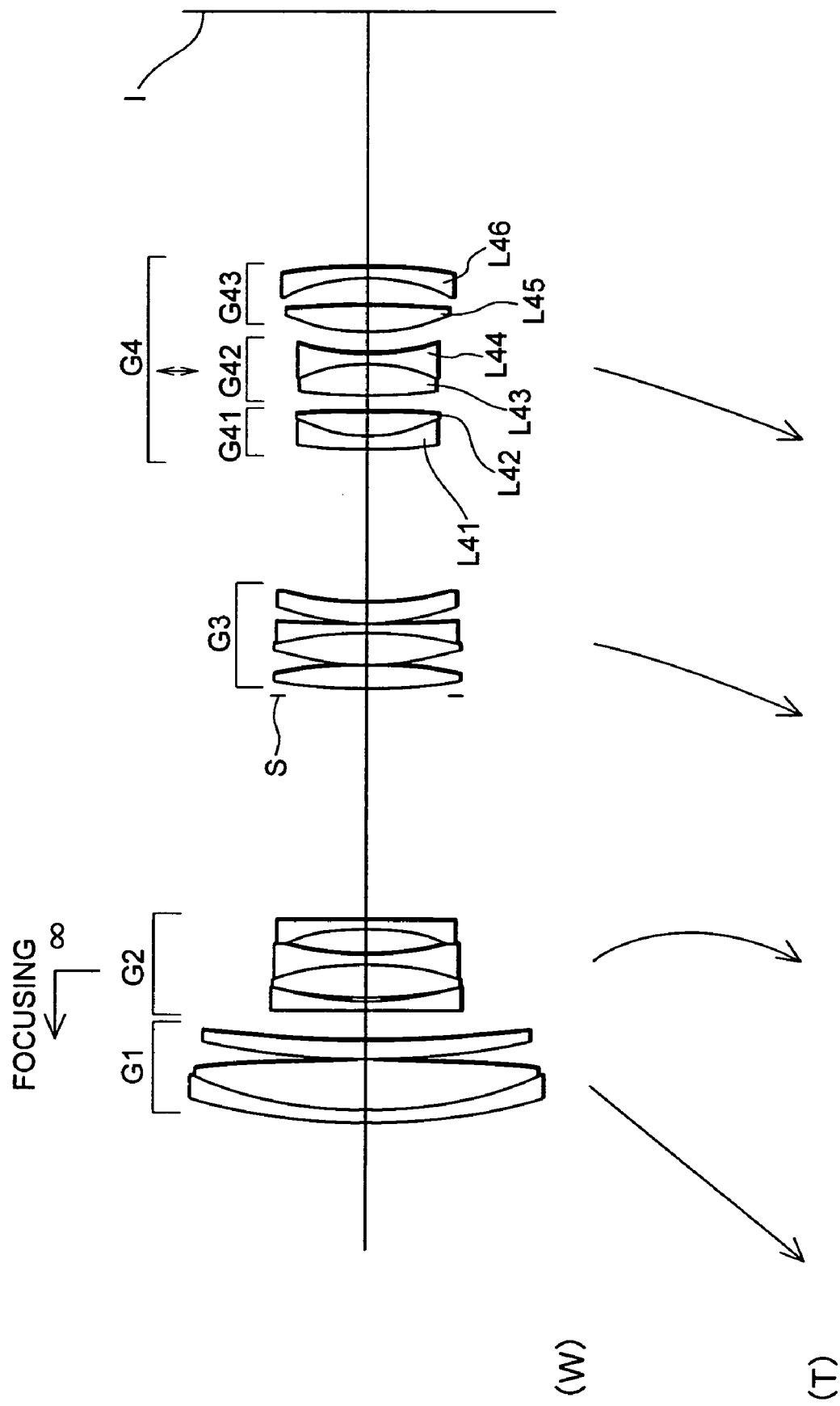

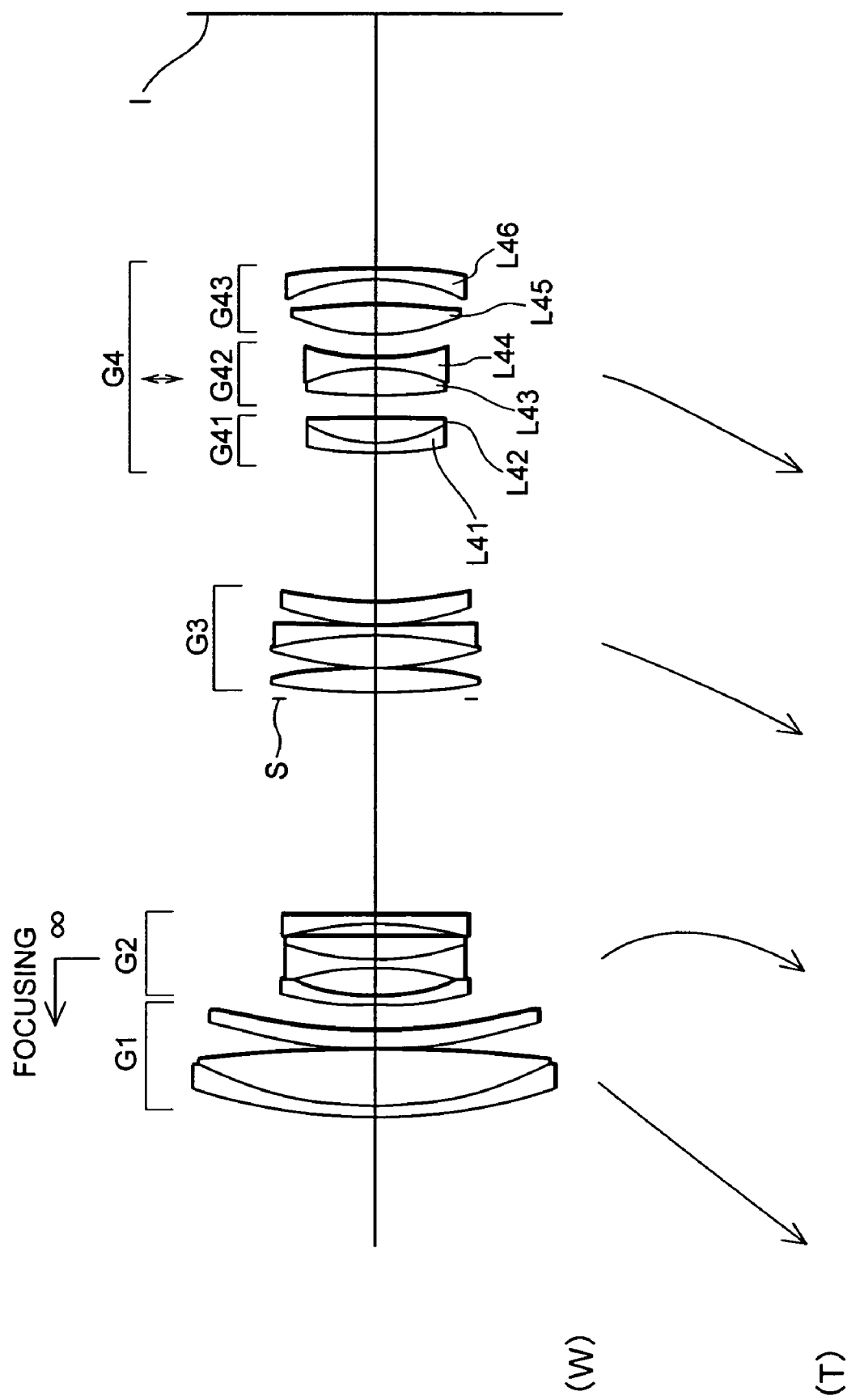

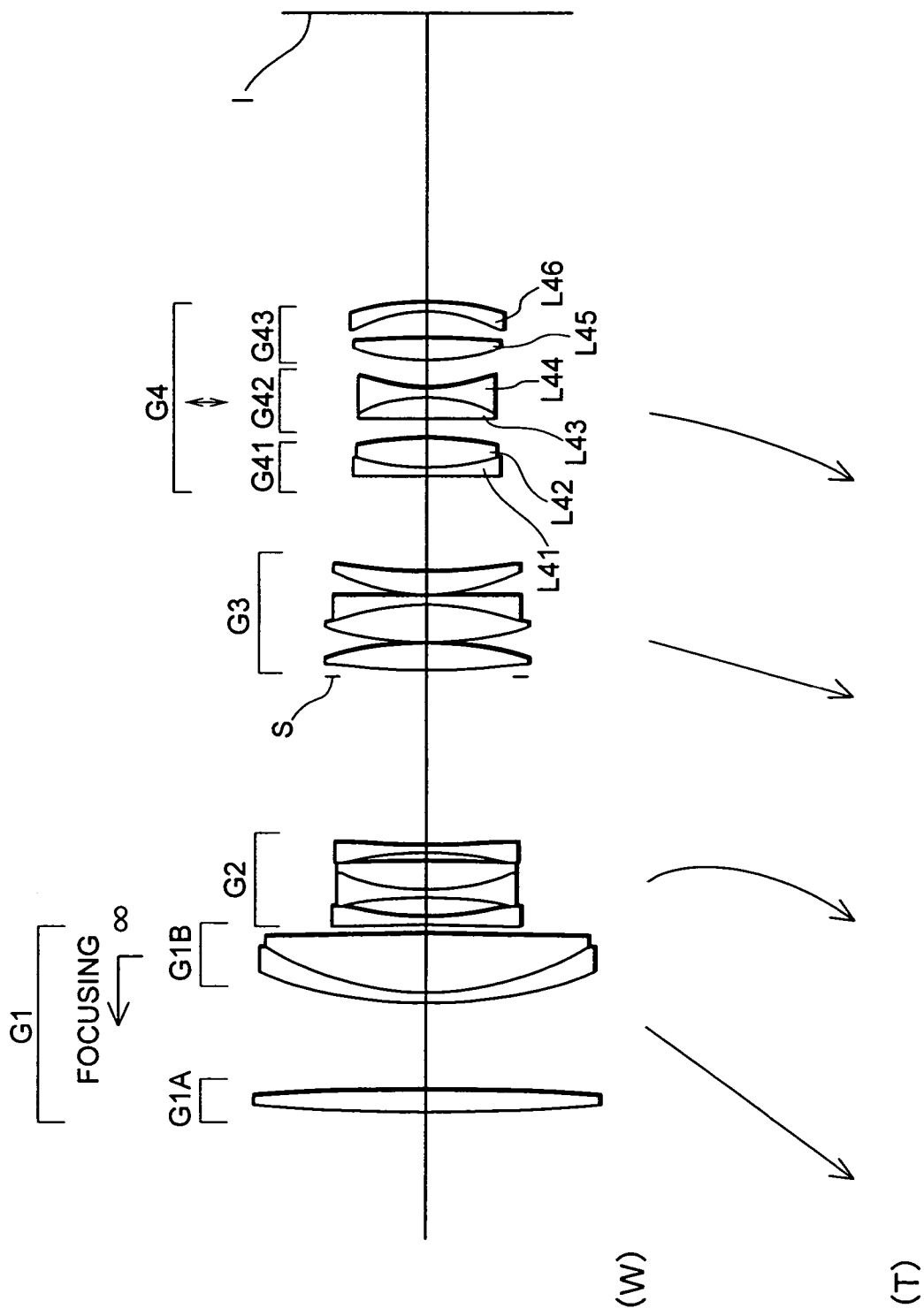

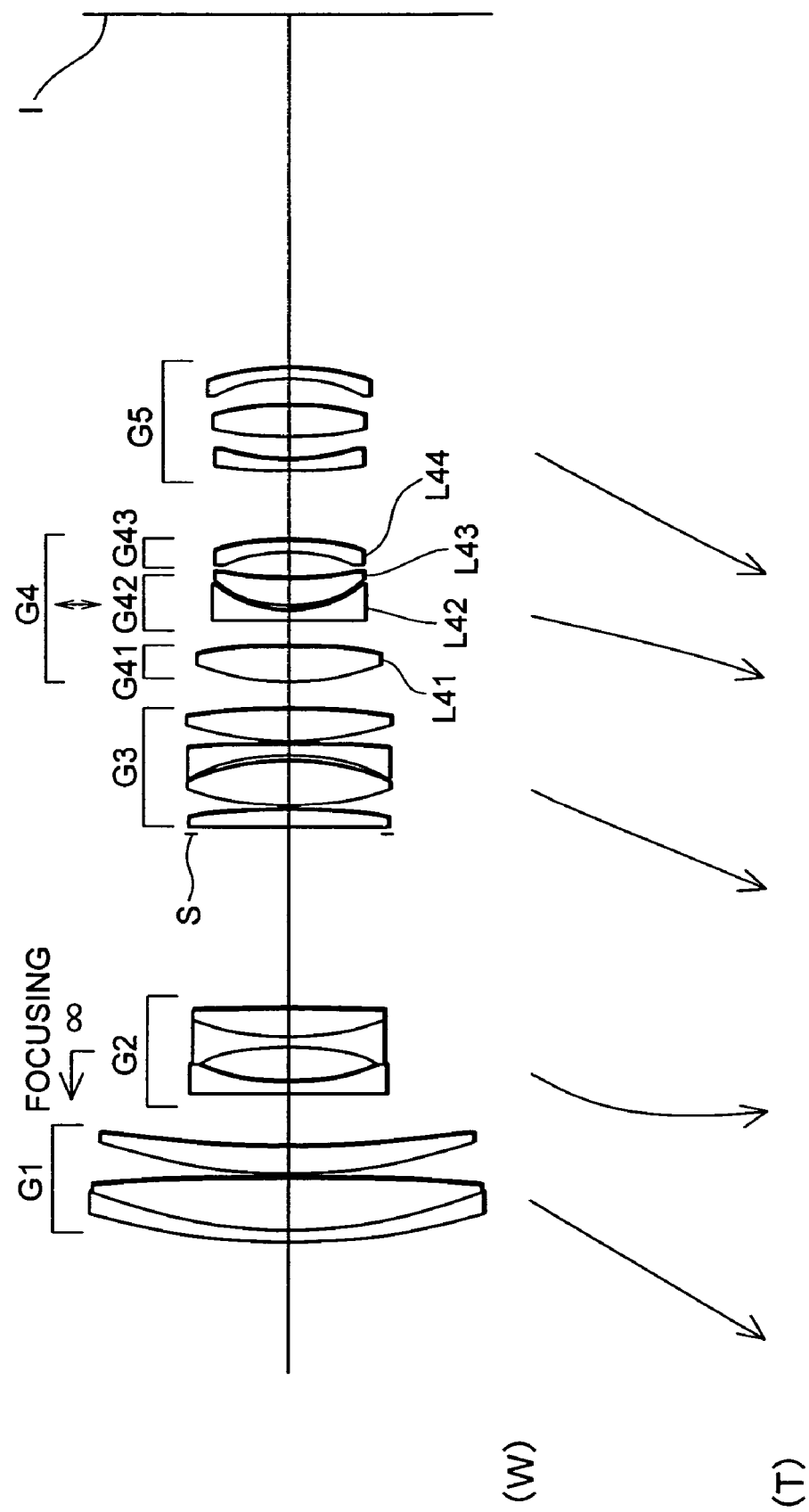

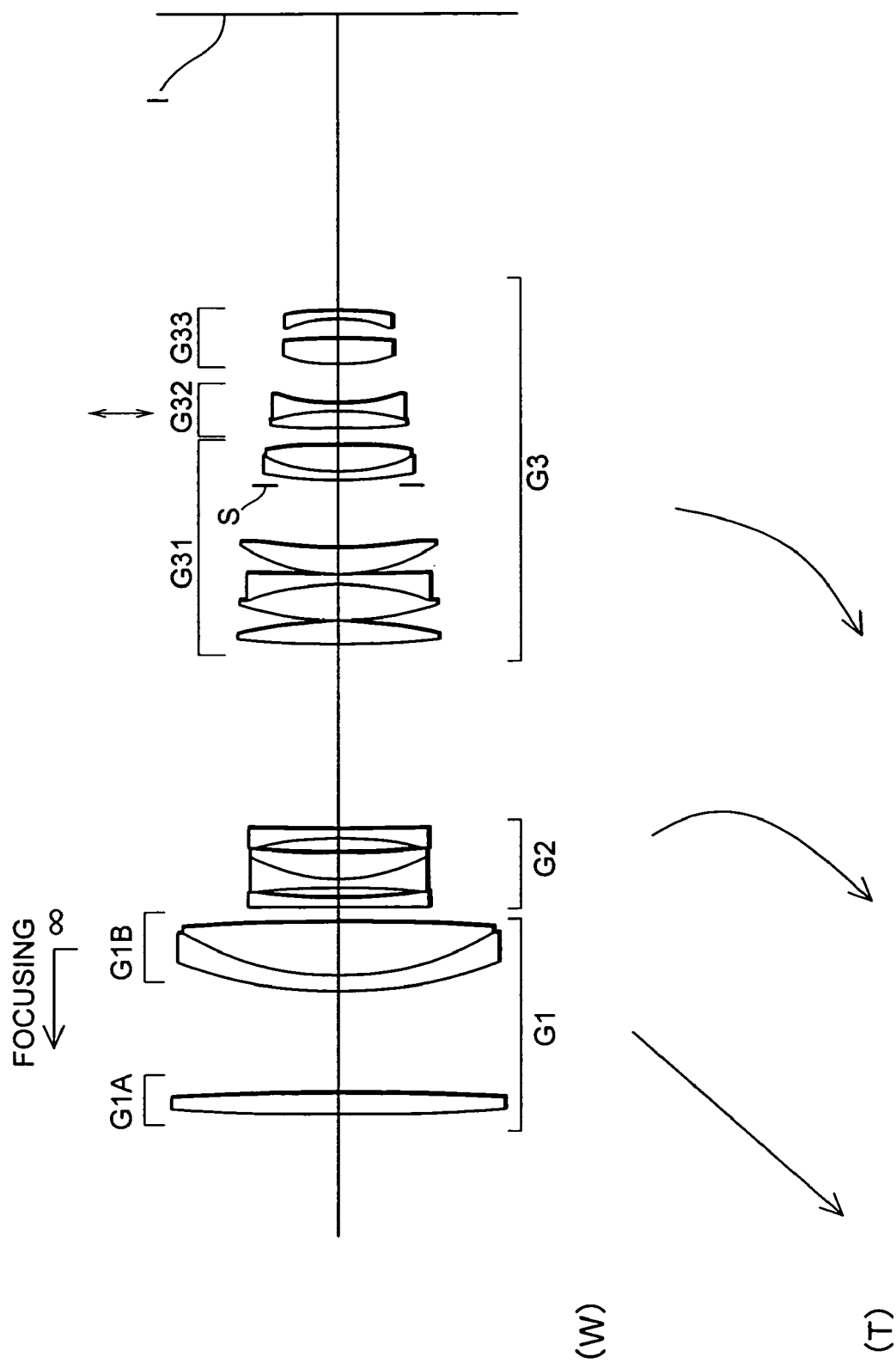

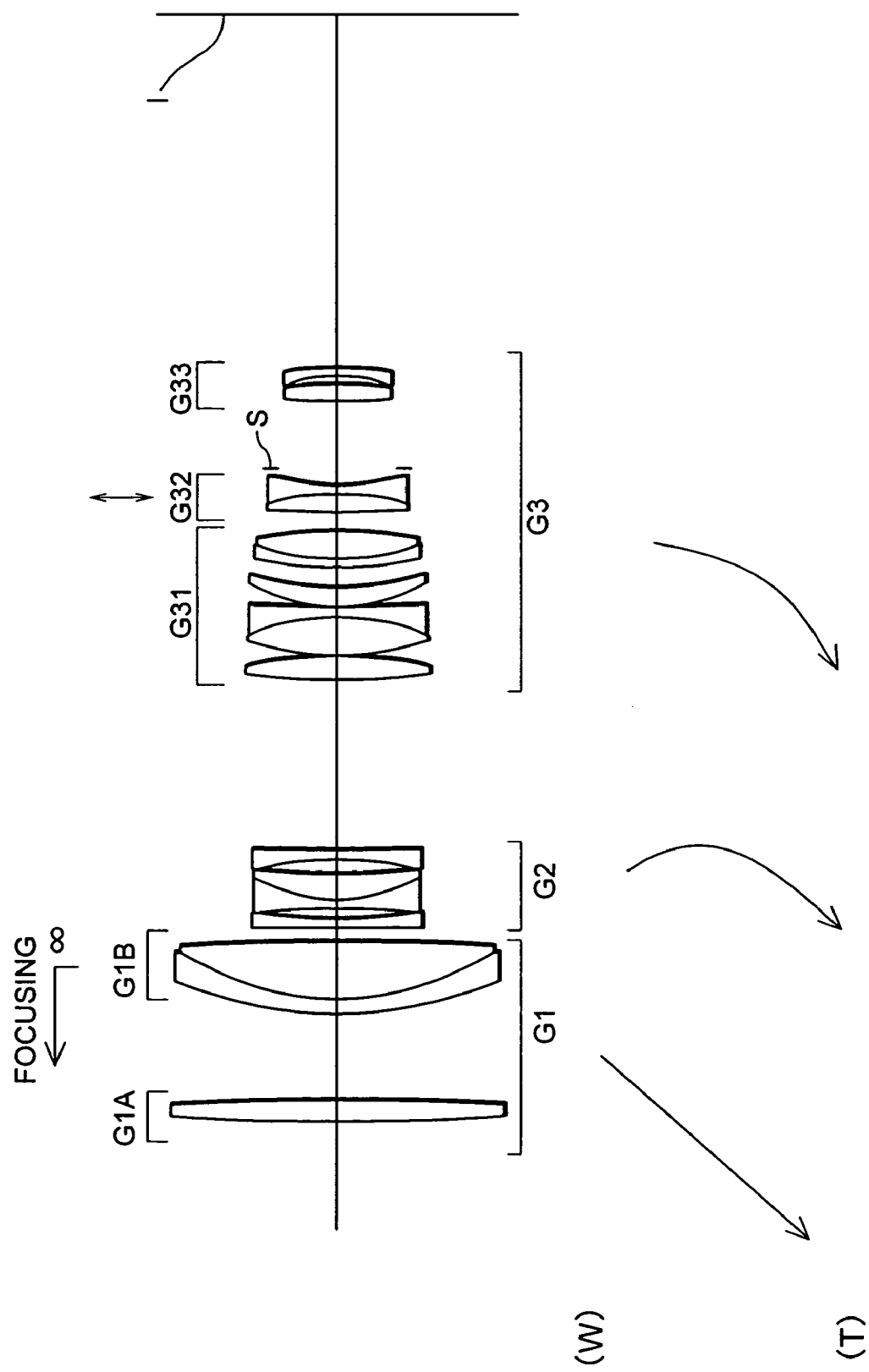

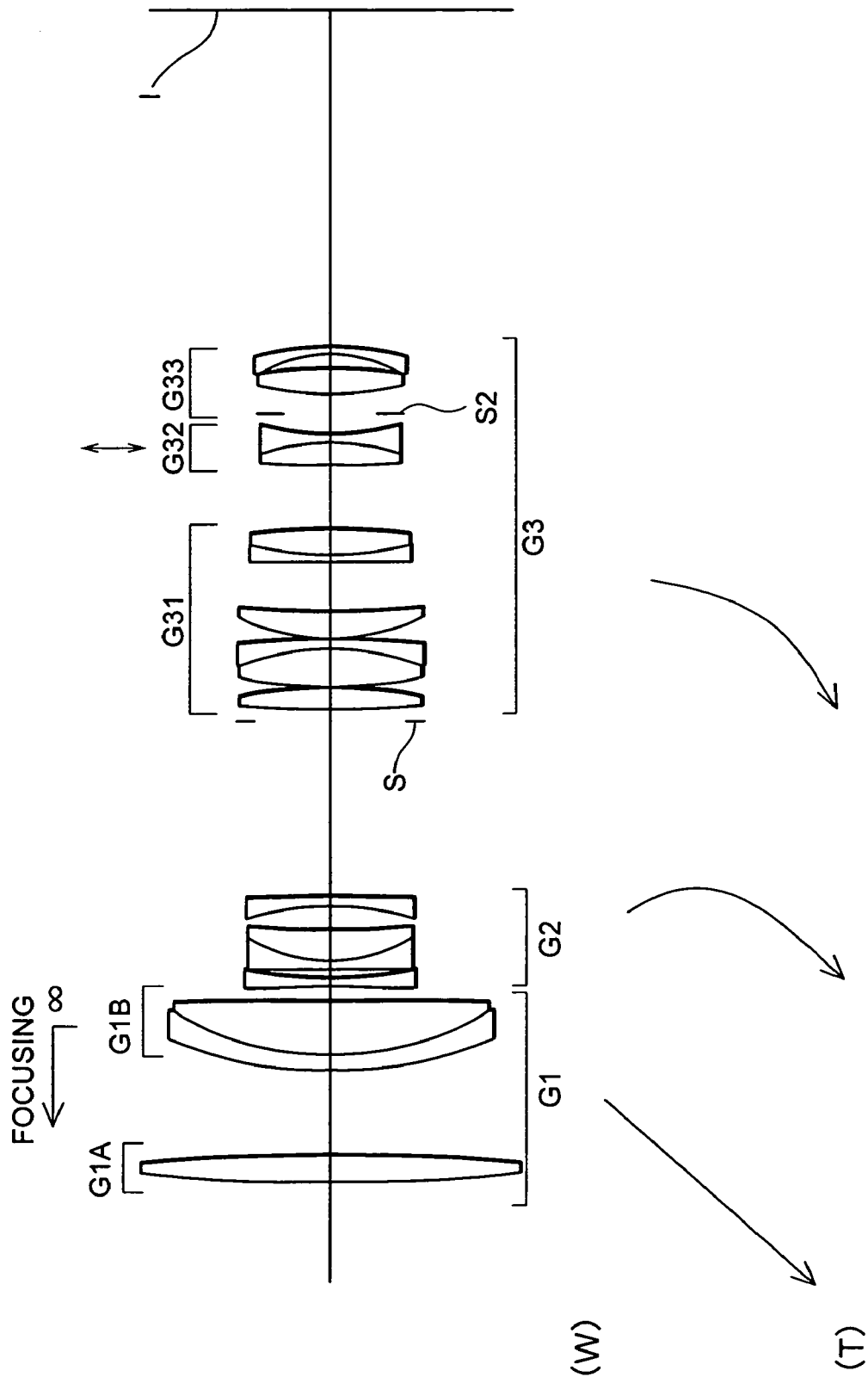

ZOOM LENS SYSTEM

The disclosure of the following priority applications are herein incorporated by reference:

Japanese Patent Application No. 2004-099773 filed on Mar. 30, 2004,

Japanese Patent Application No. 2004-105319 filed on Mar. 31, 2004,

Japanese Patent Application No. 2005-036624 filed on Feb. 14, 2005 and

Japanese Patent Application No. 2005-036633 filed on Feb. 14, 2005.

BACKGROUND OF THE INVENTION

1. Field of the Invention

The present invention relates to a zoom lens system suitable for a single-lens-reflex (SLR) camera using a silver-halide film or a solid-state imaging device and in particular to an internal-focusing zoom lens system capable of focusing by moving a portion of the optical system in a first lens group and also in particular to a compact zoom lens system having a vibration reduction function with a zoom ratio of about four and an angle of view of about 22° or more in a wide-angle end state.

2. Related Background Art

As a conventional focusing method for a zoom lens, a front-lens-group focusing carrying out by moving the most object side lens group to the object has been generally known. This method has a merit that the moving amount for focusing is determined in accordance with the object distance regardless of the zooming position, so that it is effective for simplifying the focusing mechanism. This method makes it possible to construct a first lens group with about three lens elements, so that it is effective for simplifying the construction of the lens system and lowering the manufacturing cost. However, since the moving lens group for focusing is exposed outside, when unexpected force is applied to the lens system, the focusing mechanism, in particular an auto-focusing mechanism, may be damaged. On the other hand, zoom lens systems with an internal focusing method, in which focusing is carried out by a lens group other than the first lens group, have been proposed in large numbers. However, it also has a problem that the moving amount for focusing largely varies in accordance with the zoom position.

In order to solve the problems, a focusing method, in which the first lens group is composed of a front lens group having positive refractive power and a rear lens group having positive refractive power and focusing is carried out by moving the rear lens group to the object, has been proposed in Japanese Patent Application Laid-Open Nos. 6-51202, 2000-19398, and 2000-284174.

However, although each example disclosed by Japanese Patent Application Laid-Open No. 6-51202 constructing the first lens group by three lens elements as a whole, two lens elements in the front lens group and one lens element in the rear lens group, is suitable for simplifying the construction and lowering the manufacturing cost, since focusing is carried out by moving only a single lens element with positive refractive power, spherical aberration, on-axis chromatic aberration and lateral chromatic aberration becomes large upon focusing a close-range object, so that it is undesirable for obtaining high optical performance.

Moreover, each example disclosed by Japanese Patent Application Laid-Open No. 2000-19398 requires five lens elements in the first lens group, three lens elements in the front lens group and two lens elements in the rear lens group, so that it is not suitable for simplifying the construction or lowering the manufacturing cost.

Furthermore, each example disclosed by Japanese Patent Application Laid-Open No. 2000-284174 requires four lens elements in the first lens group, one lens element in the front lens group and three lens elements in the rear lens group, so that it is not suitable for simplifying the construction or lowering the manufacturing cost.

Moreover, telephoto zoom lenses with a vibration reduction mechanism having a zoom ratio of about four have been proposed in Japanese Patent Application Laid-Open Nos. 8-62541 and 10-133114.

Examples disclosed in Japanese Patent Application Laid-Open No. 8-62541 are a five-group zoom lens with positive-negative-positeve-positeve-negative power arrangement or a six-group zoom lens with positive-negative-positive-negative-positive-negative power arrangement moving the second lens group having negative refractive power for vibration reduction. However, in these disclosures, since the effective diameter of the second lens group is 25 mm or more, the vibration reduction mechanism becomes large, so that it becomes difficult to make the zoom lens system be compact.

Examples disclosed in Japanese Patent Application Laid-Open No. 10-133114 are a five-group zoom lens with positive-negative-negateve-positeve-negative power arrangement moving a portion of lens group in the fourth lens group having positive refractive power for vibration reduction. However, in these disclosures, since the effective diameter of the vibration reduction lens group in the fourth lens group is 25 mm or more, the vibration reduction mechanism becomes large, so that it becomes difficult to make the zoom lens system be compact.

SUMMARY OF THE INVENTION

The present invention is made in view of the aforementioned problems and has an object to provide an internal focusing zoom lens system suitable for an auto focus SLR camera using a silver-halide film or a solid-state imaging device, carrying out focusing by moving a portion of a first lens group, having a zoom ratio of about four and an angle of view of 22° or more in the wide-angle end state, and suitable for simplifying the lens construction of the first lens group and lowering manufacturing cost without compromising compactness or high optical performance.

According to one aspect of the present invention, a zoom lens system includes, in order from an object, a first lens group having positive refractive power, a second lens group having negative refractive power, and a third lens group having positive refractive power. When a state of lens group positions varies from a wide-angle end state to a telephoto end state, a distance between the first lens group and the second lens group increases, and a distance between the second lens group and the third lens group decreases. The first lens group is composed of, in order from the object, a 1A lens group having positive refractive power, and a 1B lens group having positive refractive power. Focusing from infinity to a close-range object is carried out by moving only the 1B lens group to the object, and the following conditional expressions (1) through (4) are satisfied:

$$1.55 < f1/fw < 2.20 \tag{1}$$

$$-0.55 < f2/fw < -0.30 \tag{2}$$

$$2.0 < f1A/f1B < 4.0 \tag{3}$$

$$0.16 < DAB/fw < 0.30 \tag{4}$$

where fw denotes the focal length of the zoom lens system in the wide-angle end state, f1 denotes the focal length of the first lens group, f2 denotes the focal length of the second lens group, f1A denotes the focal length of the 1A lens group, f1B denotes the focal length of the 1B lens group, and DAB denotes the distance between the 1A lens group and the 1B lens group when the zoom lens system is focused on infinity.

In one preferred embodiment of the present invention, when the state of lens group positions varies from the wide-angle end state to the telephoto end state, the first lens group and the third lens group preferably move to the object.

In one preferred embodiment of the present invention, the zoom lens system further includes a fourth lens group having negative refractive power to an image side of the third lens group. When the state of lens group positions varies from the wide-angle end state to the telephoto end state, a distance between the third lens group and the fourth lens group varies, and the following conditional expressions (5) through (7) are preferably satisfied:

$$0.35 < f3/fw < 0.70 \qquad (5)$$

$$-1.50 < f4/fw < -0.70 \qquad (6)$$

$$-0.10 < (D34w - D34t)/fw < 0.10 \qquad (7)$$

where f3 denotes the focal length of the third lens group, f4 denotes the focal length of the fourth lens group, D34w denotes the distance between the third lens group and the fourth lens group in the wide-angle end state, and D34t denotes the distance between the third lens group and the fourth lens group in the telephoto end state.

In one preferred embodiment of the present invention, the 1A lens group is composed of only one positive lens, the 1B lens group is composed of, in order from the object, a negative meniscus lens having a convex surface facing to the object, and a positive lens having a convex surface facing to the object, and the following conditional expressions (8) and (9) are preferably satisfied:

$$50 < v1A \qquad (8)$$

$$35 < v1BP - v1BN \qquad (9)$$

where v1A denotes Abbe number of the positive lens in the 1A lens group at d-line ($\lambda$=587.6 nm), v1BP denotes Abbe number of the positive lens in the 1B lens group G1B at d-line, and v1BN denotes Abbe number of the negative meniscus lens in the 1B lens group G1B at d-line.

In one preferred embodiment of the present invention, the negative meniscus lens and the positive lens in the 1B lens group are preferably cemented with each other.

According to another aspect of the present invention, a zoom lens system with a vibration reduction mechanism includes, in order from an object, a first lens group having positive refractive power, a second lens group having negative refractive power, a third lens group having positive refractive power, and a fourth lens group having negative refractive power. When a state of lens group positions varies from a wide-angle end state to a telephoto end state, a distance between the first lens group and the second lens group increases, a distance between the second lens group and the third lens group decreases, and a distance between the third lens group and the fourth lens group varies. The fourth lens group is composed of, in order from the object, a 41 lens group, a 42 lens group having negative refractive power and a 43 lens group. At least one of the 41 lens group and the 43 lens group has positive refractive power. Image blur on an image plane caused by a camera shake is reduced by moving only the 42 lens group perpendicular to the optical axis.

In one preferred embodiment of the present invention, the following conditional expression (10) is preferably satisfied:

$$0.10 < f42/f4 < 0.90 \qquad (10)$$

where f4 denotes the focal length of the fourth lens group, and f42 denotes the focal length of the 42 lens group.

In one preferred embodiment of the present invention, the following conditional expressions (11) and (12) are preferably satisfied:

$$-2.10 < f4/fw < -0.70 \qquad (11)$$

$$-2.10 < (1/f41 + 1/f43) \cdot f4 < -0.40 \qquad (12)$$

where fw denotes the focal length of the zoom lens system in the wide-angle end state, f41 denotes the focal length of the 41 lens group and f43 denotes the focal length of the 43 lens group.

In one preferred embodiment of the present invention, when the state of lens group positions varies from the wide-angle end state to the telephoto end state, the first lens group, the third lens group, and the fourth lens group preferably move to the object.

In one preferred embodiment of the present invention, the 41 lens group preferably includes at least one positive lens, the 42 lens group preferably includes at least one positive lens and at least one negative lens, and the 43 lens group preferably includes at least one positive lens.

In one preferred embodiment of the present invention, the 41 lens group includes, in order from the object, a negative lens having a concave surface facing to the image, and a positive lens having a convex surface facing to the object, and the following conditional expression (13) is preferably satisfied:

$$0.20 < n41N - n41P \qquad (13)$$

where n41N denotes refractive index of the negative lens in the 41 lens group at d-line ($\lambda$=587.6 nm), and n41P denotes refractive index of the positive lens in the 41 lens group at d-line.

In one preferred embodiment of the present invention, the 42 lens group includes, in order from the object, a positive lens having a convex surface facing to the image, and a double concave negative lens, and the following conditional expression (14) is preferably satisfied:

$$10.0 < v42N - v42P \qquad (14)$$

where v42N denotes Abbe number of the double concave negative lens in the 42 lens group at d-line ($\lambda$=587.6 nm), and v42P denotes Abbe dumber of the positive lens in the 42 lens group at d-line.

In one preferred embodiment of the present invention, the zoom lens system preferably consists only of, in order from the object, the first lens group, the second lens group, the third lens group, and the fourth lens group.

In one preferred embodiment of the present invention, a fifth lens group having positive refractive power is preferably arranged to the image side of the fourth lens group.

In one preferred embodiment of the present invention, focusing from infinity to a close-range object is preferably carried out by moving the first lens group as a whole to the object.

In one preferred embodiment of the present invention, focusing from infinity to a close-range object is carried out by moving the second lens group as a whole to the object, and the following conditional expression (15) is preferably satisfied:

$$-0.98<M2t<-0.80 \quad (15)$$

where M2t denotes the magnification of the second lens group in the telephoto end state.

In one preferred embodiment of the present invention, the first lens group is composed of, in order from the object, a 1A lens group having positive refractive power, and a 1B lens group having positive refractive power, and focusing from infinity to a close-range object is preferably carried out by moving only the 1B lens group to the object.

According to another aspect of the present invention, a zoom lens system with a vibration reduction mechanism includes, in order from an object, a first lens group having positive refractive power, a second lens group having negative refractive power, and a third lens group having positive refractive power. When a state of lens group positions varies from a wide-angle end state to a telephoto end state, a distance between the first lens group and the second lens group increases, and a distance between the second lens group and the third lens group decreases. The third lens group is composed of, in order from the object, a 31 lens group having positive refractive power, a 32 lens group having negative refractive power, and a 33 lens group. Image blur on an image plane caused by a camera shake is reduced by moving only the 32 lens group perpendicular to the optical axis.

In one preferred embodiment of the present invention, the following conditional expressions (16) through (20) are preferably satisfied:

$$1.40<f1/fw<2.00 \quad (16)$$

$$-0.53<f2/fw<-0.32 \quad (17)$$

$$0.35<f3/fw<0.65 \quad (18)$$

$$-2.00<f32/f3<-0.80 \quad (19)$$

$$-0.20<f3/f33<0.50 \quad (20)$$

where fw denotes the focal length of the zoom lens system in the wide-angle end state, f1 denotes the focal length of the first lens group, f2 denotes the focal length of the second lens group, f3 denotes the focal length of the third lens group, f32 denotes the focal length of the 32 lens group, and f33 denotes the focal length of the 33 lens group.

In one preferred embodiment of the present invention, when the state of lens group positions varies from the wide-angle end state to the telephoto end state, the first lens group and the third lens group preferably move to the object.

In one preferred embodiment of the present invention, the 31 lens group preferably includes at least three positive lenses and at least one negative lens, the 32 lens group preferably includes at least one positive lens and at least one negative lens, and the 33 lens group preferably includes at least one positive lens and at least one negative lens.

In one preferred embodiment of the present invention, the 31 lens group includes, in order from the object, a double convex positive lens, a first cemented lens constructed by a double convex positive lens cemented with a negative lens having a concave surface facing to the object, a positive meniscus lens having a convex surface facing to the object, and a second cemented lens, and the following conditional expressions (21) and (22) are preferably satisfied:

$$0.20<n31N-n31P \quad (21)$$

$$30.0<v31P-v31N \quad (22)$$

where n31N denotes refractive index of the negative lens in the first cemented lens at d-line ($\lambda$=587.6 nm), n31P denotes refractive index of the positive lens in the first cemented lens at d-line, v31N denotes Abbe number of the negative lens in the first cemented lens at d-line, and v31P denotes Abbe number of the positive lens in the first cemented lens at d-line.

In one preferred embodiment of the present invention, the 32 lens group includes, in order from the object, a positive lens having a convex surface facing to the image, and a double concave negative lens, and the following conditional expression (23) is preferably satisfied:

$$10.0<v32N-v32P \quad (23)$$

where v32N denotes Abbe number of the double concave negative lens in the 32 lens group at d-line ($\lambda$=587.6 nm), and v32P denotes Abbe number of the positive lens in the 32 lens group at d-line.

In one preferred embodiment of the present invention, the 32 lens group is composed of, in order from the object, a cemented lens constructed by a positive lens having a convex surface facing to the image cemented with a double concave negative lens, and the following conditional expression (24) is preferably satisfied:

$$-2.00<(r32R+r32F)/(r32R-r32F)<-0.70 \quad (24)$$

where r32F denotes the radius of curvature of the object side surface of the positive lens in the 32 lens group, r32R denotes the radius of curvature of the image side surface of the double concave negative lens in the 32 lens group.

In one preferred embodiment of the present invention, the following conditional expression (25) is preferably satisfied:

$$0.40<r32S/f32<0.90 \quad (25)$$

where r32S denotes the radius of curvature of the cemented lens in the 32 lens group, and f32 denotes the focal length of the 32 lens group.

In one preferred embodiment of the present invention, the zoom lens system preferably consists only of, in order from the object, the first lens group, the second lens group, and the third lens group.

In one preferred embodiment of the present invention, the first lens group is composed of, in order from the object, a 1A lens group having positive refractive power, and a 1B lens group having positive refractive power, focusing from infinity to a close-range object is carried out by moving only the 1B lens group to the object, and the following conditional expression (26) is preferably satisfied:

$$1.70<f1A/f1B<4.00 \quad (26)$$

where f1A denotes the focal length of the 1A lens group and f1B denotes the focal length of the 1B lens group.

Other features and advantages according to the present invention will be readily understood from the detailed description of the preferred embodiments in conjunction with the accompanying drawings.

BRIEF DESCRIPTION OF THE DRAWINGS

FIG. 1 is a diagram showing a sectional view of a zoom lens system according to Example 1 of a first embodiment of the present invention together with a trajectory of each lens group upon zooming.

FIG. 5 is a diagram showing a sectional view of a zoom lens system according to Example 2 of the first embodiment of the present invention together with a trajectory of each lens group upon zooming.

FIG. 9 is a diagram showing a sectional view of a zoom lens system according to Example 3 of the first embodiment of the present invention together with a trajectory of each lens group upon zooming.

FIG. 17 is a diagram showing a sectional view of a zoom lens system according to Example 5 of a second embodiment of the present invention together with a trajectory of each lens group upon zooming.

FIG. 21 is a diagram showing a sectional view of a zoom lens system according to Example 6 of the second embodiment of the present invention together with a trajectory of each lens group upon zooming.

FIG. 25 is a diagram showing a sectional view of a zoom lens system according to Example 7 of the second embodiment of the present invention together with a trajectory of each lens group upon zooming.

FIG. 29 is a diagram showing a sectional view of a zoom lens system according to Example 8 of the second embodiment of the present invention together with a trajectory of each lens group upon zooming.

FIG. 33 is a diagram showing a sectional view of a zoom lens system according to Example 9 of the second embodiment of the present invention together with a trajectory of each lens group upon zooming.

FIG. 41 is a diagram showing a sectional view of a zoom lens system according to Example 11 of the third embodiment of the present invention together with a trajectory of each lens group upon zooming.

FIG. 49 is a diagram showing a sectional view of a zoom lens system according to Example 13 of the third embodiment of the present invention together with a trajectory of each lens group upon zooming.

FIG. 61 is a diagram showing a sectional view of a zoom lens system according to Example 16 of the third embodiment of the present invention together with a trajectory of each lens group upon zooming.

DESCRIPTION OF THE PREFERRED EMBODIMENTS

[First Embodiment]

Figure 2A:
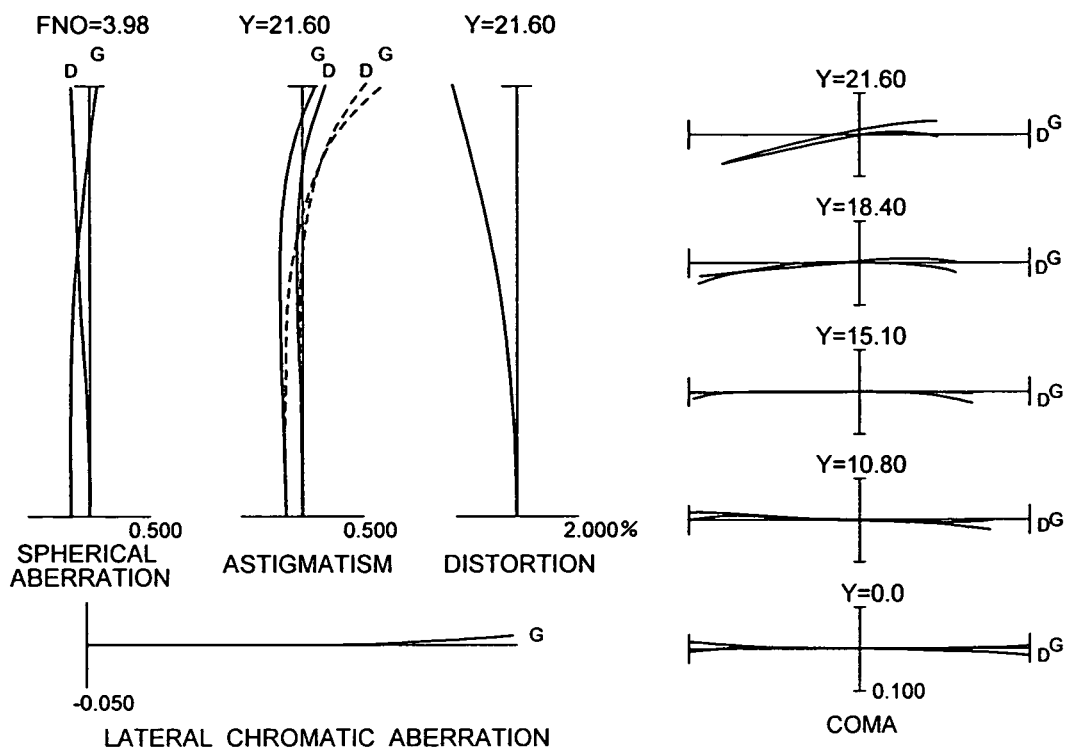
FIGS. 2A and 2B show various aberrations of the zoom lens system according to Example 1 of the first embodiment in a wide-angle end state upon focusing at infinity, and at a closest shooting distance (1500 mm), respectively.

The zoom lens system according to the first embodiment of the present invention is composed of, in order from an object, a first lens group having positive refractive power, a second lens group having negative refractive power, and a third lens group having positive refractive power. When a state of lens group positions varies from a wide-angle end state to a telephoto end state, a distance between the first lens group and the second lens group increases, and a distance between the second lens group and the third lens group decreases.

The first lens group is composed of, in order from the object, a 1A lens group G1A having positive refractive power and a 1B lens group G1B having positive refractive power. Focusing from infinity to a close-rang object is carried out by moving only the 1B lens group G1B to the object.

With this construction, it can be prevented to expose movable lens group for focusing, so that it is advantageous for auto focus. Moreover, by composing the first lens group of the 1A lens group G1A having positive refractive power and the 1B lens group G1B having positive refractive power, increase in the number of lens elements can be prevented and variation in aberration upon focusing can be suppressed.

The zoom lens system according to the first embodiment of the present invention satisfies the following conditional expressions (1) through (4):

$$1.55 < f1/fw < 2.20 \quad (1)$$

$$-0.55 < f2/fw < -0.30 \quad (2)$$

$$2.0 < f1A/f1B < 4.0 \quad (3)$$

$$0.16 < DAB/fw < 0.30 \quad (4)$$

where fw denotes the focal length of the zoom lens system in the wide-angle end state, f1 denotes the focal length of the first lens group, f2 denotes the focal length of the second lens group, f1A denotes the focal length of the 1A lens group, f1B denotes the focal length of the 1B lens group, and DAB denotes the distance between the 1A lens group and the 1B lens group when the zoom lens system is focused on infinity.

Conditional expression (1) defines an appropriate range of the focal length of the first lens group. When the ratio f1/fw is equal to or falls below the lower limit of conditional expression (1), positive refractive power of the first lens group becomes large, so that it becomes difficult to satisfactorily correct aberrations with fewer number of lens elements. On the other hand, when the ratio f1/fw is equal to or exceeds the upper limit of conditional expression (1), the total length of the zoom lens system becomes large, so that it is undesirable.

In order to secure the effect of the present invention, it is preferable that the lower limit of conditional expression (1) is set to 1.60 and the upper limit to 2.00.

Conditional expression (2) defines an appropriate range of the focal length of the second lens group. When the ratio f2/fw is equal to or exceeds the upper limit of conditional expression (2), negative refractive power of the second lens group becomes large, so that it becomes difficult to correct various aberrations. On the other hand, when the ratio f2/fw is equal to or falls below the lower limit of conditional expression (2), the total length of the zoom lens system becomes large, so that it is undesirable.

In order to fully secure the effect of the present invention, it is preferable that the lower limit of conditional expression (2) is set to −0.50 and the upper limit to −0.35.

Conditional expression (3) defines an appropriate range of the ratio of the focal length of the 1A lens group to that of the 1B lens group. When the ratio f1A/f1B is equal to or exceeds the upper limit of conditional expression (3), positive refractive power of the 1B lens group becomes strong, so that it takes larger number of lens elements in the 1B lens group to correct aberrations. On the other hand, when the ratio f1A/f1B is equal to or falls below the lower limit of conditional expression (3), positive refractive power of the 1A lens group becomes strong, so that it takes larger number of lens elements in the 1A lens group to correct aberrations.

In order to further secure the effect of the present invention, it is preferable that the lower limit of conditional expression (3) is set to 2.20 and the upper limit to 3.85.

Conditional expression (4) defines an appropriate range of the distance between the 1A lens group G1A and the 1B lens group G1B. When the ratio DAB/fw is equal to or exceeds the upper limit of conditional expression (4), the diameter of the 1A lens group becomes large, so that it is undesirable. On the other hand, when the ratio DAB/fw is equal to or falls below the lower limit of conditional expression (4), the air space for moving the 1B lens group upon focusing becomes narrow, so that it becomes difficult to secure the closest shooting distance to be sufficiently near.

In order to further secure the effect of the present invention, it is preferable that the lower limit of conditional expression (4) is set to 0.18 and the upper limit to 0.25.

It is preferable that when the state of lens group positions varies from the wide-angle end state to the telephoto end state, the first lens group and the third lens group move to the object. In this construction, the total lens length of the zoom lens system in the wide-angle end state can be compact.

Moreover, it may be possible to construct the zoom lens system by including a fourth lens group having negative refractive power to the image side of the third lens group and varying the distance between the third lens group and the fourth lens group upon zooming from the wide-angle end state to the telephoto end state. By arranging the fourth lens group having negative refractive power to the image side of the third lens group, the zoom lens system becomes a telephoto type power arrangement, so that it is effective to shorten the total lens length of the zoom lens system. Moreover, by varying the distance between the third lens group and the fourth lens group, variation in astigmatism and curvature of field can be suppressed.

In the zoom lens system according to the first embodiment of the present invention, it is preferable to satisfy the following conditional expressions (5) through (7):

$$0.35 < f3/fw < 0.70 \quad (5)$$

$$-1.50 < f4/fw < -0.70 \quad (6)$$

$$-0.10 < (D34w - D34t)/fw < 0.10 \quad (7)$$

where f3 denotes the focal length of the third lens group, f4 denotes the focal length of the fourth lens group, D34w denotes the distance between the third lens group and the fourth lens group in the wide-angle end state, and D34t denotes the distance between the third lens group and the fourth lens group in the telephoto end state.

Conditional expression (5) defines an appropriate range of the focal length of the third lens group. When the ratio f3/fw is equal to or falls below the lower limit of conditional expression (5), positive refractive power of the third lens group becomes strong, so that it becomes difficult to correct various aberrations as well as spherical aberration. On the other hand, when the ratio f2/fw is equal to or exceeds the upper limit of conditional expression (5), the total length of the zoom lens system becomes large, so that it is undesirable.

In order to further secure the effect of the present invention, it is preferable that the lower limit of conditional expression (5) is set to 0.40 and the upper limit to 0.60.

Conditional expression (6) defines an appropriate range of the focal length of the fourth lens group. When the ratio f4/fw is equal to or exceeds the upper limit of conditional expression (6), negative refractive power of the fourth lens group becomes strong, so that it becomes difficult to correct coma and distortion. On the other hand, when the ratio f4/fw is equal to or falls below the lower limit of conditional expression (6), negative refractive power of the fourth lens group becomes weak decreasing the effect of the telephoto type power arrangement, so that it becomes difficult to make the total lens length be compact.

In order to further secure the effect of the present invention, it is preferable that the lower limit of conditional expression (6) is set to −1.20 and the upper limit to −0.85.

Conditional expression (7) defines an appropriate range of difference between the distance from the third lens group to the fourth lens group in the wide-angle end state and that in the telephoto end state. When the ratio (D34w−D34t)/fw is equal to or falls below the lower limit of conditional expression (7), or is equal to or exceeds the upper limit of conditional expression (7), it becomes difficult to satisfactorily correct variation in astigmatism and curvature of field upon zooming.

In order to further secure the effect of the present invention, it is preferable that the lower limit of conditional expression (7) is set to −0.05 and the upper limit to 0.05.

In order to suppress the number of lens elements in the first lens group to be three it is preferable that the 1A lens group G1A is composed of only one positive lens element and the 1B lens group G1B is composed of, in order from the object, a negative meniscus lens having a convex surface facing to the object and a positive lens having a convex surface facing to the object. The construction is effective to make the zoom lens system simple, compact, and cheep.

Since the focusing lens group, which is the 1B lens group G1B, is composed of a negative lens and a positive lens, it becomes possible to correct spherical aberration and chromatic aberration, so that variation in spherical aberration and chromatic aberration upon focusing can be suppressed.

In the zoom lens system according to the first embodiment of the present invention, it is preferable to satisfy the following conditional expressions (8) and (9):

$$50 < v1A \quad (8)$$

$$35 < v1BP - v1BN \quad (9)$$

where v1A denotes Abbe number of the positive lens in the 1A lens group G1A at d-line (λ=587.6 nm), v1BP denotes Abbe number of the positive lens in the 1B lens group G1B at d-line, and v1BN denotes Abbe number of the negative meniscus lens in the 1B lens group G1B at d-line.

Conditional expression (8) defines an appropriate range of Abbe number of the positive lens consisting of the 1A lens group G1A. When the value v1A is equal to or falls below the lower limit of conditional expression (8), variation in chromatic aberration upon focusing becomes large, s that it is undesirable. In order to further secure the effect of the present invention, it is preferable that the lower limit of conditional expression (8) is set to 60.

Conditional expression (9) defines an appropriate range of difference between Abbe number of the positive lens and that of the negative meniscus lens consisting of the 1B lens group G1B. When the value v1BP−v1BN is equal to or falls below the lower limit of conditional expression (9), variation in chromatic aberration upon focusing and zooming becomes large, so that it is undesirable. In order to further secure the effect of the present invention, it is preferable that the lower limit of conditional expression (9) is set to 40.

Furthermore, it is preferable that the negative meniscus lens and the positive lens in the 1B lens group are cemented. With this construction, degradation of optical performance or production of ghost images caused by assembling can be reduced.

Each example according to the first embodiment of the present invention is explained with reference to accompanying drawings.

EXAMPLE 1

FIG. 1 is a diagram showing a sectional view of a zoom lens system according to Example 1 of a first embodiment of the present invention together with a trajectory of each lens group upon zooming. In FIG. 1, the zoom lens system is composed of, in order from an object, a first lens group G1 having positive refractive power, a second lens group G2 having negative refractive power, an aperture stop S, a third lens group G3 having positive refractive power, and a fourth lens group G4 having negative refractive power. When the state of lens group positions varies from a wide-angle end state (W) to a telephoto end state (T), the first lens group G1, the third lens group G3, and the fourth lens group G4 move to the object and the second lens group G2 moves once to the image and, then, moves to the object such that a distance between the first lens group G1 and the second lens group G2 increases, a distance between the second lens group G2 and the third lens group G3 decreases, and a distance between the third lens group G3 and the fourth lens group G4 varies. The aperture stop S moves together with the third lens group G3 upon zooming from the wide-angle end state (W) to the telephoto end state (T).

The first lens group G1 is composed of, in order from the object, a 1A lens group G1A having positive refractive power, and a 1B lens group G1B having positive refractive power. Focusing from infinity to a close-range object is carried out by moving only the 1B lens group G1B to the object.

The 1A lens group G1A is composed of a double convex positive lens L11. The 1B lens group G1B is composed of a cemented lens constructed by a negative meniscus lens L12 having a convex surface facing to the object cemented with a double convex positive lens L13.

The second lens group G2 is composed of a double concave negative lens, a cemented lens constructed by a double concave negative lens cemented with a double convex positive lens and a double concave negative lens.

The third lens group G3 is composed of a double convex positive lens, a cemented lens constructed by a double convex positive lens cemented with a double concave negative lens, and a positive meniscus lens having a convex surface facing to the object.

The fourth lens group G4 is composed of a cemented lens constructed by a negative meniscus lens having a convex surface facing to the object cemented with a double convex positive lens, a cemented lens constructed by a double convex positive lens cemented with a double concave negative lens, a double convex positive lens, and a negative meniscus lens having a concave surface facing to the object.

Various values associated with Example 1 are listed in Table 1. In [Specifications], f denotes the focal length, FNO denotes the f-number, and 2ω denotes the angle of view. In [Lens Data], the first column is the surface number counted in order from the object side, the second column r denotes the radius of curvature, the third column d denotes the distance along the optical axis between the lens surfaces, and the fourth column ν denotes Abbe number at d-line (λ=587.6 nm) and the fifth column n denotes refractive index at d-line (λ=587.6 nm). In the second column r, reference symbol "∞" denotes a plane. In the fifth column, refractive index of the air 1.00000 is omitted. In [Variable Distances], f denotes the focal length, M denotes the shooting magnification, D0 denotes the distance between the object and the first lens surface, R denotes a distance between the object and the image plane, and Bf denotes the back focal length. In [Values for Conditional Expressions], values for respective conditional expressions are shown.

In the tables for various values, "mm" is generally used for the unit of length such as the focal length, the radius of curvature, and the distance between optical surfaces. However, since an optical system proportionally enlarged or reduced its dimension can be obtained similar optical performance, the unit is not necessary to be limited to "mm" and any other suitable unit can be used. The explanation of reference symbols is the same in the other examples and duplicated explanations are omitted.

TABLE 1

[Specifications]

| f = | 71.40 | 135.20 | 294.00 |
|---|---|---|---|
| FNO = | 3.98 | 4.42 | 5.83 |
| 2ω = | 34.26° | 17.57° | 8.19° |

TABLE 1-continued

[Lens Data]

| | r | d | ν | n |
|---|---|---|---|---|
| 1 | 401.1292 | 3.4320 | 64.14 | 1.516330 |
| 2 | −401.1292 | (d2) | | |
| 3 | 73.7120 | 1.8000 | 28.46 | 1.728250 |
| 4 | 49.4588 | 9.2239 | 81.54 | 1.496999 |
| 5 | −634.7712 | (d5) | | |
| 6 | −569.6277 | 1.4000 | 46.57 | 1.804000 |
| 7 | 65.8130 | 2.9470 | | |
| 8 | −66.3802 | 1.4000 | 49.34 | 1.743198 |
| 9 | 37.4535 | 4.4348 | 23.78 | 1.846660 |
| 10 | −157.1502 | 1.2424 | | |
| 11 | −56.4033 | 1.4000 | 46.57 | 1.804000 |
| 12 | 457.6562 | (d12) | | |
| 13 | ∞ | 1.0000 | | Aperture Stop S |
| 14 | 174.8883 | 4.0762 | 60.08 | 1.639999 |
| 15 | −54.3627 | 0.2000 | | |
| 16 | 52.6528 | 6.0766 | 81.54 | 1.496999 |
| 17 | −40.7675 | 1.4000 | 34.97 | 1.800999 |
| 18 | 1440.7843 | 0.2000 | | |
| 19 | 33.5705 | 3.5534 | 61.13 | 1.589130 |
| 20 | 93.9894 | (d20) | | |
| 21 | 479.6438 | 1.4000 | 23.78 | 1.846660 |
| 22 | 43.7293 | 4.5629 | 59.84 | 1.522494 |
| 23 | −51.1261 | 3.0000 | | |
| 24 | 1129.8061 | 3.6174 | 29.23 | 1.721507 |
| 25 | −22.8122 | 1.4000 | 47.93 | 1.717004 |
| 26 | 29.6916 | 4.4859 | | |
| 27 | 35.9110 | 3.4607 | 33.79 | 1.647689 |
| 28 | −167.9338 | 4.3753 | | |
| 29 | −22.4279 | 1.4000 | 46.57 | 1.804000 |
| 30 | −45.1019 | (B.f.) | | |

| | Wide-angle end | Intermediate | Telephoto end |
|---|---|---|---|
| | [Variable Distances] | | |
| | (Infinity) | | |
| f | 71.40001 | 135.19966 | 294.00012 |
| D0 | ∞ | ∞ | ∞ |
| d2 | 13.96876 | 13.96876 | 13.96876 |
| d5 | 1.50000 | 30.16863 | 45.04078 |
| d12 | 26.95417 | 16.63929 | 1.00000 |
| d20 | 15.26706 | 15.23225 | 16.01169 |
| B.f. | 45.82163 | 54.27048 | 80.82164 |
| R | ∞ | ∞ | ∞ |
| | (Closest Shooting Distance) | | |
| M | −0.05763 | −0.11156 | −0.24806 |
| D0 | 1325.0000 | 1298.2322 | 1271.6687 |
| d2 | 1.45642 | 1.18529 | 0.90427 |
| d5 | 14.01234 | 42.95210 | 58.10527 |
| d12 | 26.95417 | 16.63929 | 1.00000 |
| d20 | 15.26706 | 15.23225 | 16.01169 |
| B.f. | 45.82163 | 54.27048 | 80.82164 |
| R | 1500.0000 | 1500.0000 | 1500.0000 |

[Values for Conditional Expressions]

(1) f1/fw = 1.680
(2) f2/fw = −0.405
(3) f1A/f1B = 2.335
(4) DAB/fw = 0.196
(5) f3/fw = 0.503
(6) f4/fw = −1.060
(7) (D34w − D34t) = −0.010
(8) ν1A = 64.14
(9) ν1BP − ν1BN = 53.08

Figure 2B:
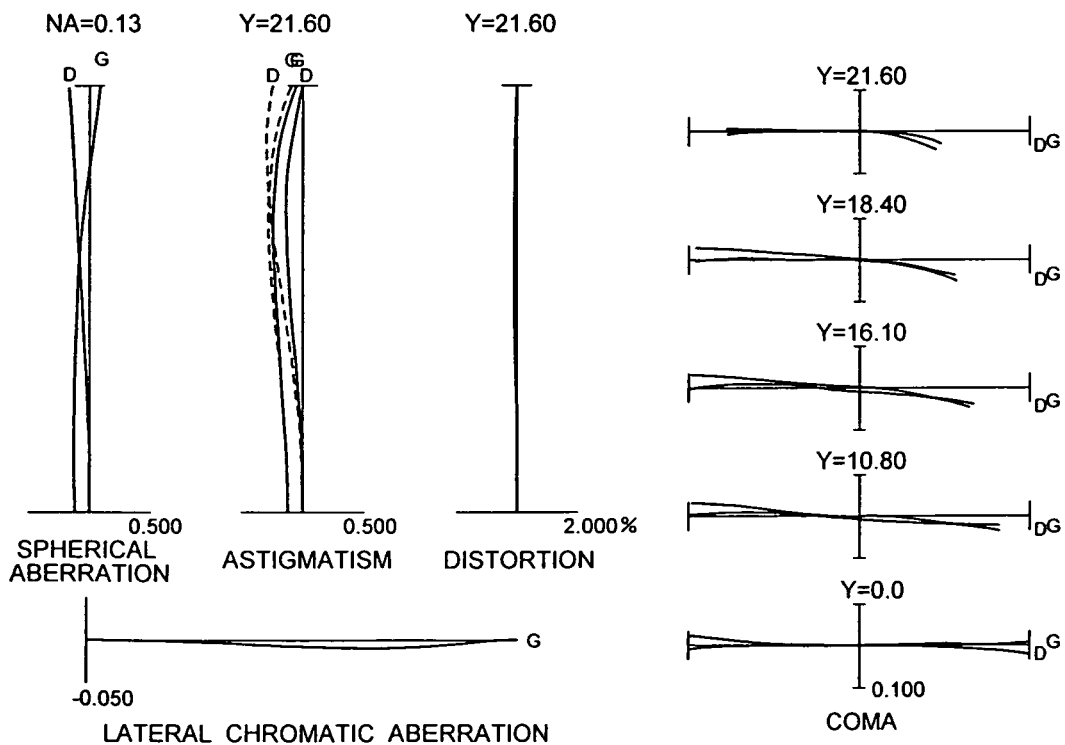
Figure 3A:
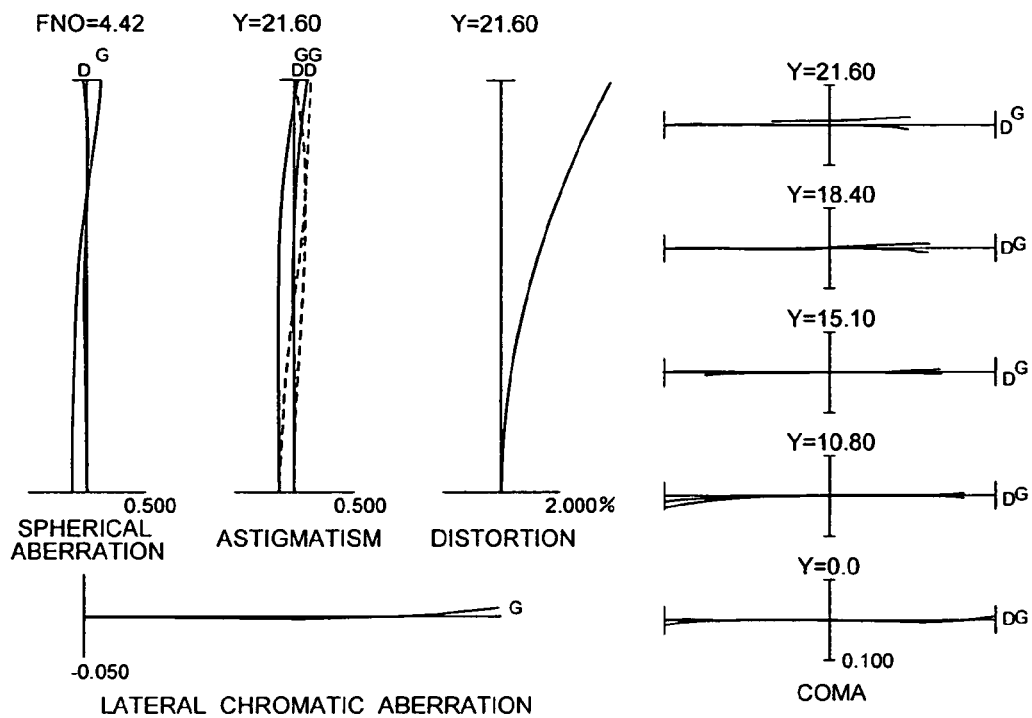
FIGS. 3A and 3B show various aberrations of the zoom lens system according to Example 1 of the first embodiment in an intermediate focal length state upon focusing at infinity, and at a closest shooting distance, respectively.
Figure 3B:
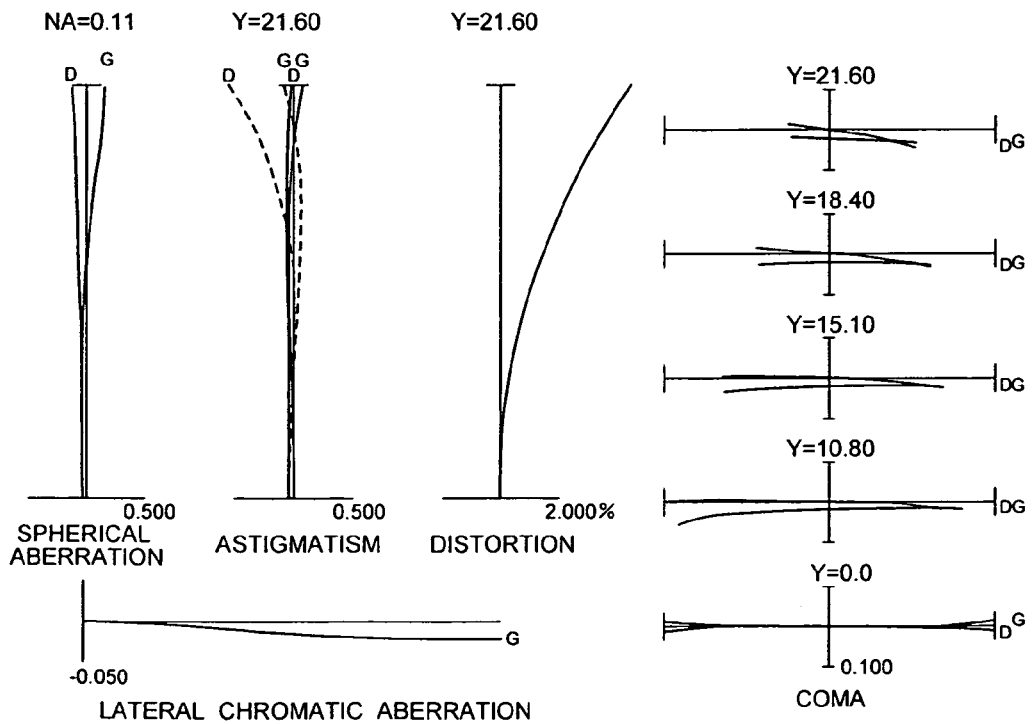
Figure 4A:
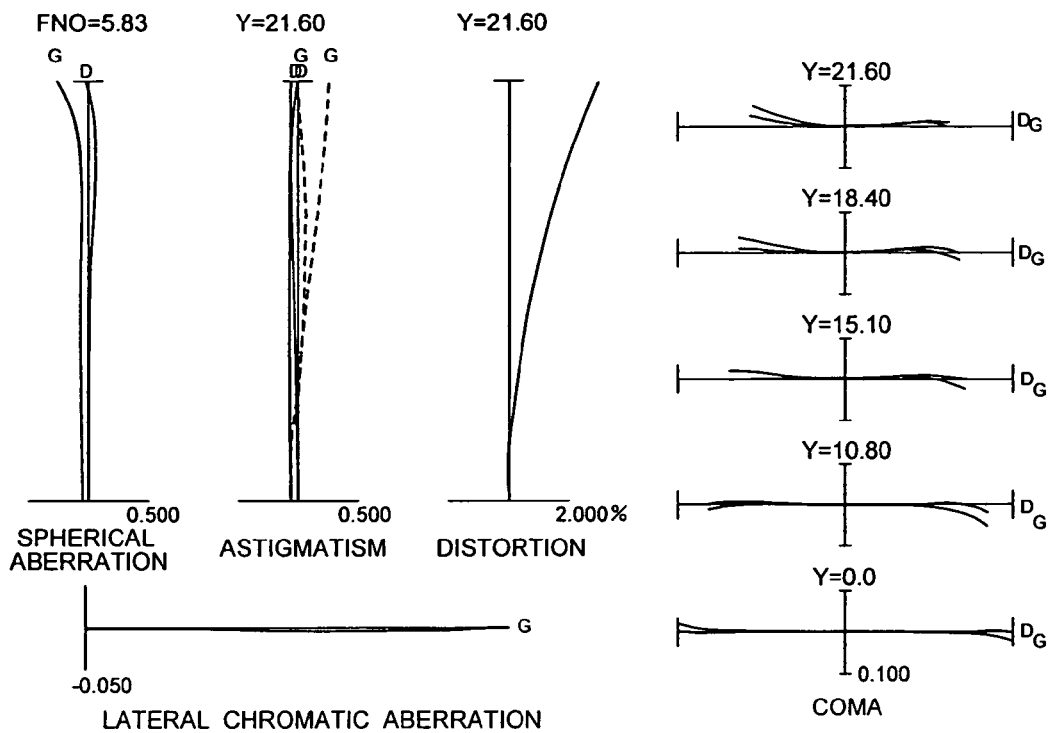
FIGS. 4A and 4B show various aberrations of the zoom lens system according to Example 1 of the first embodiment in a telephoto end state upon focusing at infinity, and at a closest shooting distance, respectively.
Figure 4B:
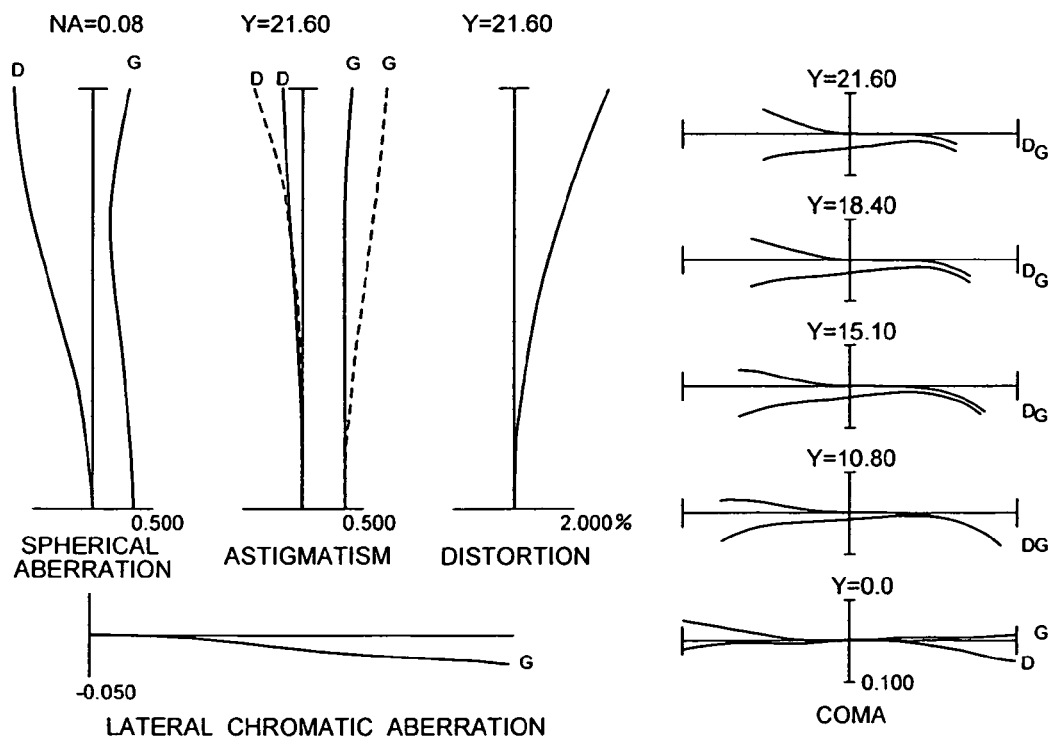

FIGS. 2A and 2B show various aberrations of the zoom lens system according to Example 1 of the first embodiment in a wide-angle end state upon focusing at infinity, and at a closest shooting distance (1500 mm), respectively. FIGS. 3A and 3B show various aberrations of the zoom lens system according to Example 1 of the first embodiment in an intermediate focal length state upon focusing at infinity, and at a closest shooting distance, respectively. FIGS. 4A and 4B show various aberrations of the zoom lens system according to Example 1 of the first embodiment in a telephoto end state upon focusing at infinity, and at a closest shooting distance, respectively.

In respective graphs, FNO denotes the f-number, Y denotes an image height, and D, G denote aberration curves for d-line (λ=587.6 nm) and g-line (λ=435.8 nm), respectively. In graphs showing astigmatism, a solid line indicates a sagittal image plane, and a broken line indicates a meridional image plane. In the following Examples, the same reference symbols as Example 1 are used.

As is apparent from respective graphs, the zoom lens system according to Example 1 of the first embodiment shows superb optical performance correcting various aberrations.

EXAMPLE 2

FIG. 5 is a diagram showing a sectional view of a zoom lens system according to Example 2 of the first embodiment of the present invention together with a trajectory of each lens group upon zooming. In FIG. 5, the zoom lens system is composed of, in order from an object, a first lens group G1 having positive refractive power, a second lens group G2 having negative refractive power, an aperture stop S, a third lens group G3 having positive refractive power, and a fourth lens group G4 having negative refractive power. When the state of lens group positions varies from a wide-angle end state (W) to a telephoto end state (T), the first lens group G1, the third lens group G3, and the fourth lens group G4 move to the object and the second lens group G2 moves once to the image I and, then, moves to the object such that a distance between the first lens group G1 and the second lens group G2 increases, a distance between the second lens group G2 and the third lens group G3 decreases, and a distance between the third lens group G3 and the fourth lens group G4 varies. The aperture stop S moves together with the third lens group G3 upon zooming from the wide-angle end state (W) to the telephoto end state (T).

The first lens group G1 is composed of, in order from the object, a 1A lens group G1A having positive refractive power, and a 1B lens group G1B having positive refractive power. Focusing from infinity to a close-range object is carried out by moving only the 1B lens group G1B to the object.

The 1A lens group G1A is composed of a double convex positive lens L11. The 1B lens group G1B is composed of a cemented lens constructed by a negative meniscus lens L12 having a convex surface facing to the object cemented with a double convex positive lens L13.

The second lens group G2 is composed of a double concave negative lens, a cemented lens constructed by a double concave negative lens cemented with a double convex positive lens and a negative meniscus lens having a concave surface facing to the object.

The third lens group G3 is composed of a double convex positive lens, a cemented lens constructed by a double convex positive lens cemented with a double concave negative lens, and a positive meniscus lens having a convex surface facing to the object.

The fourth lens group G4 is composed of a cemented lens constructed by a negative meniscus lens having a convex surface facing to the object cemented with a double convex positive lens, a double convex positive lens, a double concave negative lens, a double convex positive lens, and a negative meniscus lens having a concave surface facing to the object.

Various values associated with Example 2 are listed in Table 2.

TABLE 2

[Specifications]

| f = | 71.40 | 135.20 | 294.00 |
|---|---|---|---|
| FNO = | 3.92 | 4.34 | 5.79 |
| 2ω = | 34.01° | 17.48° | 8.17° |

[Lens Data]

| | r | d | ν | n |
|---|---|---|---|---|
| 1 | 393.7797 | 3.4666 | 64.14 | 1.516330 |
| 2 | −393.7797 | (d2) | | |
| 3 | 72.1379 | 1.8000 | 28.46 | 1.728250 |
| 4 | 48.5919 | 9.3212 | 81.54 | 1.496999 |
| 5 | −673.5520 | (d5) | | |
| 6 | −371.5827 | 1.4000 | 46.57 | 1.804000 |
| 7 | 57.6115 | 3.0775 | | |
| 8 | −66.8503 | 1.4000 | 49.34 | 1.743198 |
| 9 | 39.7971 | 4.4329 | 23.78 | 1.846660 |
| 10 | −120.0368 | 1.3565 | | |
| 11 | −48.2268 | 1.4000 | 46.57 | 1.804000 |
| 12 | −623.8156 | (d12) | | |
| 13 | ∞ | 1.0000 | Aperture Stop S | |
| 14 | 171.0600 | 4.2202 | 60.08 | 1.639999 |
| 15 | −51.8912 | 0.2000 | | |
| 16 | 53.6971 | 5.9454 | 81.54 | 1.496999 |
| 17 | −42.4415 | 1.4000 | 34.97 | 1.800999 |
| 18 | 798.2716 | 0.2000 | | |
| 19 | 34.9966 | 3.3788 | 61.13 | 1.589130 |
| 20 | 91.1723 | (d20) | | |
| 21 | 224.4236 | 1.4000 | 23.78 | 1.846660 |
| 22 | 39.7038 | 3.2867 | 59.84 | 1.522494 |
| 23 | −225.6684 | 6.3172 | | |
| 24 | 337.2025 | 3.1647 | 27.79 | 1.740769 |
| 25 | −33.6532 | 0.2000 | | |
| 26 | −34.9705 | 1.4000 | 46.57 | 1.804000 |
| 27 | 41.8882 | 3.6016 | | |
| 28 | 48.8184 | 3.6441 | 33.79 | 1.647689 |
| 29 | −72.7425 | 10.5386 | | |
| 30 | −22.2604 | 1.4000 | 46.57 | 1.804000 |
| 31 | −42.1654 | (B.f.) | | |

| | Wide-angle end | Intermediate | Telephoto end |
|---|---|---|---|
| [Variable Distances] | | | |
| (Infinity) | | | |
| f | 71.40227 | 135.19993 | 294.00037 |
| D0 | ∞ | ∞ | ∞ |
| d2 | 13.53509 | 13.53509 | 13.53509 |
| d5 | 1.60134 | 30.08411 | 44.43064 |
| d12 | 26.58593 | 16.43870 | 1.00000 |
| d20 | 14.32441 | 14.04027 | 14.43188 |
| B.f. | 40.00116 | 48.12784 | 75.00135 |
| R | ∞ | ∞ | ∞ |
| (Closest Shooting Distance) | | | |
| M | −0.05757 | −0.11137 | −0.24756 |
| D0 | 1325.0001 | 1298.8220 | 1272.6491 |
| d2 | 1.42931 | 1.17314 | 0.90588 |
| d5 | 13.70712 | 42.44606 | 57.05985 |
| d12 | 26.58593 | 16.43870 | 1.00000 |
| d20 | 14.32441 | 14.04027 | 14.43188 |
| B.f. | 40.00116 | 48.12784 | 75.00135 |
| R | 1500.0000 | 1500.0000 | 1500.0000 |

[Values for Conditional Expressions]

(1) f1/fw = 1.653
(2) f2/fw = −0.402
(3) f1A/f1B = 2.326
(4) DAB/fw = 0.190

TABLE 2-continued (5) f3/fw = 0.513
(6) f4/fw = −1.039
(7) (D34w − D34t) = −0.002
(8) ν1A = 64.14
(9) ν1BP − ν1BN = 53.08

Figure 6A:
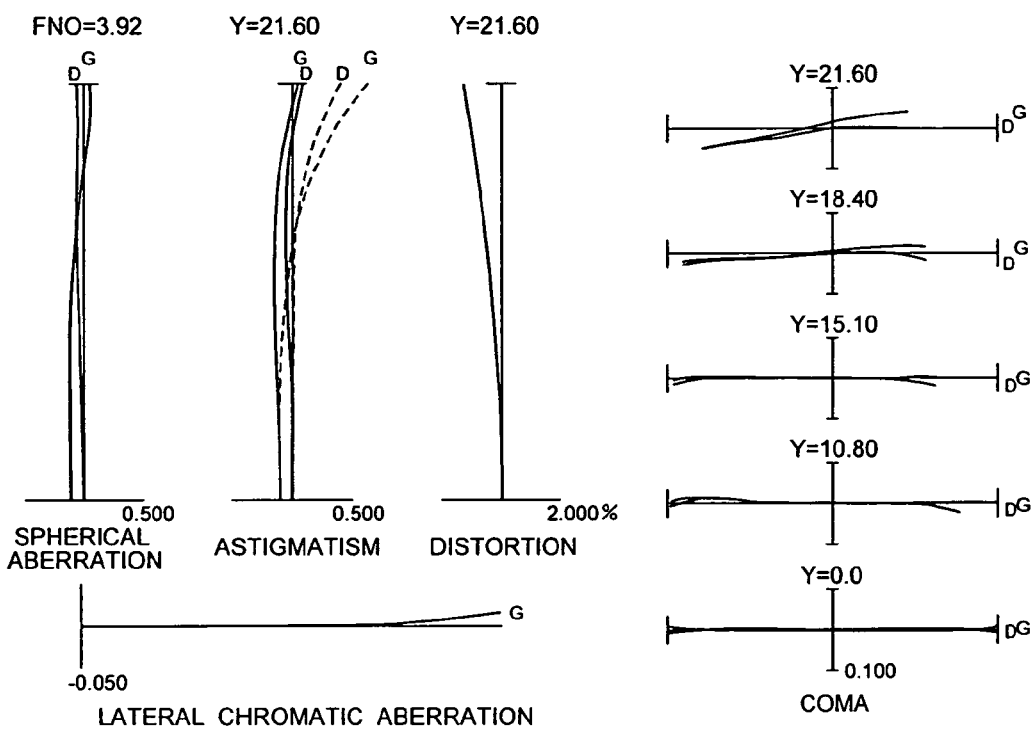
FIGS. 6A and 6B show various aberrations of the zoom lens system according to Example 2 of the first embodiment in a wide-angle end state upon focusing at infinity, and at a closest shooting distance (1500 mm), respectively.
Figure 6B:
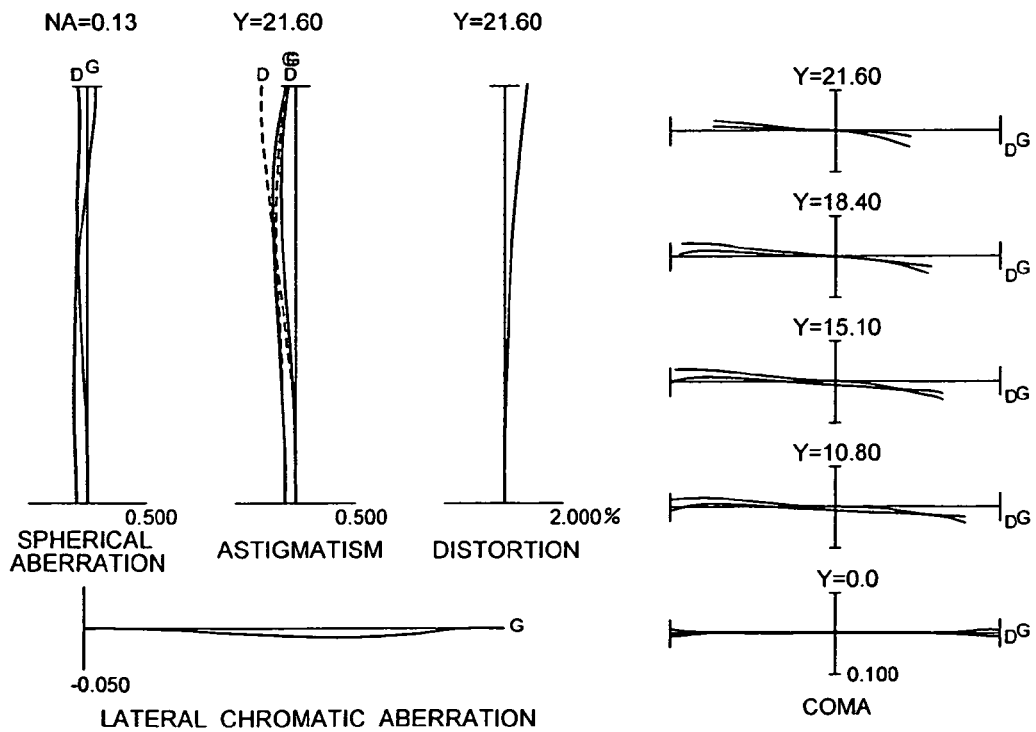
Figure 7A:
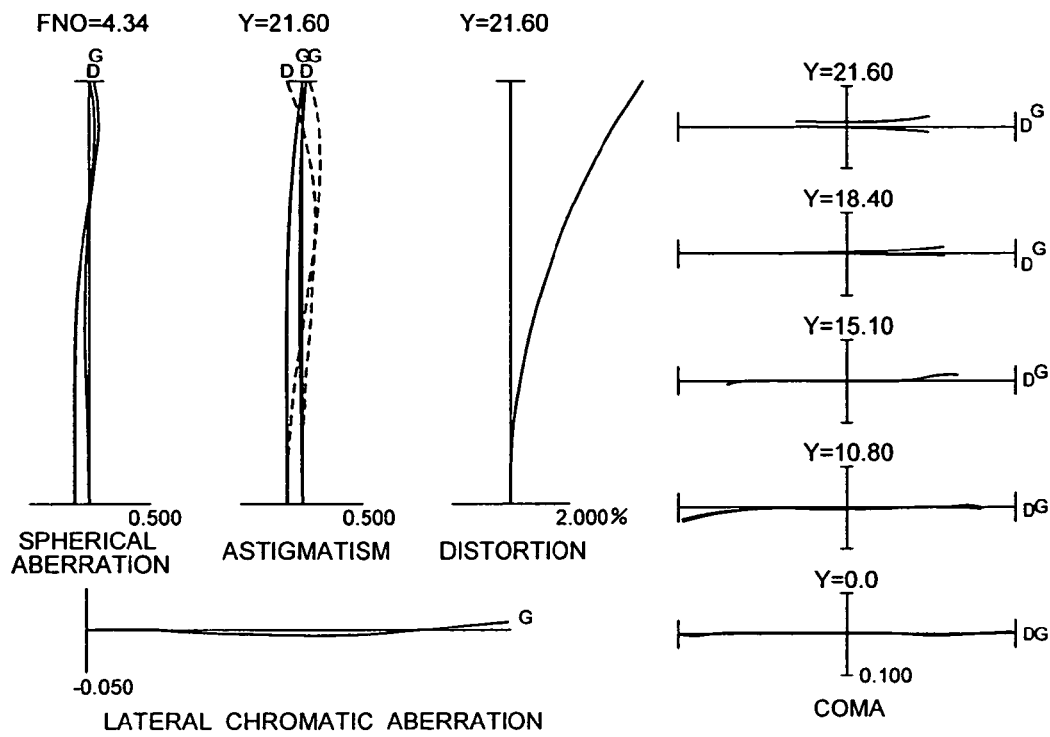
FIGS. 7A and 7B show various aberrations of the zoom lens system according to Example 2 of the first embodiment in an intermediate focal length state upon focusing at infinity, and at a closest shooting distance, respectively.
Figure 7B:
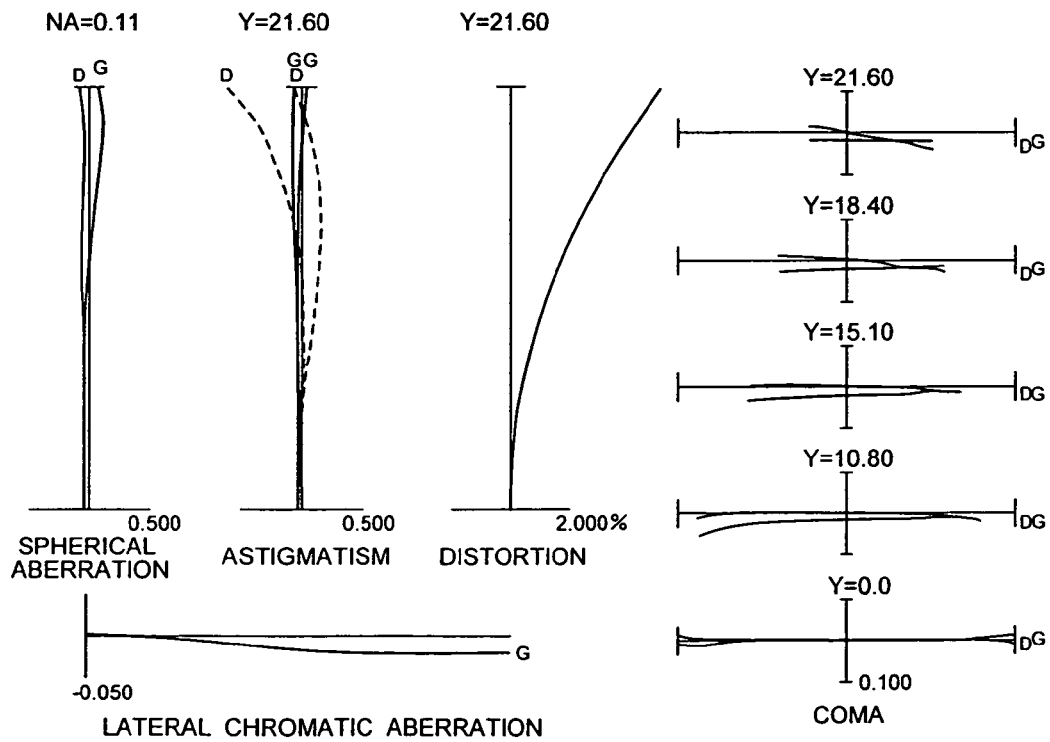
Figure 8A:
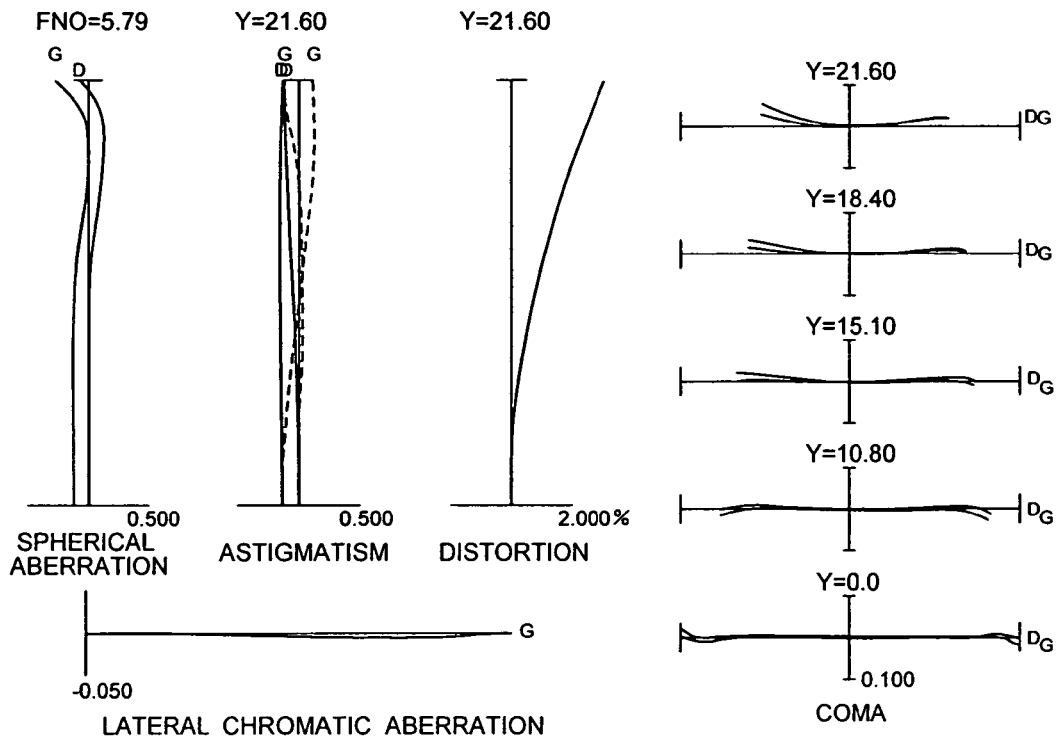
FIGS. 8A and 8B show various aberrations of the zoom lens system according to Example 2 of the first embodiment in a telephoto end state upon focusing at infinity, and at a closest shooting distance, respectively.
Figure 8B:
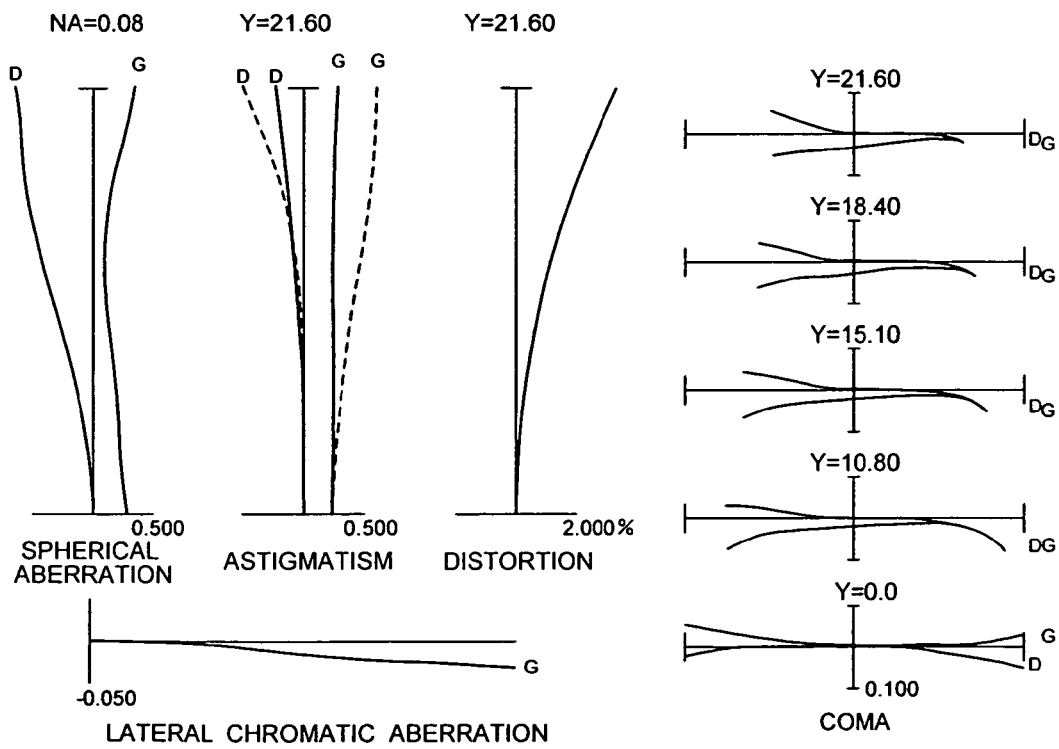

FIGS. 6A and 6B show various aberrations of the zoom lens system according to Example 2 of the first embodiment in a wide-angle end state upon focusing at infinity, and at a closest shooting distance (1500 mm), respectively. FIGS. 7A and 7B show various aberrations of the zoom lens system according to Example 2 of the first embodiment in an intermediate focal length state upon focusing at infinity, and at a closest shooting distance, respectively. FIGS. 8A and 8B show various aberrations of the zoom lens system according to Example 2 of the first embodiment in a telephoto end state upon focusing at infinity, and at a closest shooting distance, respectively.

As is apparent from respective graphs, the zoom lens system according to Example 2 of the first embodiment shows superb optical performance correcting various aberrations.

EXAMPLE 3

FIG. 9 is a diagram showing a sectional view of a zoom lens system according to Example 3 of the first embodiment of the present invention together with a trajectory of each lens group upon zooming. In FIG. 9, the zoom lens system is composed of, in order from an object, a first lens group G1 having positive refractive power, a second lens group G2 having negative refractive power, an aperture stop S, a third lens group G3 having positive refractive power, and a fourth lens group G4 having negative refractive power. When the state of lens group positions varies from a wide-angle end state (W) to a telephoto end state (T), the first lens group G1, the third lens group G3, and the fourth lens group G4 move to the object and the second lens group G2 moves once to the image I and, then, moves to the object such that a distance between the first lens group G1 and the second lens group G2 increases, a distance between the second lens group G2 and the third lens group G3 decreases, and a distance between the third lens group G3 and the fourth lens group G4 varies. The aperture stop S moves together with the third lens group G3 upon zooming from the wide-angle end state (W) to the telephoto end state (T).

The first lens group G1 is composed of, in order from the object, a 1A lens group G1A having positive refractive power, and a 1B lens group G1B having positive refractive power. Focusing from infinity to a close-range object is carried out by moving only the 1B lens group G1B to the object.

The 1A lens group G1A is composed of a double convex positive lens L11. The 1B lens group G1B is composed of a cemented lens constructed by a negative meniscus lens L12 having a convex surface facing to the object cemented with a double convex positive lens L13.

The second lens group G2 is composed of a double concave negative lens, a cemented lens constructed by a double concave negative lens cemented with a double convex positive lens and a negative meniscus lens having a concave surface facing to the object.

The third lens group G3 is composed of a double convex positive lens, a cemented lens constructed by a double convex positive lens cemented with a double concave negative lens, and a positive meniscus lens having a convex surface facing to the object.

The fourth lens group G4 is composed of a cemented lens constructed by a negative meniscus lens having a convex surface facing to the object cemented with a double convex positive lens, a double convex positive lens a double concave negative lens, a double convex positive lens, and a negative meniscus lens having a concave surface facing to the object.

Various values associated with Example 3 are listed in Table 3.

TABLE 3

[Specifications]

| f = | 71.40 | 134.90 | 294.00 |
|---|---|---|---|
| FNO = | 4.00 | 4.40 | 5.87 |
| 2ω = | 34.03° | 17.50° | 8.17° |

[Lens Data]

| | r | d | ν | n |
|---|---|---|---|---|
| 1 | 14220.5510 | 2.7079 | 64.14 | 1.516330 |
| 2 | −321.5792 | (d2) | | |
| 3 | 69.9601 | 1.8000 | 34.97 | 1.800999 |
| 4 | 46.3766 | 0.2000 | | |
| 5 | 45.9671 | 11.3706 | 81.54 | 1.496999 |
| 6 | −419.6274 | (d6) | | |
| 7 | −579.1168 | 1.4000 | 46.57 | 1.804000 |
| 8 | 63.8363 | 3.4452 | | |
| 9 | −52.7313 | 1.4000 | 49.34 | 1.743198 |
| 10 | 48.3987 | 4.2542 | 23.78 | 1.846660 |
| 11 | −107.9428 | 0.8861 | | |
| 12 | −61.0721 | 1.4000 | 46.57 | 1.804000 |
| 13 | −623.8156 | (d13) | | |
| 14 | ∞ | 1.0000 | Aperture Stop S | |
| 15 | 166.9626 | 3.9296 | 60.08 | 1.639999 |
| 16 | −58.2127 | 0.2000 | | |
| 17 | 57.0867 | 5.4967 | 81.54 | 1.496999 |
| 18 | −46.6872 | 1.4000 | 34.97 | 1.800999 |
| 19 | 1396.9076 | 0.2000 | | |
| 20 | 34.3256 | 3.4395 | 61.13 | 1.589130 |
| 21 | 91.8543 | (d21) | | |
| 22 | 203.1166 | 1.4000 | 23.78 | 1.846660 |
| 23 | 40.7958 | 3.2583 | 59.84 | 1.522494 |
| 24 | −258.7153 | 7.3113 | | |
| 25 | 302.9723 | 3.0588 | 27.79 | 1.740769 |
| 26 | −35.3253 | 0.2000 | | |
| 27 | −36.4959 | 1.4000 | 46.57 | 1.804000 |
| 28 | 40.5142 | 4.9030 | | |
| 29 | 51.7471 | 3.3861 | 33.79 | 1.647689 |
| 30 | −82.2838 | 9.1961 | | |
| 31 | −22.3825 | 1.4000 | 46.57 | 1.804000 |
| 32 | −41.2791 | (B.f.) | | |

| | Wide-angle end | Intermediate | Telephoto end |
|---|---|---|---|
| | [Variable Distances] (Infinity) | | |
| f | 71.39992 | 134.89970 | 293.99916 |
| D0 | ∞ | ∞ | ∞ |
| d2 | 15.80731 | 15.80731 | 15.80731 |
| d6 | 1.50000 | 34.04735 | 50.19310 |
| d13 | 29.37034 | 18.20055 | 1.00000 |
| d21 | 13.27877 | 12.96969 | 12.95602 |
| B.f. | 40.00001 | 47.68741 | 74.99998 |
| R | ∞ | ∞ | ∞ |
| | (Closest Shooting Distance) | | |
| M | −0.05859 | −0.11340 | −0.25277 |
| D0 | 1320.0000 | 1291.2441 | 1265.0000 |
| d2 | 1.48390 | 1.14166 | 0.81459 |
| d6 | 15.82341 | 48.71300 | 65.18582 |
| d13 | 29.37034 | 18.20055 | 1.00000 |
| d21 | 13.27877 | 12.96969 | 12.95602 |

TABLE 3-continued

| B.f. | 40.00001 | 47.68741 | 74.99998 |
|---|---|---|---|
| R | 1500.0000 | 1500.0000 | 1500.0000 |

[Values for Conditional Expressions]

(1) f1/fw = 1.823
(2) f2/fw = −0.449
(3) f1A/f1B = 3.778
(4) DAB/fw = 0.221
(5) f3/fw = 0.521
(6) f4/fw = −0.928
(7) (D34w − D34t) = 0.005
(8) ν1A = 64.14
(9) ν1BP − ν1BN = 46.57

Figure 10A:
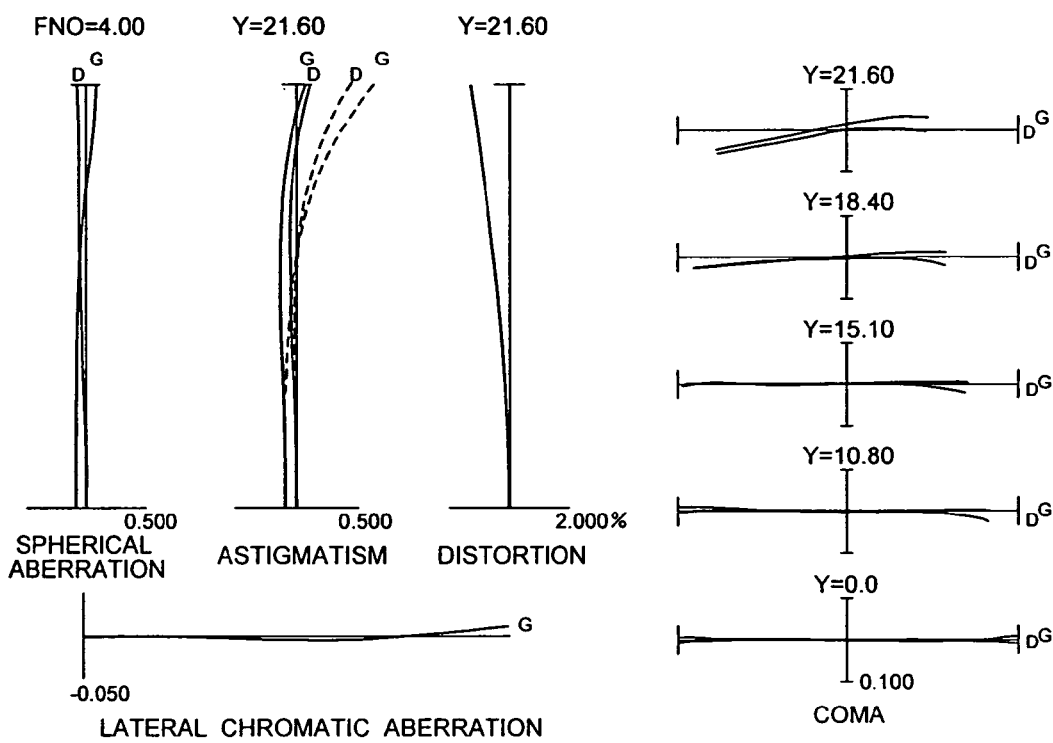
FIGS. 10A and 10B show various aberrations of the zoom lens system according to Example 3 of the first embodiment in a wide-angle end state upon focusing at infinity, and at a closest shooting distance (1500 mm), respectively.
Figure 10B:
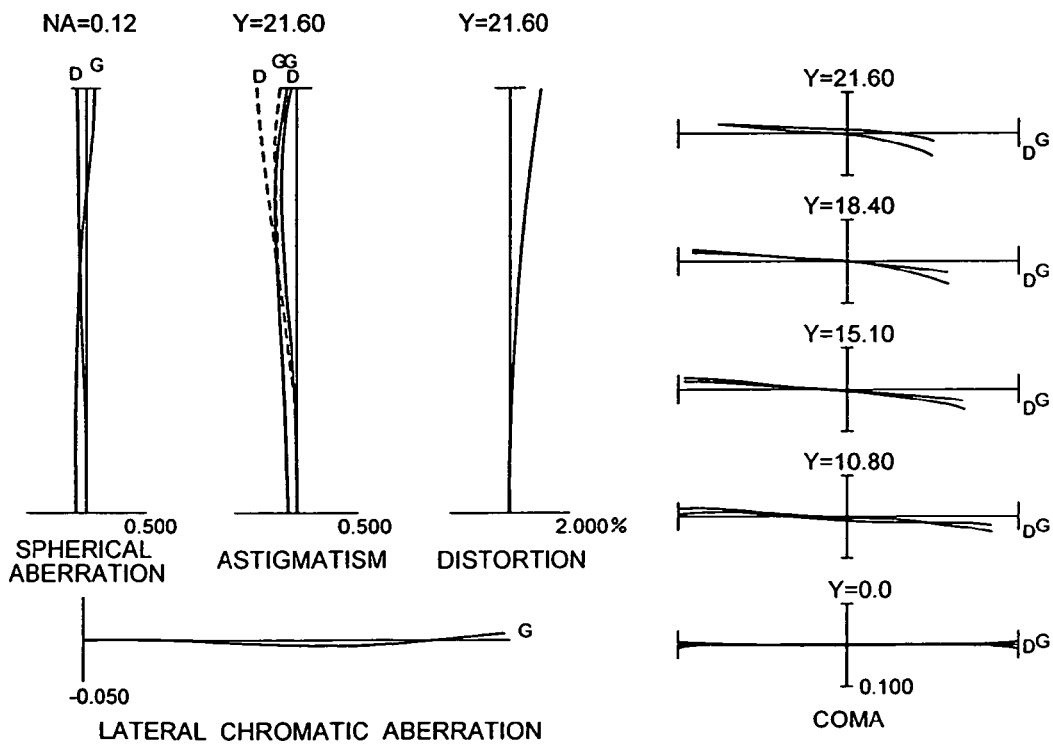
Figure 11A:
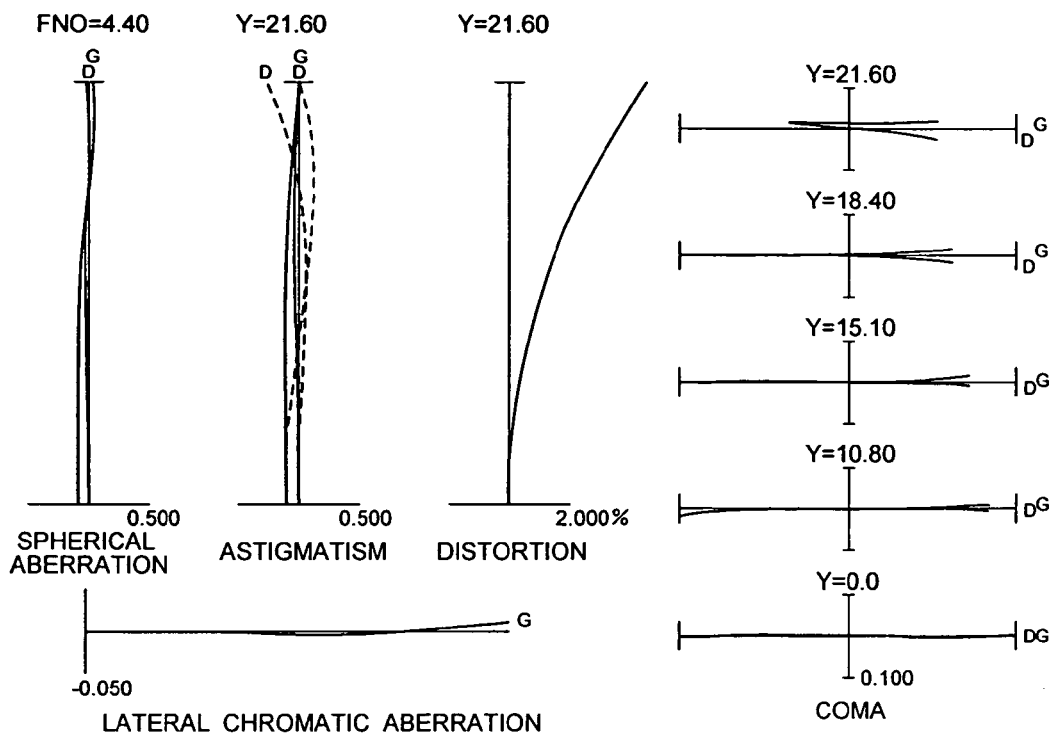
FIGS. 11A and 11B show various aberrations of the zoom lens system according to Example 3 of the first embodiment in an intermediate focal length state upon focusing at infinity, and at a closest shooting distance, respectively.
Figure 11B:
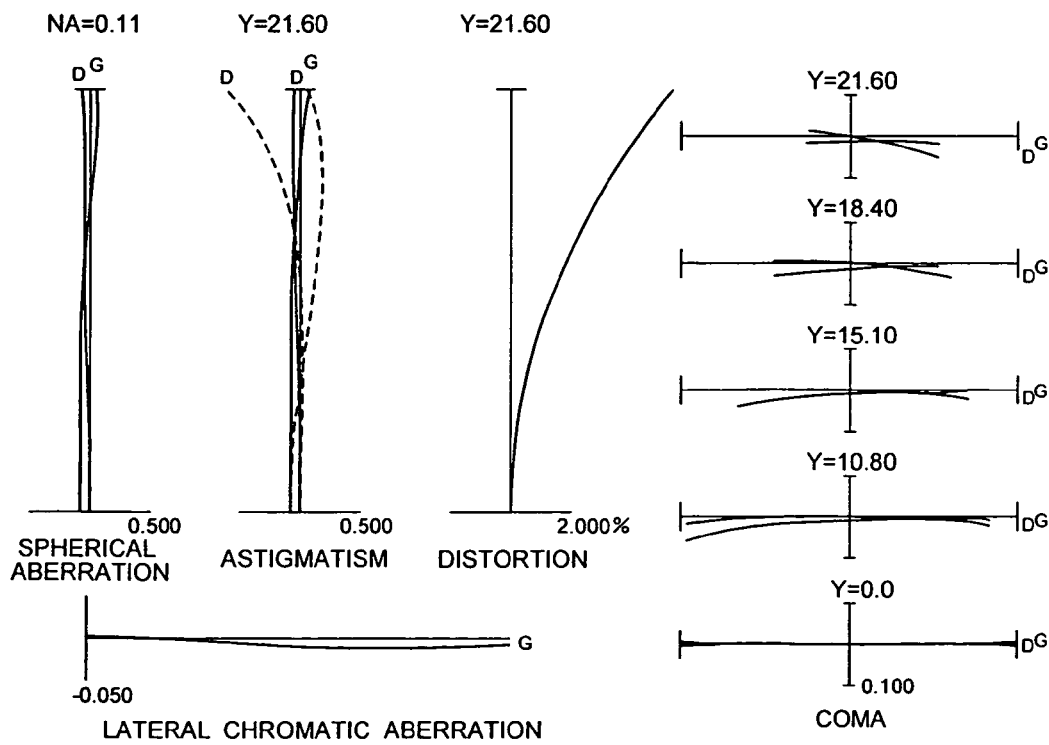
Figure 12A:
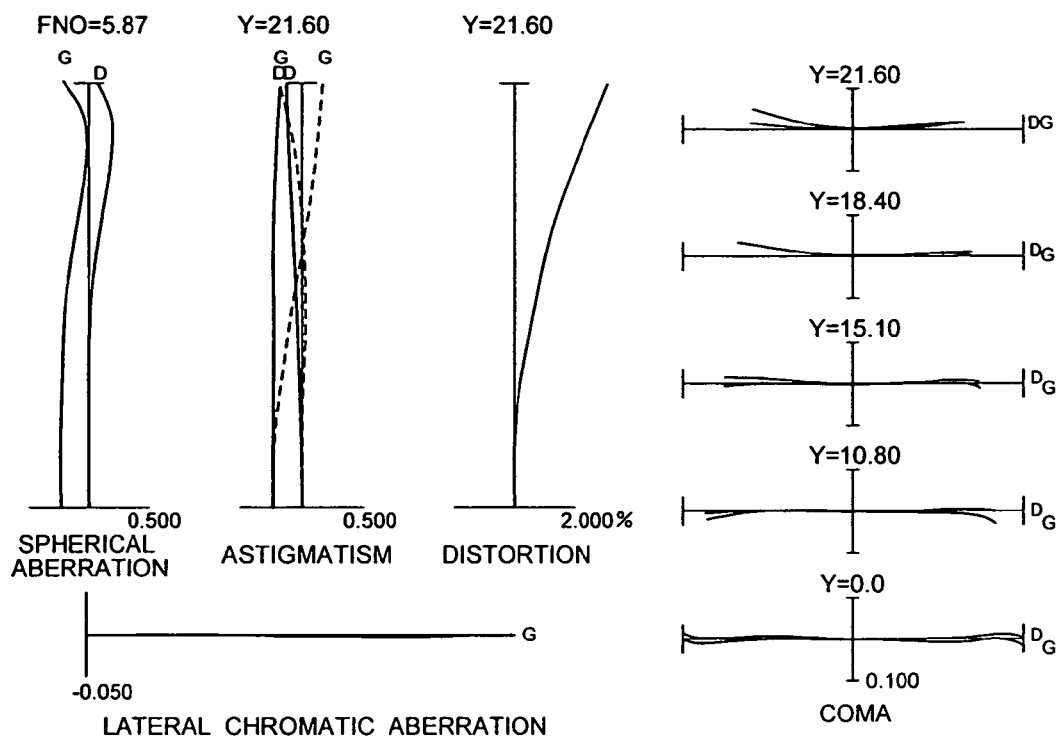
FIGS. 12A and 12B show various aberrations of the zoom lens system according to Example 3 of the first embodiment in a telephoto end state upon focusing at infinity, and at a closest shooting distance, respectively.
Figure 12B:
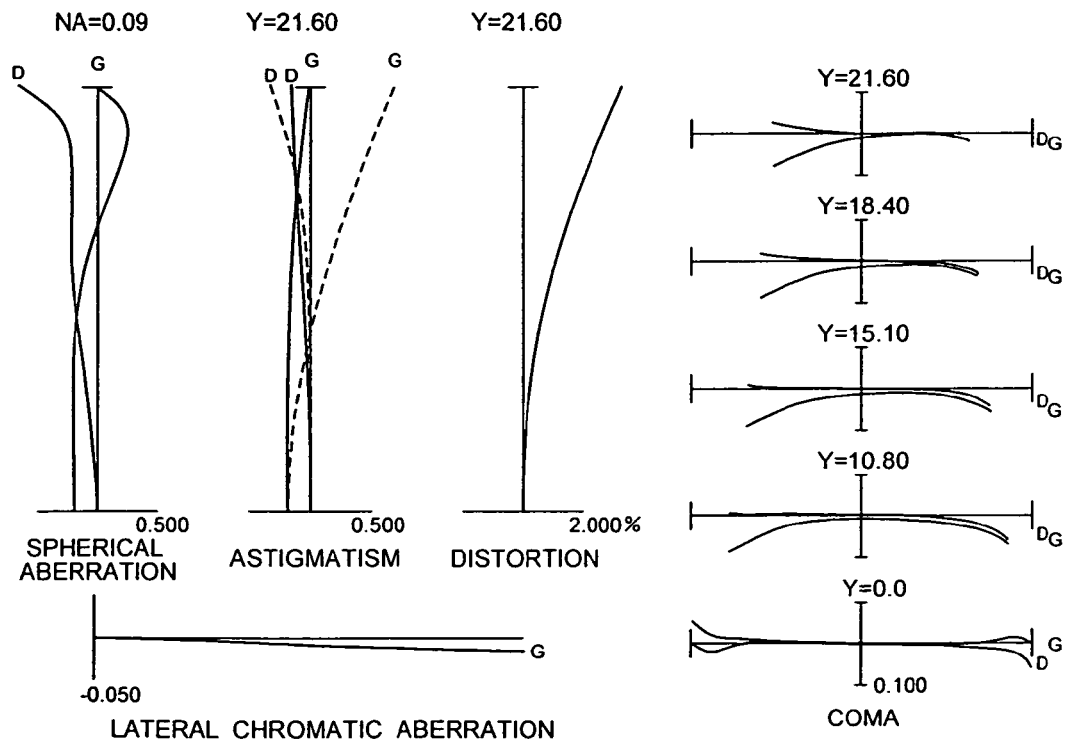

FIGS. 10A and 10B show various aberrations of the zoom lens system according to Example 3 of the first embodiment in a wide-angle end state upon focusing at infinity, and at a closest shooting distance (1500 mm), respectively. FIGS. 11A and 11B show various aberrations of the zoom lens system according to Example 3 of the first embodiment in an intermediate focal length state upon focusing at infinity, and at a closest shooting distance, respectively. FIGS. 12A and 12B show various aberrations of the zoom lens system according to Example 3 of the first embodiment in a telephoto end state upon focusing at infinity, and at a closest shooting distance, respectively.

As is apparent from respective graphs, the zoom lens system according to Example 3 of the first embodiment shows superb optical performance correcting various aberrations.

EXAMPLE 4

Figure 13:
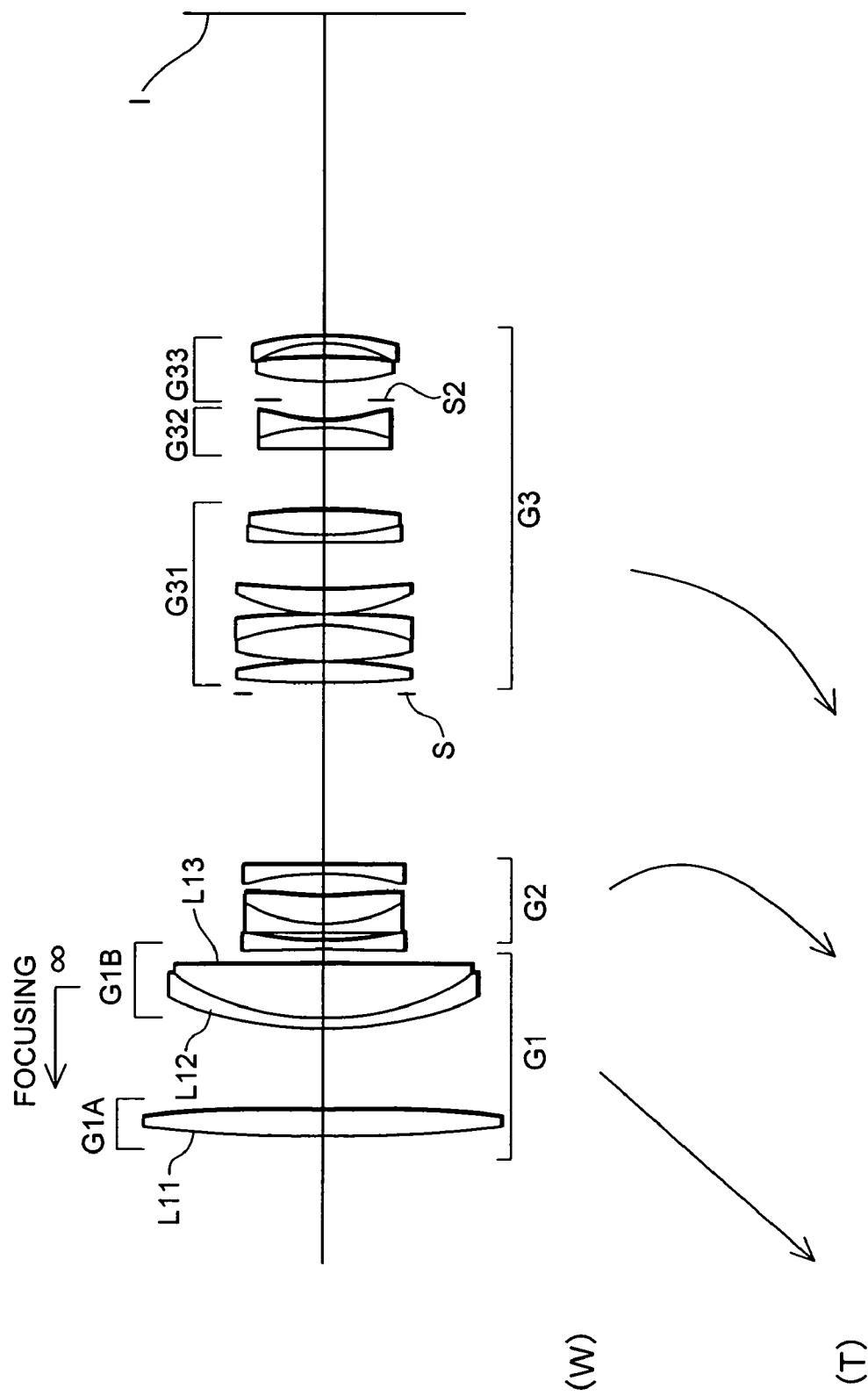
FIG. 13 is a diagram showing a sectional view of a zoom lens system according to Example 4 of the first embodiment of the present invention together with a trajectory of each lens group upon zooming.

FIG. 13 is a diagram showing a sectional view of a zoom lens system according to Example 4 of the first embodiment of the present invention together with a trajectory of each lens group upon zooming. In FIG. 13, the zoom lens system is composed of, in order from an object, a first lens group G1 having positive refractive power, a second lens group G2 having negative refractive power, and a third lens group G3 having positive refractive power. When the state of lens group positions varies from a wide-angle end state (W) to a telephoto end state (T), the first lens group G1 and the third lens group G3 move to the object and the second lens group G2 moves once to the image I and, then, moves to the object such that a distance between the first lens group G1 and the second lens group G2 increases, and a distance between the second lens group G2 and the third lens group G3 decreases.

The first lens group G1 is composed of, in order from the object, a 1A lens group G1A having positive refractive power, and a 1B lens group G1B having positive refractive power. The 1A lens group G1A is composed of a double convex positive lens L11. The 1B lens group G1B is composed of, in order from the object, a cemented lens constructed by a negative meniscus lens L12 having a convex surface facing to the object cemented with a double convex positive lens L13.

Focusing from infinity to a close-range object is carried out by moving only the 1B lens group G1B to the object.

The second lens group G2 is composed of, in order from the object, a double concave negative lens, a cemented lens constructed by a double concave negative lens cemented with a positive meniscus lens having a convex surface facing to the object, and a negative meniscus lens.

The third lens group G3 is composed of, in order from the object, a 31 lens group G31 having positive refractive power, a 32 lens group G32 having negative refractive power, and a 33 lens group G33 having positive refractive power. The 31 lens group G31 is composed of, in order from the object, a double convex positive lens, a first cemented lens constructed by a double convex positive lens cemented with a negative meniscus lens, a positive meniscus lens having a convex surface facing to the object, and a second cemented lens constructed by a negative meniscus lens having a convex surface facing to the object cemented with a double convex positive lens. The 32 lens group G32 is composed of, in order from the object, a cemented lens constructed by a double convex positive lens cemented with a double concave negative lens. The 33 lens group G33 is composed of, in order from the object, a fixed stop S2, a double convex positive lens, and a negative meniscus lens having a concave surface facing to the object.

An aperture stop S is arranged to the object side of the 31 lens group G31 and is moved together with the third lens group G3 upon zooming from the wide-angle end state (W) to the telephoto end state (T).

Various values associated with Example 4 is listed in Table 4.

TABLE 4

[Specifications]

| f = | 71.40 | 135.00 | 294.00 |
|---|---|---|---|
| FNO = | 4.64 | 4.85 | 5.88 |
| 2ω = | 34.46° | 17.55° | 8.20° |

[Lens Data]

| | r | d | ν | n |
|---|---|---|---|---|
| 1 | 340.6588 | 4.2 | 64.14 | 1.51633 |
| 2 | −340.659 | (d2) | | |
| 3 | 65.1639 | 1.8 | 26.3 | 1.784696 |
| 4 | 45.8381 | 8.8 | 81.61 | 1.496999 |
| 5 | −1308.92 | (d5) | | |
| 6 | −271.25 | 1.4 | 49.61 | 1.772499 |
| 7 | 71.7854 | 1.3 | | |
| 8 | −566.934 | 1.4 | 49.61 | 1.772499 |
| 9 | 24.4437 | 4.7 | 23.78 | 1.84666 |
| 10 | 133.0962 | 3.75 | | |
| 11 | −46.0918 | 1.4 | 49.61 | 1.772499 |
| 12 | 1927.614 | (d12) | | |
| 13 | ∞ | 2 | | Aperture Stop S |
| 14 | 188.6747 | 3.4 | 60.09 | 1.639999 |
| 15 | −72.245 | 0.2 | | |
| 16 | 73.7218 | 6 | 81.61 | 1.496999 |
| 17 | −38.1983 | 1.4 | 34.96 | 1.800999 |
| 18 | −154.661 | 0.2 | | |
| 19 | 32.255 | 4.2 | 52.42 | 1.517417 |
| 20 | 143.854 | 7.9 | | |
| 21 | 333.5741 | 1.3 | 23.78 | 1.84666 |
| 22 | 54.3293 | 4.1 | 70.24 | 1.48749 |
| 23 | −89.5707 | 10.2 | | |
| 24 | 256.9205 | 3.6 | 25.43 | 1.805181 |
| 25 | −35.5686 | 1.2 | 39.59 | 1.804398 |
| 26 | 35.5686 | 3.4 | | |
| 27 | ∞ | 3.1 | | Fixed Stop S2 |
| 28 | 47.0802 | 4 | 34.47 | 1.639799 |
| 29 | −96.8946 | 2.4 | | |
| 30 | −23.3234 | 1.2 | 49.61 | 1.772499 |
| 31 | −42.5579 | (B.f.) | | |

| | Wide-angle end | Intermediate | Telephoto end |
|---|---|---|---|
| | [Variable Distances] (Infinity) | | |
| f | 71.39993 | 134.99982 | 294.00047 |
| D0 | ∞ | ∞ | ∞ |
| d2 | 13.43865 | 13.43865 | 13.43865 |
| d5 | 2.49989 | 31.01849 | 43.01129 |

TABLE 4-continued

| | | | |
|---|---|---|---|
| d12 | 28.21141 | 18.59271 | 2.50011 |
| B.f. | 53.40008 | 57.30852 | 87.10064 |
| R | ∞ | ∞ | ∞ |
| (Closest Shooting Distance) | | | |
| M | −0.05775 | −0.11125 | −0.24755 |
| D0 | 1313.9000 | 1291.0916 | 1265.3993 |
| d2 | 2.36289 | 2.15893 | 1.91994 |
| d5 | 13.57565 | 42.29821 | 54.53000 |
| d12 | 28.21141 | 18.59271 | 2.50011 |
| B.f. | 53.40008 | 57.30852 | 87.10064 |
| R | 1500.0000 | 1500.0000 | 1500.0000 |

[Values for Conditional Expressions]

(1) f1/fw = 1.563
(2) f2/fw = −0.368
(3) f1A/f1B = 2.051
(4) DAB/fw = 0.188
(5) f3/fw = 0.525
(8) ν1A = 64.14
(9) ν1BP − ν1BN = 55.31

Figure 14A:
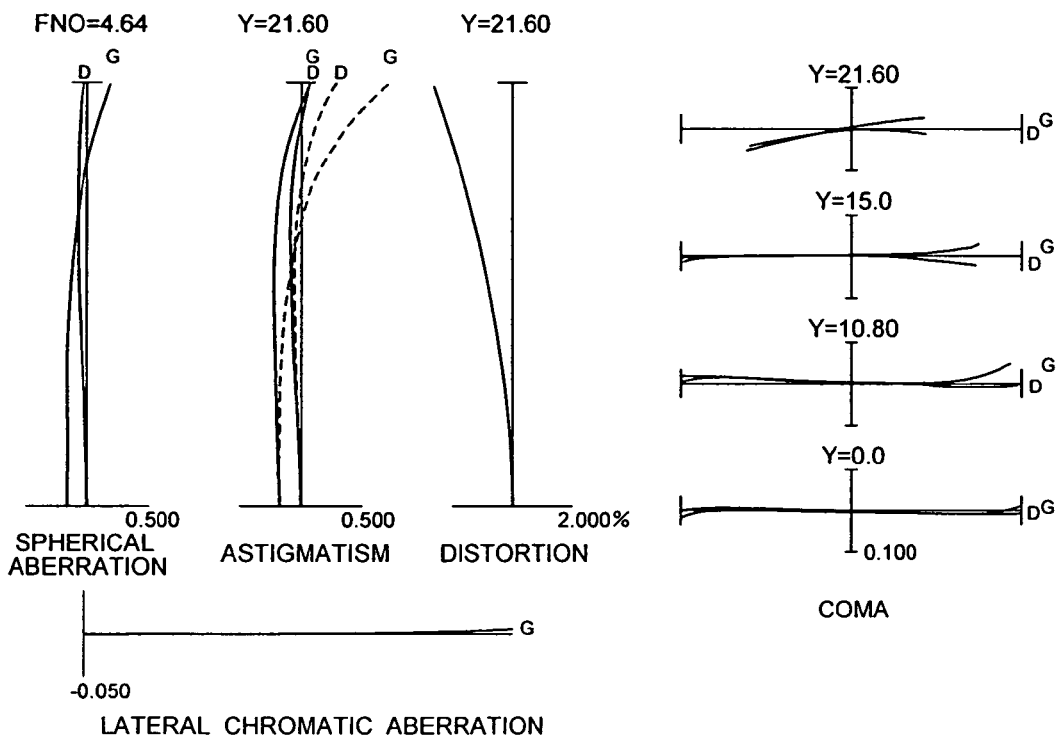
FIGS. 14A and 14B show various aberrations of the zoom lens system according to Example 4 of the first embodiment in a wide-angle end state upon focusing at infinity, and at a closest shooting distance (1500 mm), respectively.
Figure 14B:
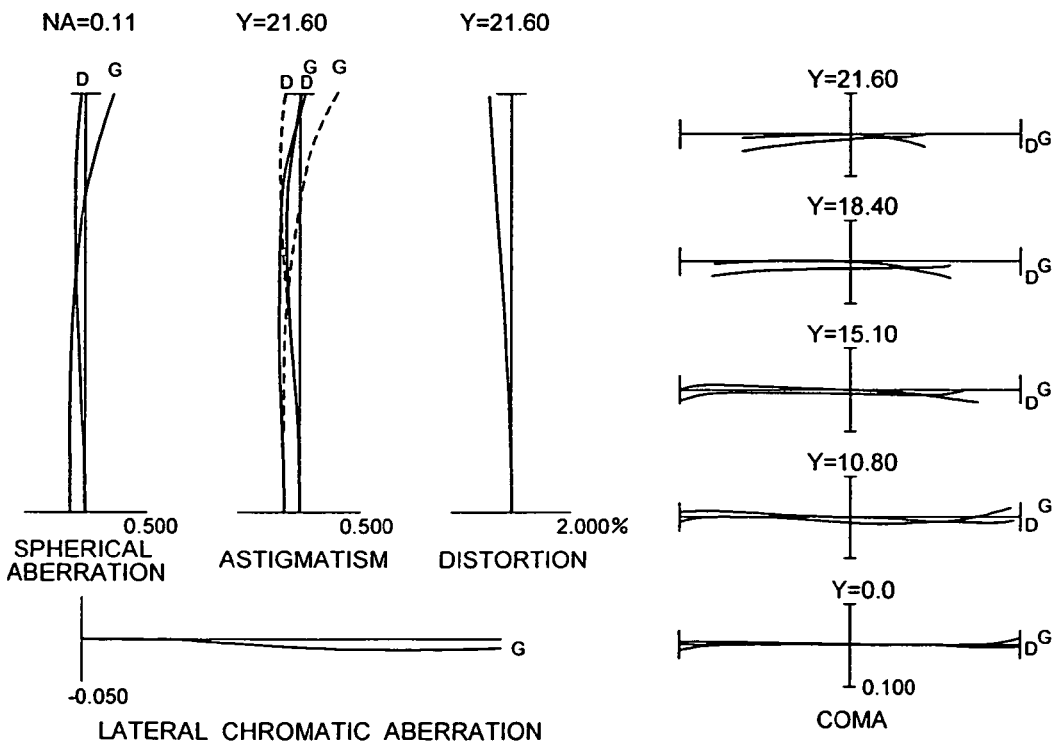
Figure 15A:
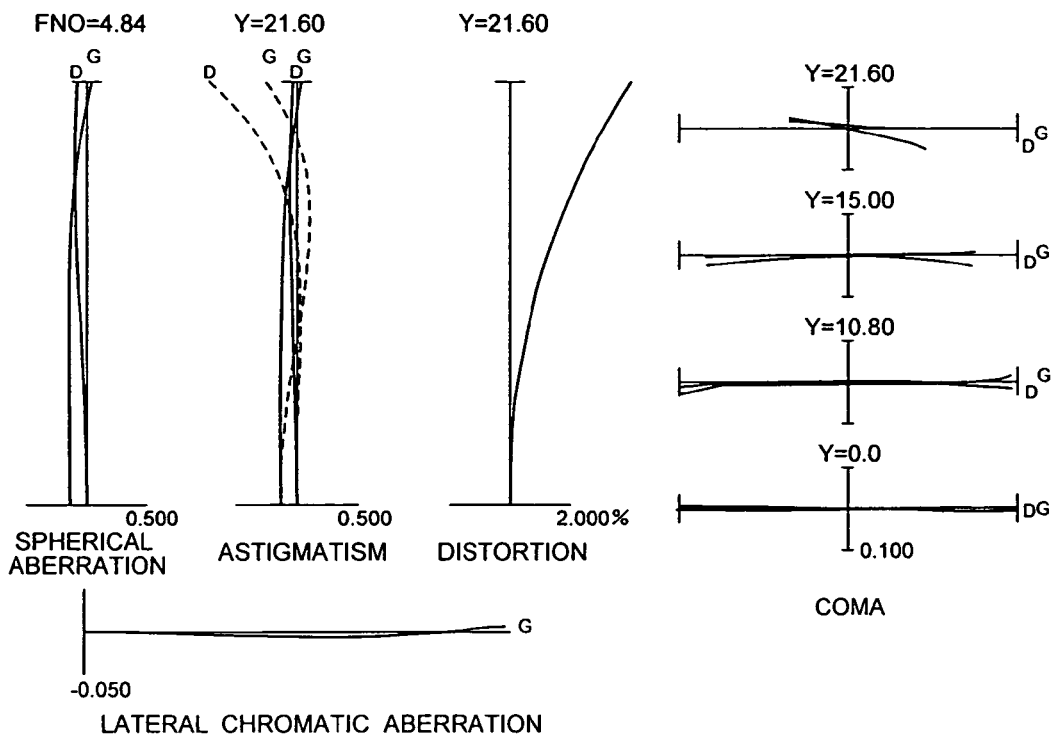
FIGS. 15A and 15B show various aberrations of the zoom lens system according to Example 4 of the first embodiment in an intermediate focal length state upon focusing at infinity, and at a closest shooting distance, respectively.
Figure 15B:
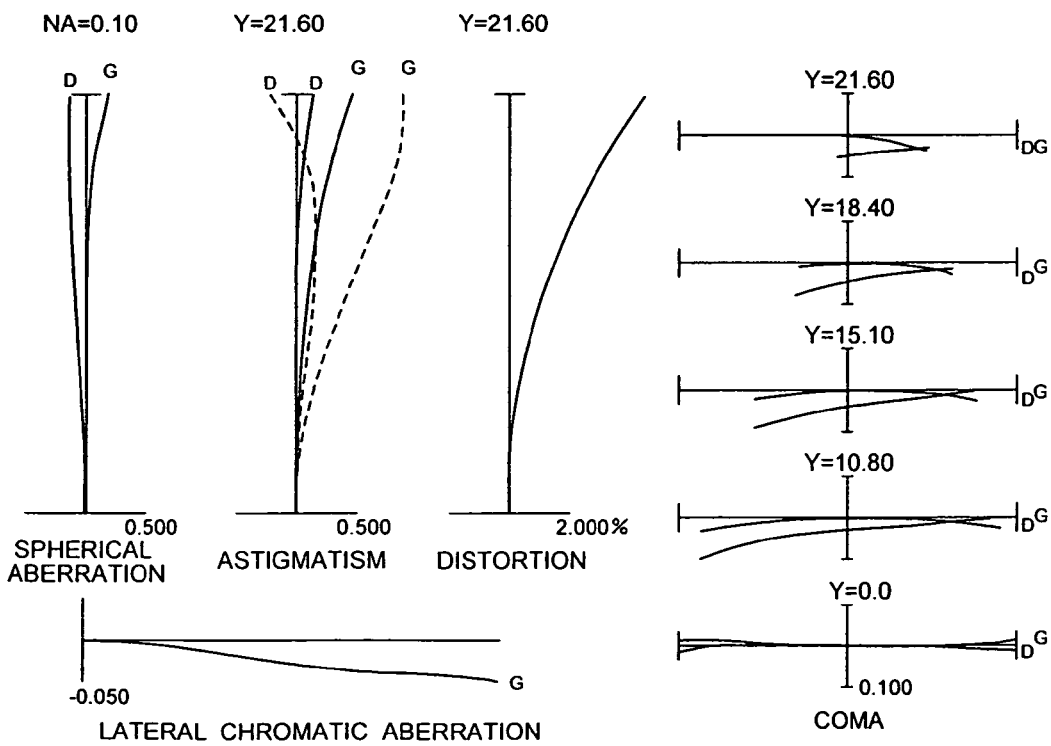
Figure 16A:
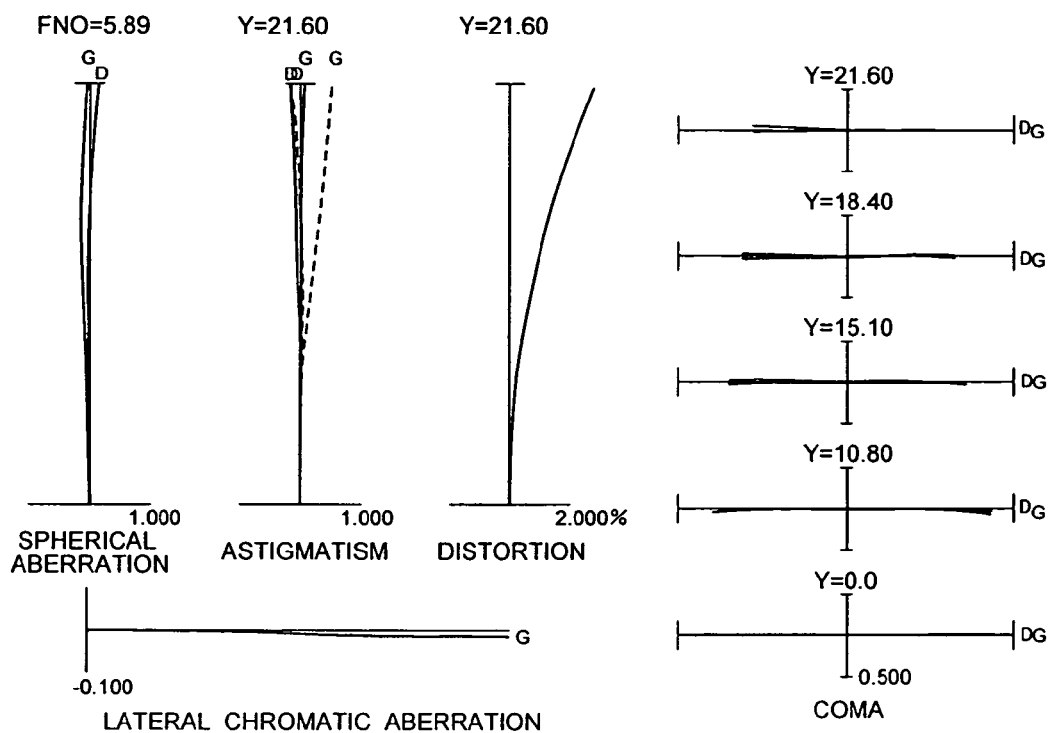
FIGS. 16A and 16B show various aberrations of the zoom lens system according to Example 4 of the first embodiment in a telephoto end state upon focusing at infinity, and at a closest shooting distance, respectively.
Figure 16B:
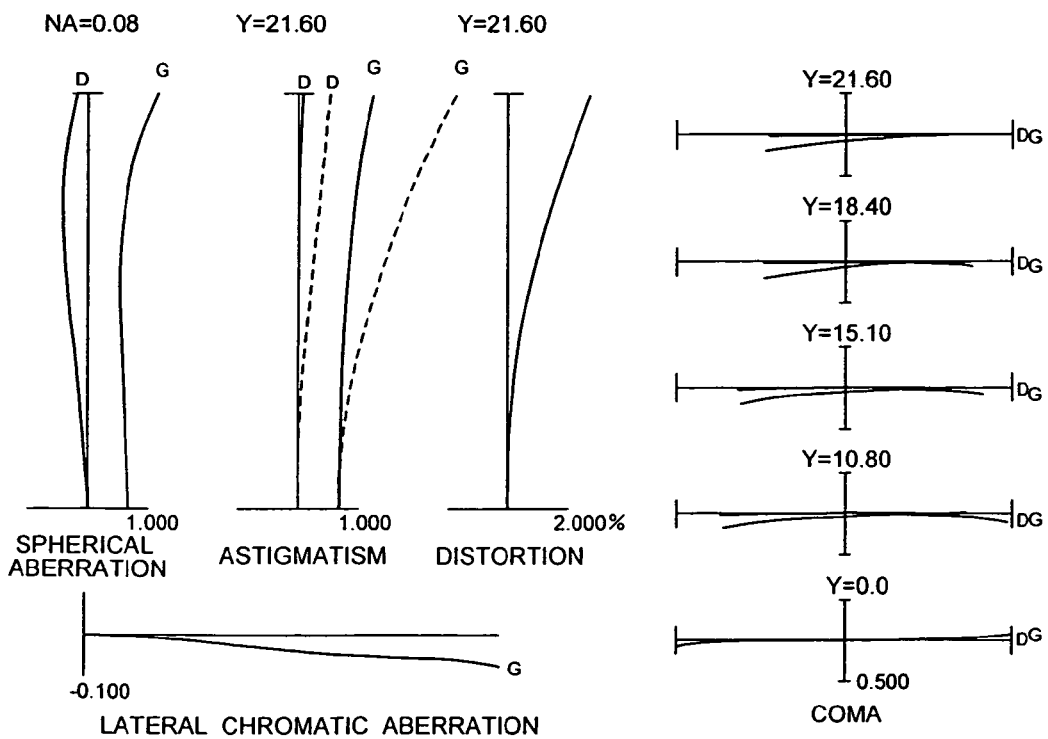

FIGS. 14A and 14B show various aberrations of the zoom lens system according to Example 4 of the first embodiment in a wide-angle end state upon focusing at infinity, and at a closest shooting distance (1500 mm), respectively. FIGS. 15A and 15B show various aberrations of the zoom lens system according to Example 4 of the first embodiment in an intermediate focal length state upon focusing at infinity, and at a closest shooting distance, respectively. FIGS. 16A and 16B show various aberrations of the zoom lens system according to Example 4 of the first embodiment in a telephoto end state upon focusing at infinity, and at a closest shooting distance, respectively.

As is apparent from respective graphs, the zoom lens system according to Example 4 of the first embodiment shows superb optical performance correcting various aberrations.

[Second Embodiment]

A zoom lens system according to a second embodiment of the present invention is explained below.

The zoom lens system with a vibration reduction mechanism according to the second embodiment of the present invention is composed of, in order from an object, a first lens group having positive refractive power, a second lens group having negative refractive power, a third lens group having positive refractive power, and a fourth lens group having negative refractive power. When the state of lens group positions varies from a wide-angle end state to a telephoto end state, a distance between the first lens group and the second lens group increases, a distance between the second lens group and the third lens group decreases, and a distance between the third lens group and fourth lens group varies. The construction is effective for shortening the total lens length.

The fourth lens group is composed of, in order from the object, a 41 lens group, a 42 lens group having negative refractive power, and a 43 lens group. At least one of the 41 lens group and the 43 lens group has positive refractive power. By moving only the 42 lens group perpendicular to the optical axis, image blur on an image plane caused by a camera shake can be reduced.

With constructing the fourth lens group having negative refractive power, the effective diameter of the fourth lens group can be small relative to those of the first lens group through the third lens group. Moreover, by constructing power arrangement of the fourth lens group with positive-negative-positive, positive-negative-negative, or negative-negative-positive, the effective diameter of the 42 lens group, which is the vibration reduction lens group, can be small. Accordingly, the vibration reduction mechanism can be compact, so that it is effective for the zoom lens system as a whole to be compact. By constructing in this manner, degradation of optical performance caused by moving the 42 lens group perpendicular to the optical axis can be reduced.

In the zoom lens system according to the second embodiment of the present invention, the following conditional expression (10) is preferably satisfied:

$$0.10 < f42/f4 < 0.90 \qquad (10)$$

where f4 denotes the focal length of the fourth lens group, and f42 denotes the focal length of the 42 lens group.

Conditional expression (10) defines an appropriate range of the focal length of the 42 lens group suitable for vibration reduction. When the ratio f42/f4 is equal to or exceeds the upper limit of conditional expression (10), negative refractive power of the 42 lens group becomes weak, so that an amount of decentering of the 42 lens required for vibration reduction becomes large. Accordingly, the vibration reduction mechanism becomes large, so that it becomes difficult to suppress the whole dimension of the zoom lens system to be compact. On the other hand, when the ratio f42/f4 is equal to or falls below the lower limit of conditional expression (10), negative refractive power of the 42 lens group becomes large. Accordingly, production of various aberrations in the 42 lens group becomes large, so that production of decentering aberration upon moving the 42 lens group for vibration reduction becomes large.

In order to further secure the effect of the present invention, it is desirable to set the lower limit of conditional expression (10) to 0.25 and the upper limit to 0.70.

In the zoom lens system according to the second embodiment of the present invention, the following conditional expressions (11) and (12) are preferably satisfied:

$$-2.10 < f4/fw < -0.70 \qquad (11)$$

$$-2.10 < (1/f41 + 1/f43) \cdot f4 < -0.40 \qquad (12)$$

where fw denotes the focal length of the zoom lens system in the wide-angle end state, f41 denotes the focal length of the 41 lens group, and f43 denotes the focal length of the 43 lens group.

Conditional expression (11) defines an appropriate range of the focal length of the fourth lens group suitable for miniaturizing the total length of the zoom lens system and the effective diameter of the fourth lens group. When the ratio f4/fw is equal to or exceeds the upper limit of conditional expression (11), negative refractive power of the fourth lens group becomes excessively large, so that it becomes difficult to satisfactorily correct aberrations. On the other hand, when the ratio f4/fw is equal to or falls below the lower limit of conditional expression (11), negative refractive power of the fourth lens group becomes small, so that it becomes difficult to miniaturize the total length of the zoom lens system and the effective diameter of the fourth lens group.

In order to further secure the effect of the present invention, it is desirable to set the lower limit of conditional expression (11) to −2.00 and the upper limit to −0.90.

Conditional expression (12) defines an appropriate range of the summation of refractive power of the 41 lens group and that of the 43 lens group suitable for miniaturizing the effective diameter of the 42 lens group. When the value $(1/f41+1/f43) \cdot f4$ is equal to or falls below the lower limit of conditional expression (12), the summation of refractive power of the 41 lens group and that of the 43 lens group becomes large, so that negative refractive power of the 42 lens group has to be large in order to obtain negative refractive power of the fourth lens group as a whole. As a result, production of various aberrations in the 42 lens group becomes large, so that production of decentering aberration caused by moving the 42 lens group for vibration reduction becomes large. On the other hand, when the value $(1/f41+1/f43) \cdot f4$ is equal to or exceeds the upper limit of conditional expression (12), the summation of refractive power of the 41 lens group and that of the 43 lens group becomes small, so that the effect of converging the light flux becomes weak. As a result, miniaturizing the effective diameter of the 42 lens group becomes insufficient.

In order to further secure the effect of the present invention, it is desirable to set the lower limit of conditional expression (12) to −2.00 and the upper limit to −0.50.

Moreover, the zoom lens system is preferably constructed such that when the state of lens group positions varies from the wide-angle end state to the telephoto end state, the first lens group, the third lens group, and the fourth lens group are moved to the object side. With this construction, the total lens length of the zoom lens system in the wide-angle end state can be compact.

Furthermore, it is preferable that the 41 lens group includes at least one positive lens element, the 42 lens group includes at least one positive lens element and at least one negative lens element, and the 43 lens group includes at least one positive lens element. With this construction, decentering aberration upon vibration reduction can be corrected well.

Furthermore, in the zoom lens system according to the second embodiment of the present invention, the 41 lens group includes, in order from the object, a negative lens having a concave surface facing to the object, a positive lens having a convex surface facing to the object, and the following conditional expression (13) is preferably satisfied:

$$0.20 < n41N - n41P \qquad (13)$$

where n41N denotes refractive index of the negative lens in the 41 lens group at d-line (λ=578.6 nm), and n41P denotes refractive index of the positive lens in the 41 lens group at d-line.

Conditional expression (13) is for satisfactorily correcting decentering aberration upon vibration reduction. When the value n41N−n41P is equal to or falls below the lower limit of conditional expression (13), it becomes difficult to correct decentering aberration upon vibration reduction. In order to further secure the effect of the present invention, it is desirable to set the lower limit of conditional expression (13) to 0.25.

In the zoom lens system according to the second embodiment of the present invention, the 42 lens group includes, in order from the object, a positive lens having a convex surface facing to the image, and a double concave negative lens, and the following conditional expression (14) is preferably satisfied:

$$10.0 < v42N - v42P \qquad (14)$$

where v42N denotes Abbe number of the double concave negative lens in the 42 lens group at d-line (λ=578.6 nm), and v42P denotes Abbe number of the positive lens in the 42 lens group at d-line.

Conditional expression (14) is for satisfactorily correcting decentering aberrations upon vibration reduction. When the value v42N−v42P is equal to or falls below the lower limit of conditional expression (14), it becomes difficult to correct lateral chromatic aberration produced by decentering upon vibration reduction. In order to further secure the effect of the present invention, it is desirable to set the lower limit of conditional expression (14) to 12.0.

In the zoom lens system according to the second embodiment of the present invention, it is preferable that the zoom lens system consists only of the first lens group, the second lens group, the third lens group, and the fourth lens group. By arranging no lens group with refractive power to the image side of the fourth lens group, the zoom lens system can be simple.

In the zoom lens system according to the second embodiment of the present invention, it is preferable that a fifth lens group having positive refractive power is arranged to the image side of the fourth lens group. With this construction, the degree of freedom for correcting aberration increases, so that various aberrations can be corrected easily.

Moreover, it is preferable that the first lens group as a whole is moved to the object upon focusing from infinity to a close-range object.

Furthermore, it is preferable that the second lens group as a whole is moved to the object upon focusing from infinity to a close-range object, and the following conditional expression (15) is preferably satisfied:

$$-0.98 < M2t < -0.8 \qquad (15)$$

where M2t denotes magnification of the second lens group in the telephoto end state.

When the value M2t is equal to or falls below the lower limit of conditional expression (15), the magnification becomes nearly to −1, so that focusing cannot be carried out. On the other hand, when the value M2t is equal to or exceeds the upper limit of conditional expression (15), it becomes difficult to obtain zoom ratio of about four. In order to further secure the effect of the present invention, it is desirable to set the upper limit of conditional expression (15) to −0.90.

In the zoom lens system according to the second embodiment of the present invention, it is preferable that the first lens group is composed of, in order from the object, a 1A lens group G1A having positive refractive power, and a 1B lens group G1B having positive refractive power, and focusing from infinity to a close-range object is carried out by moving only the 1B lens group to the object.

Each example of the second embodiment is explained below with reference to accompanying drawings.

EXAMPLE 5

FIG. 17 is a diagram showing a sectional view of a zoom lens system according to Example 5 of the second embodiment of the present invention together with a trajectory of each lens group upon zooming.

In FIG. 17, a zoom lens system with a vibration reduction mechanism according to Example 5 is composed of, in order from an object, a first lens group G1 having positive refractive power, a second lens group G2 having negative refractive power, a third lens group G3 having positive refractive power, and a fourth lens group G4 having negative refractive power. When the state of lens group positions varies from a wide-angle end state (W) to a telephoto end state (T), the first lens group G1, the third lens group G3, and the fourth lens group G4 move to the object and the second lens group G2 moves once to an image I and, then, moves to the object such that a distance between the first lens group G1 and the second lens group G2 increases, a distance between the second lens group G2 and the third lens group G3 decreases, and a distance between the third lens group G3 and the fourth lens group G4 increases.

The first lens group G1 is composed of, in order from the object, a cemented lens constructed by a negative meniscus lens having a convex surface facing to the object cemented with a double convex positive lens, and a positive meniscus lens having a convex surface facing to the object.

The second lens group G2 is composed of, in order from the object, a cemented lens constructed by a positive meniscus lens having a concave surface facing to the object cemented with a double concave negative lens, and a double concave negative lens.

The third lens group G3 is composed of, in order from the object, a double convex positive lens, a cemented lens constructed by a double convex positive lens cemented with a negative meniscus lens having a concave surface facing to the object, and a positive meniscus lens having a convex surface facing to the object.

An aperture stop S is arranged between a double convex positive lens and a cemented lens in the third lens group G3 and is moved together with the third lens group G3 upon zooming from the wide-angle end state (W) to the telephoto end state (T).

The fourth lens group G4 is composed of, in order from the object, a 41 lens group G41 having negative refractive power, a 42 lens group G42 having negative refractive power, and a 43 lens group G43 having positive refractive power. The 41 lens group G41 is composed of, in order from the object, a cemented lens constructed by a negative meniscus lens L41 having a convex surface facing to the object cemented with a positive meniscus lens L42 having a convex surface facing to the object. The 42 lens group G42 is composed of, in order from the object, a positive meniscus lens L43 having a concave surface facing to the object, and a double concave negative lens L44. The 43 lens group G43 is composed of, in order from the object, a double convex positive lens L45, and a positive meniscus lens L46 having convex surface facing to the object.

Upon detecting a camera shake, vibration reduction on the image plane I is carried out by moving only the 42 lens group G42 perpendicular to the optical axis.

Focusing from infinity to a close-range object is carried out by moving the first lens group G1 to the object.

In order to correct an image movement corresponding to a rotational angle of θ by a lens system having the focal length of f, and vibration reduction coefficient (the ratio of the moving amount of the image to the moving amount of the vibration reduction lens group upon carrying out vibration reduction) of K, the vibration reduction lens group may be moved by the amount of (f·tan θ)/K perpendicular to the optical axis. This relation is the same in the following examples and duplicated explanation is omitted.

In the wide-angle end state (W) of Example 5 of the second embodiment, vibration reduction coefficient K is 1.206, and the focal length f is 71.50 (mm), so that the image rotation of 0.30° can be corrected by moving the 42 lens group G42 by the amount of 0.311 (mm). In the telephoto end state (T), vibration reduction coefficient K is 1.800, and the focal length f is 294.00 (mm), so that the image rotation of 0.15° can be corrected by moving the 42 lens group G42 by the amount of 0.428 (mm).

Various values associated with Example 5 of the second embodiment of the present invention is listed in Table 5.

In [Moving Amount upon Focusing], δ1 denotes a moving amount of the first lens group G1 to the object side focusing at the shooting distance of 1500 (mm).

TABLE 5

[Specifications]

| f = | 71.50 | 134.90 | 294.00 |
|---|---|---|---|
| FNO = | 4.43 | 4.78 | 5.83 |
| 2ω = | 34.69° | 17.82° | 8.25° |

[Lens Data]

| | r | d | ν | n |
|---|---|---|---|---|
| 1 | 106.9922 | 1.4000 | 30.13 | 1.698947 |
| 2 | 63.9533 | 8.5690 | 81.54 | 1.496999 |
| 3 | −244.9710 | 0.2000 | | |
| 4 | 126.9321 | 2.8438 | 53.20 | 1.693501 |
| 5 | 216.9031 | (d5) | | |
| 6 | −811.4085 | 3.2995 | 23.78 | 1.846660 |
| 7 | −45.9839 | 1.0000 | 60.08 | 1.639999 |
| 8 | 53.9629 | 3.6848 | | |
| 9 | −41.3222 | 1.0000 | 46.57 | 1.804000 |
| 10 | 403.6997 | (d10) | | |
| 11 | 117.0360 | 3.4927 | 46.57 | 1.804000 |
| 12 | −100.5857 | 1.5000 | | |
| 13 | ∞ | 1.0480 | | Aperture Stop S |
| 14 | 52.7514 | 5.2513 | 81.54 | 1.496999 |
| 15 | −62.0004 | 1.0000 | 34.97 | 1.800999 |
| 16 | −445.4607 | 0.2000 | | |
| 17 | 37.5205 | 2.9883 | 81.54 | 1.496999 |
| 18 | 74.7018 | (d18) | | |
| 19 | 52.6572 | 1.4000 | 23.78 | 1.846660 |
| 20 | 16.3065 | 4.5499 | 45.78 | 1.548141 |
| 21 | 76.4617 | 12.6826 | | |
| 22 | −126.2398 | 3.9806 | 28.46 | 1.728250 |
| 23 | −20.5284 | 0.2000 | | |
| 24 | −20.6563 | 1.4000 | 46.57 | 1.804000 |
| 25 | 46.6744 | 4.6040 | | |
| 26 | 2036.2018 | 2.3561 | 29.23 | 1.721507 |
| 27 | −113.7498 | 0.2000 | | |
| 28 | 47.0423 | 3.6545 | 34.97 | 1.800999 |
| 29 | 343.9390 | (B.f.) | | |

| | Wide-angle end | Intermediate | Telephoto end |
|---|---|---|---|
| | [Variable Distances] | | |
| f | 71.50000 | 134.90000 | 294.00000 |
| d5 | 1.55195 | 36.01475 | 55.38418 |
| d10 | 34.15302 | 21.90257 | 1.00000 |
| d18 | 18.78991 | 19.40071 | 22.11070 |
| B.f. | 42.99999 | 49.92314 | 69.00000 |
| | [Moving Amount upon Focusing] | | |
| f | 71.500 | 134.900 | 294.000 |
| δ1 | 14.446 | 14.822 | 15.090 |

[Values for Conditional Expressions]

(10) f42/f4 = 0.356
(11) f4/fw = −1.483
(12) (1/f41 + 1/f43) · f4 = −1.309
(13) n41N − n41P = 0.298
(14) ν42N − ν42P = 28.11
(15) M2t = —

Figure 18A:
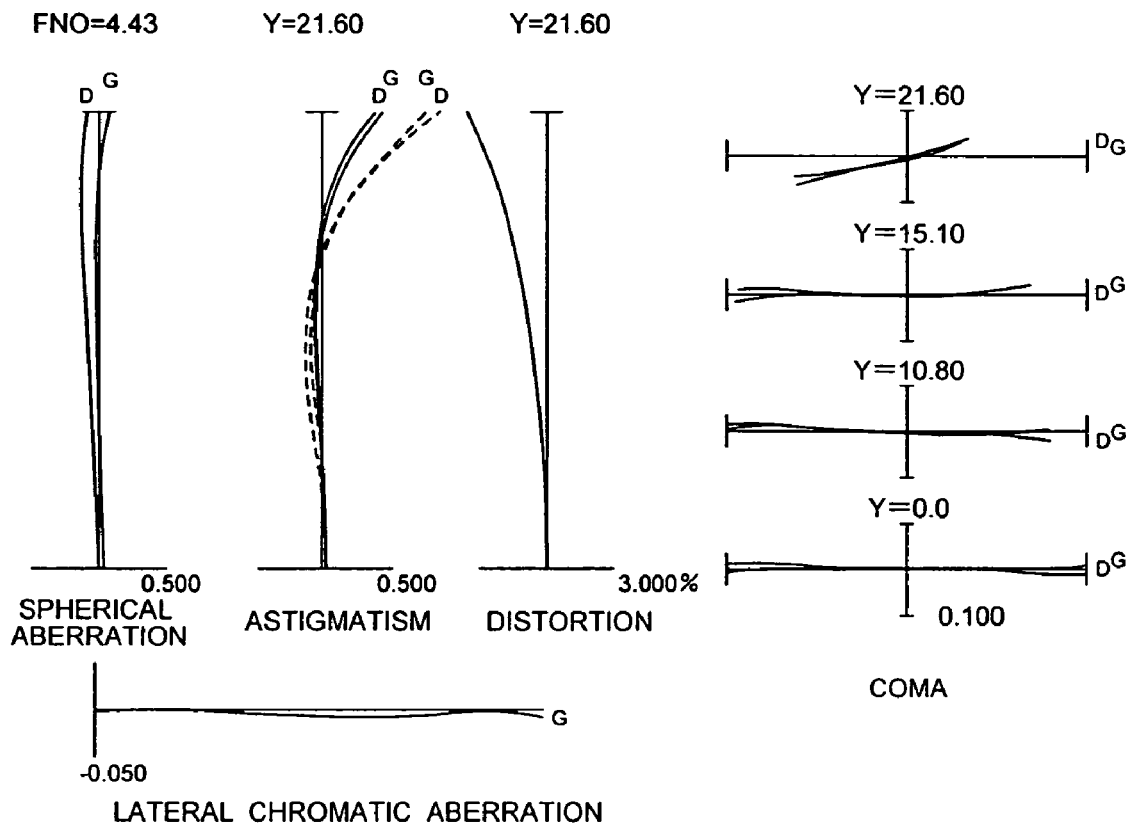
FIGS. 18A and 18B show various aberrations of the zoom lens system according to Example 5 of the second embodiment in a wide-angle end state upon focusing at infinity, and meridional lateral aberration at infinity when vibration reduction is carried out against rotation of 0.30°, respectively.
Figure 18B:
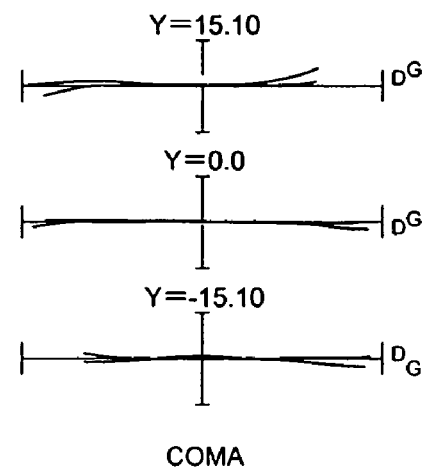
Figure 19:
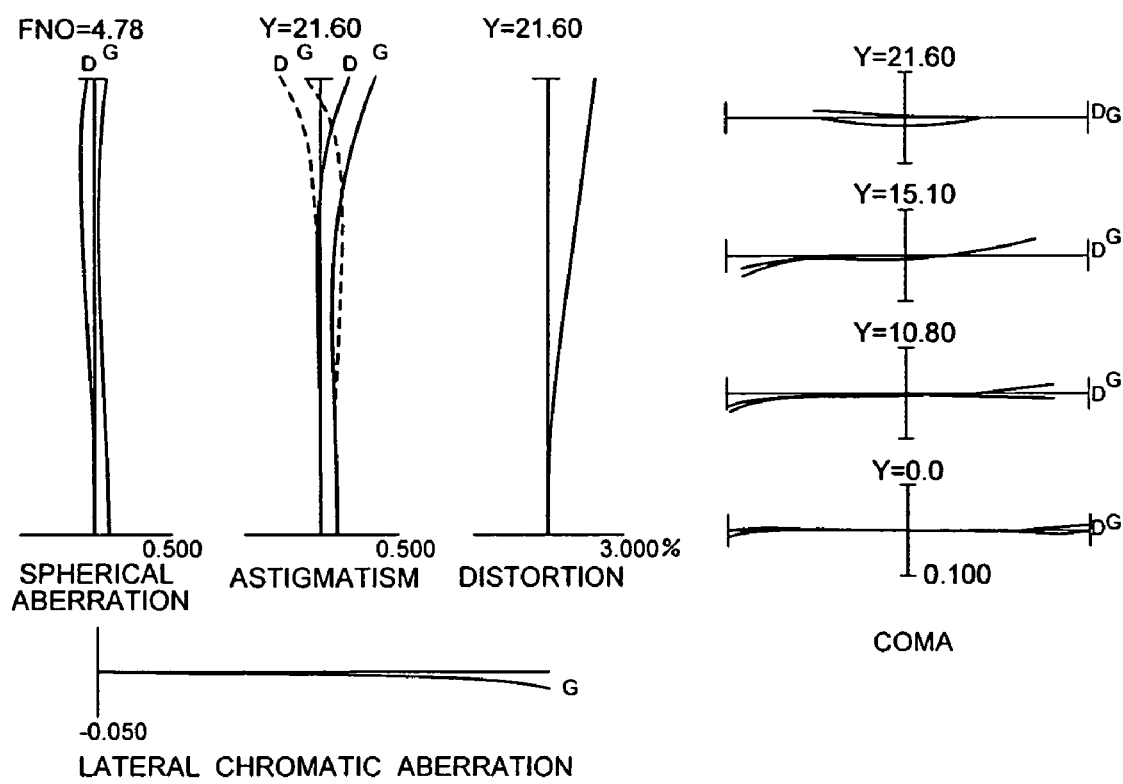
FIG. 19 shows various aberrations of the zoom lens system according to Example 5 of the second embodiment in an intermediate focal length state upon focusing at infinity.
Figure 20A:
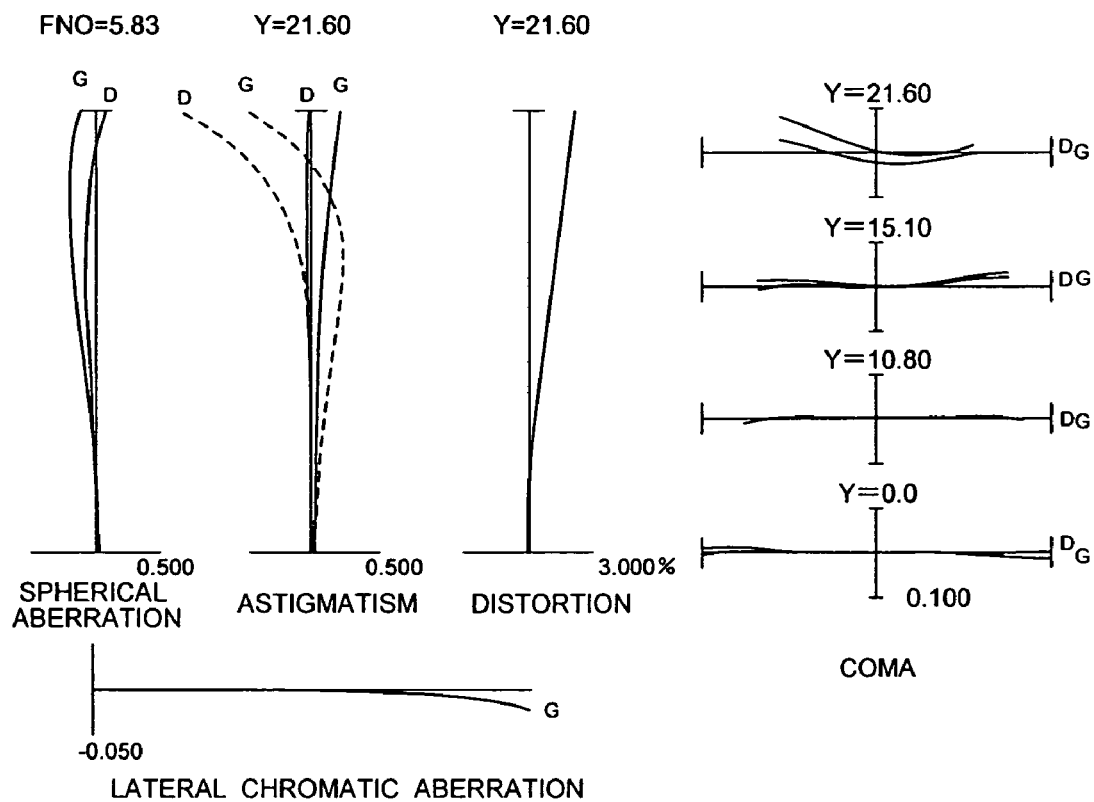
FIGS. 20A and 20B show various aberrations of the zoom lens system according to Example 5 of the second embodiment in a telephoto end state upon focusing at infinity, and meridional lateral aberration at infinity when vibration reduction is carried out against rotation of 0.15°, respectively.
Figure 20B:
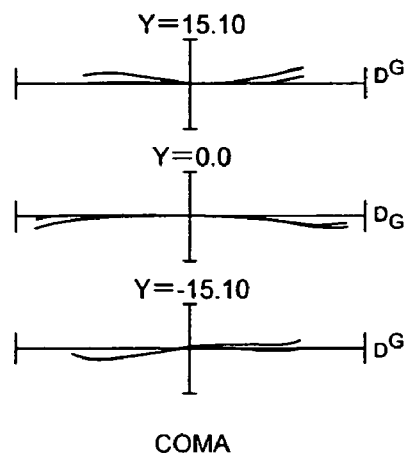

FIGS. 18A and 18B show various aberrations of the zoom lens system according to Example 5 of the second embodiment in a wide-angle end state upon focusing at infinity, and meridional lateral aberration at infinity when vibration reduction is carried out against rotation of 0.30°, respectively. FIG. 19 shows various aberrations of the zoom lens system according to Example 5 of the second embodiment in an intermediate focal length state upon focusing at infinity. FIGS. 20A and 20B show various aberrations of the zoom lens system according to Example 5 of the first embodiment in a telephoto end state upon focusing at infinity, and meridional lateral aberration at infinity when vibration reduction is carried out against rotation of 0.15°, respectively.

As is apparent from respective graphs, the zoom lens system according to Example 5 of the second embodiment shows superb optical performance correcting various aberrations.

EXAMPLE 6

FIG. 21 is a diagram showing a sectional view of a zoom lens system according to Example 6 of the second embodiment of the present invention together with a trajectory of each lens group upon zooming.

In FIG. 21, a zoom lens system with a vibration reduction mechanism according to Example 6 is composed of, in order from an object, a first lens group G1 having positive refractive power, a second lens group G2 having negative refractive power, a third lens group G3 having positive refractive power, and a fourth lens group G4 having negative refractive power. When the state of lens group positions varies from a wide-angle end state (W) to a telephoto end state (T), the first lens group G1, the third lens group G3, and the fourth lens group G4 move to the object and the second lens group G2 moves once to an image I and, then, moves to the object such that a distance between the first lens group G1 and the second lens group G2 increases, a distance between the second lens group G2 and the third lens group G3 decreases, and a distance between the third lens group G3 and the fourth lens group G4 varies.

The first lens group G1 is composed of, in order from the object, a cemented lens constructed by a negative meniscus lens having a convex surface facing to the object cemented with a double convex positive lens, and a positive meniscus lens having a convex surface facing to the object.

The second lens group G2 is composed of, in order from the object, a double concave negative lens, a cemented lens constructed by a double convex positive lens cemented with a double concave negative lens, and a negative meniscus lens having a concave surface facing to the object.

The third lens group G3 is composed of, in order from the object, a double convex positive lens, a cemented lens constructed by a double convex positive lens cemented with a double concave negative lens, and a positive meniscus lens having a convex surface facing to the object.

An aperture stop S is arranged to the object side of the third lens group G3 and is moved together with the third lens group G3 upon zooming from the wide-angle end state (W) to the telephoto end state (T).

The fourth lens group G4 is composed of, in order from the object, a 41 lens group G41 having positive refractive power, a 42 lens group G42 having negative refractive power, and a 43 lens group G43 having positive refractive power. The 41 lens group G41 is composed of, in order from the object, a cemented lens constructed by a negative meniscus lens L41 having a convex surface facing to the object cemented with a double convex positive lens L42. The 42 lens group G42 is composed of, in order from the object, a double convex positive lens L43, and a double concave negative lens L44. The 43 lens group G43 is composed of, in order from the object, a double convex positive lens L45, and a negative meniscus lens L46 having concave surface facing to the object.

Upon detecting a camera shake, vibration reduction on the image plane I is carried out by moving only the 42 lens group G42 perpendicular to the optical axis.

Focusing from infinity to a close-range object is carried out by moving the second lens group G2 to the object.

In the wide-angle end state (W) of Example 6 of the second embodiment, vibration reduction coefficient K is 1.054, and the focal length f is 71.40 (mm), so that the image rotation of 0.30° can be corrected by moving the 42 lens group G42 by the amount of 0.355 (mm). In the telephoto end state (T), vibration reduction coefficient K is 1.800, and the focal length f is 294.00 (mm), so that the image rotation of 0.15° can be corrected by moving the 42 lens group G42 by the amount of 0.428 (mm).

Various values associated with Example 6 of the second embodiment of the present invention is listed in Table 6.

In [Moving Amount upon Focusing], δ2 denotes a moving amount of the second lens group G2 to the object side focusing at the shooting distance of 1500 (mm).

TABLE 6

| [Specifications] | | | |
|---|---|---|---|
| f = | 71.40 | 134.90 | 294.00 |
| FNO = | 4.03 | 4.61 | 5.83 |
| 2ω = | 34.73° | 17.96° | 8.29° |

| [Lens Data] | | | |
|---|---|---|---|
| | r | d | ν | n |
|---|---|---|---|---|
| 1 | 110.3430 | 1.8000 | 29.23 | 1.721507 |
| 2 | 69.3904 | 7.9665 | 81.54 | 1.496999 |
| 3 | −294.8326 | 0.2000 | | |
| 4 | 122.8189 | 2.6850 | 58.55 | 1.651597 |
| 5 | 181.6203 | (d5) | | |
| 6 | −3611.5709 | 1.4000 | 47.82 | 1.756998 |
| 7 | 49.7266 | 0.4871 | | |
| 8 | 57.7644 | 5.3831 | 23.78 | 1.846660 |
| 9 | −42.0999 | 1.4000 | 36.26 | 1.620041 |
| 10 | 53.1079 | 4.0773 | | |
| 11 | −38.0886 | 1.4000 | 34.97 | 1.800999 |
| 12 | −502.7476 | (d12) | | |
| 13 | ∞ | 1.0000 | Aperture Stop S | |
| 14 | 97.5978 | 3.6622 | 58.55 | 1.651597 |
| 15 | −81.8300 | 0.2000 | | |
| 16 | 48.0953 | 4.9666 | 81.54 | 1.496999 |
| 17 | −62.0949 | 1.4000 | 34.97 | 1.800999 |
| 18 | 268.7785 | 0.2000 | | |
| 19 | 38.8902 | 3.2836 | 55.53 | 1.696797 |
| 20 | 54.2852 | (d20) | | |
| 21 | 78.0173 | 2.0000 | 23.78 | 1.846660 |
| 22 | 24.6186 | 3.7355 | 64.14 | 1.516330 |
| 23 | −185.3460 | 3.0000 | | |
| 24 | 176.2975 | 4.6442 | 27.79 | 1.740769 |
| 25 | −25.6263 | 0.2072 | | |
| 26 | −25.4689 | 1.4000 | 40.92 | 1.806098 |
| 27 | 35.9916 | 3.3747 | | |
| 28 | 32.3977 | 4.1609 | 30.13 | 1.698947 |
| 29 | −160.3892 | 4.5174 | | |
| 30 | −28.3572 | 1.4000 | 61.13 | 1.589130 |
| 31 | −96.5409 | (B.f.) | | |

| | Wide-angle end | Intermediate | Telephoto end |
|---|---|---|---|
| | [Variable Distances] | | |
| f | 71.40045 | 134.89998 | 293.99991 |
| d5 | 4.92513 | 37.53918 | 59.35524 |
| d12 | 35.77592 | 21.59232 | 1.00000 |
| d20 | 24.34764 | 24.24866 | 24.69346 |
| B.f. | 40.00576 | 51.49527 | 75.00890 |
| | [Moving Amount upon Focusing] | | |
| f | 71.400 | 134.900 | 294.000 |
| δ2 | 2.762 | 6.788 | 17.131 |

TABLE 6-continued

[Values for Conditional Expressions]

(10) f42/f4 = 0.366
(11) f4/fw = −1.891
(12) (1/f41 + 1/f43) · f4 = −1.866
(13) n41N − n41P = 0.330
(14) ν42N − ν42P = 13.13
(15) M2t = −0.950

Figure 22A:
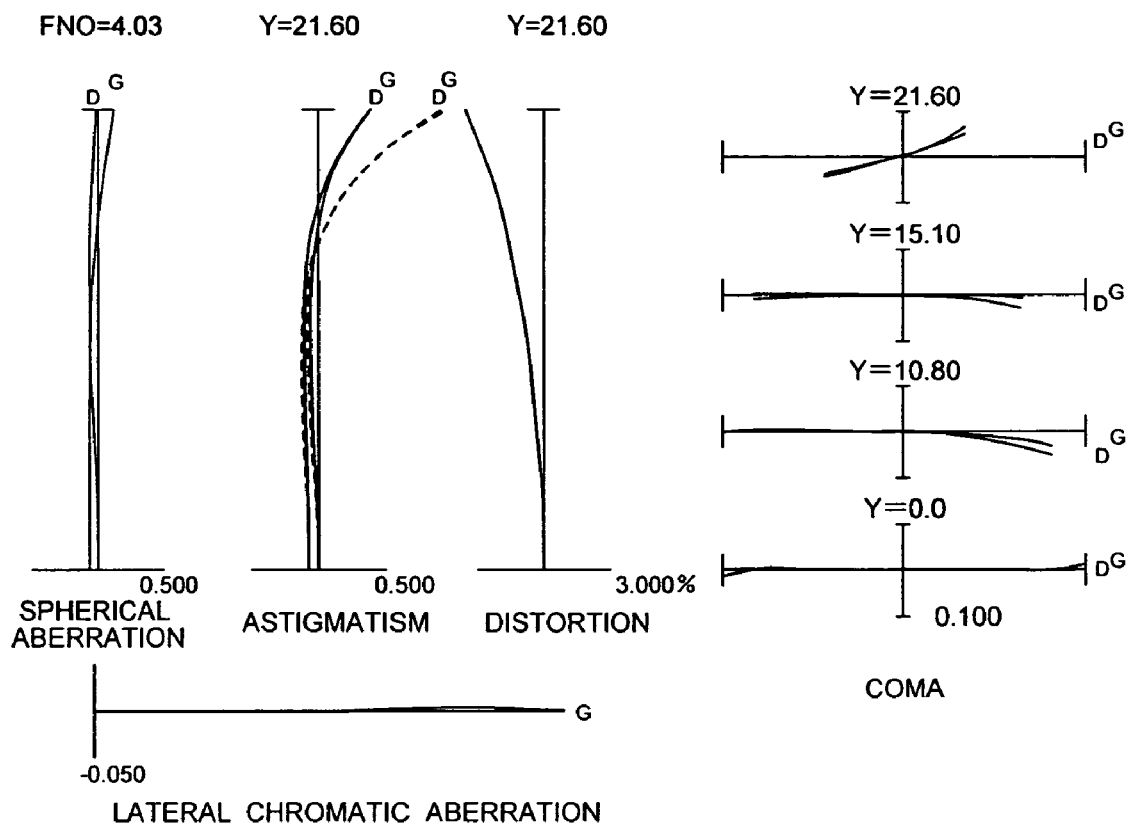
FIGS. 22A and 22B show various aberrations of the zoom lens system according to Example 6 of the second embodiment in a wide-angle end state upon focusing at infinity, and meridional lateral aberration at infinity when vibration reduction is carried out against rotation of 0.30°, respectively.
Figure 22B:
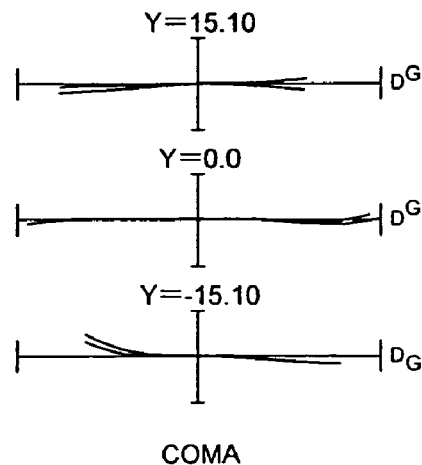
Figure 23:
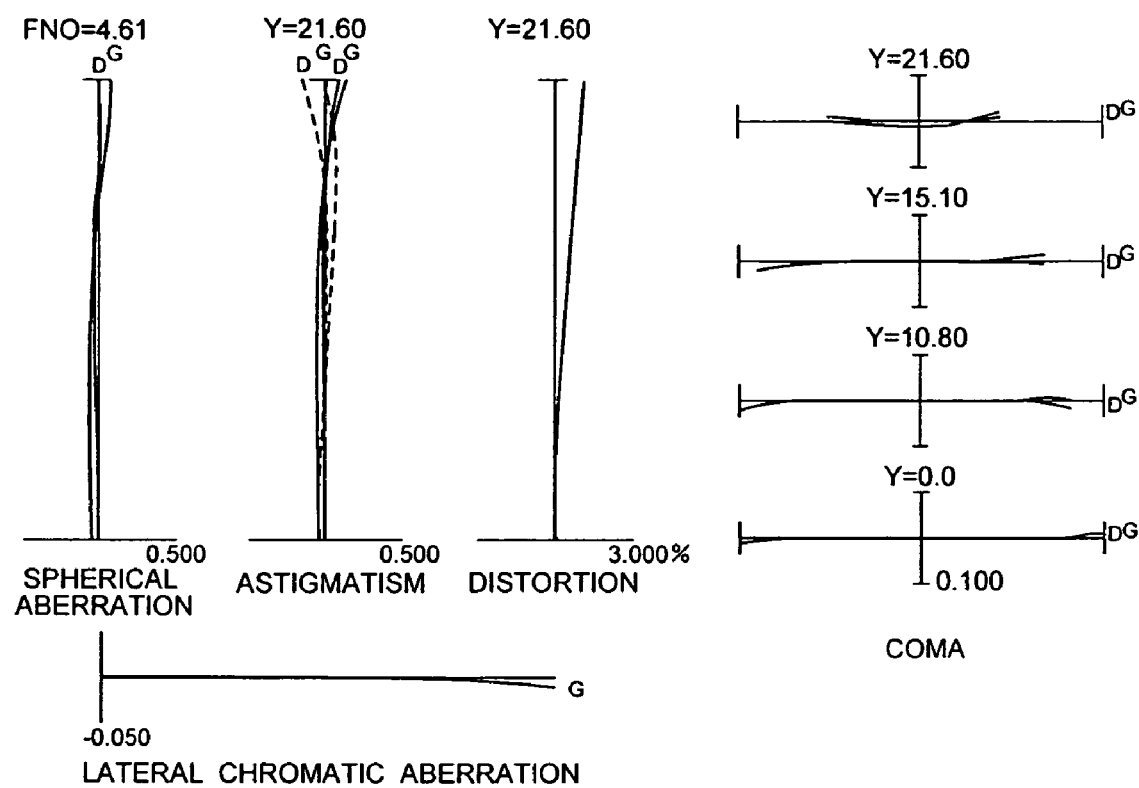
FIG. 23 shows various aberrations of the zoom lens system according to Example 6 of the second embodiment in an intermediate focal length state upon focusing at infinity.
Figure 24A:
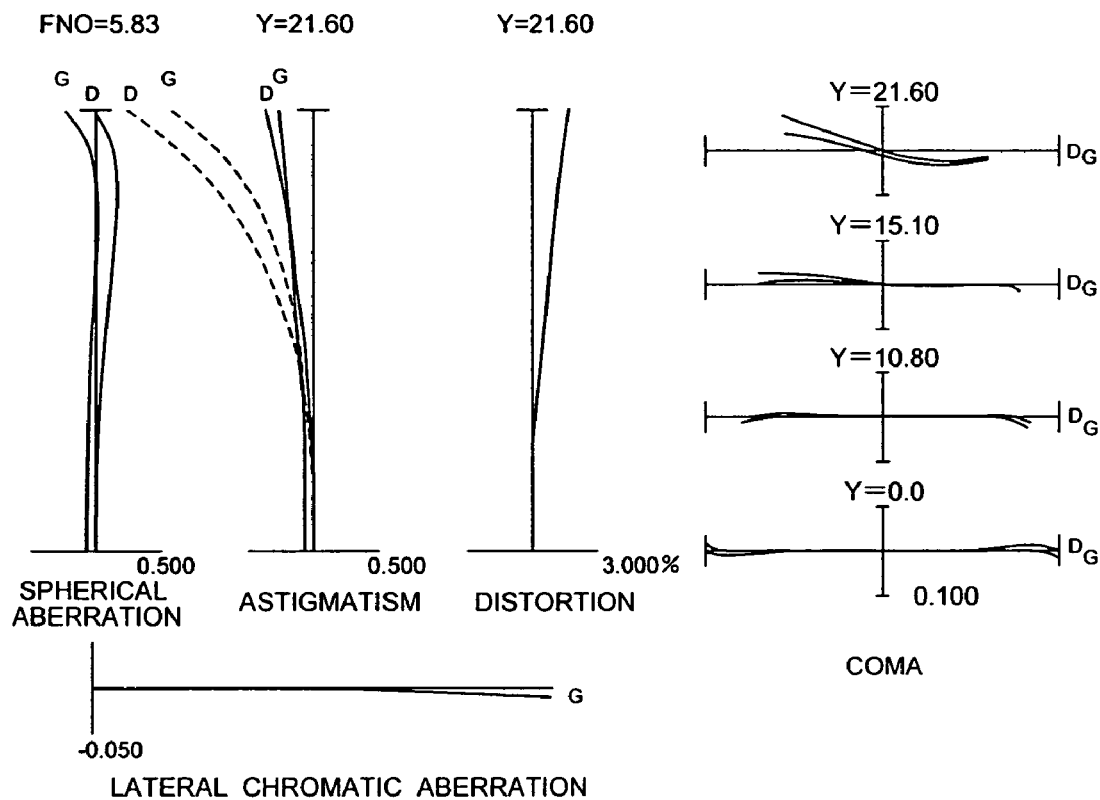
FIGS. 24A and 24B show various aberrations of the zoom lens system according to Example 6 of the second embodiment in a telephoto end state upon focusing at infinity, and meridional lateral aberration at infinity when vibration reduction is carried out against rotation of 0.15°, respectively.
Figure 24B:
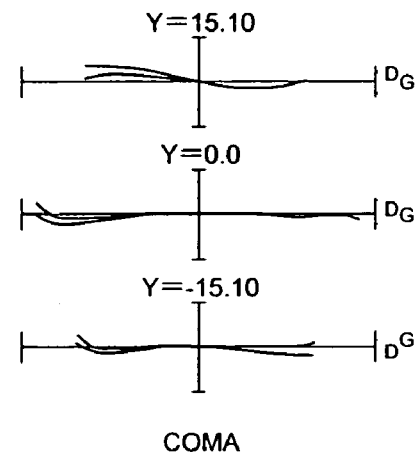

FIGS. 22A and 22B show various aberrations of the zoom lens system according to Example 6 of the second embodiment in a wide-angle end state upon focusing at infinity, and meridional lateral aberration at infinity when vibration reduction is carried out against rotation of 0.30°, respectively. FIG. 23 shows various aberrations of the zoom lens system according to Example 6 of the second embodiment in an intermediate focal length state upon focusing at infinity. FIGS. 24A and 24B show various aberrations of the zoom lens system according to Example 6 of the second embodiment in a telephoto end state upon focusing at infinity, and meridional lateral aberration at infinity when vibration reduction is carried out against rotation of 0.15°, respectively.

As is apparent from respective graphs, the zoom lens system according to Example 6 of the second embodiment shows superb optical performance correcting various aberrations.

EXAMPLE 7

FIG. 25 is a diagram showing a sectional view of a zoom lens system according to Example 7 of the second embodiment of the present invention together with a trajectory of each lens group upon zooming.

In FIG. 25, a zoom lens system with a vibration reduction mechanism according to Example 7 is composed of, in order from an object, a first lens group G1 having positive refractive power, a second lens group G2 having negative refractive power, a third lens group G3 having positive refractive power, and a fourth lens group G4 having negative refractive power. When the state of lens group positions varies from a wide-angle end state (W) to a telephoto end state (T), the first lens group G1, the third lens group G3, and the fourth lens group G4 move to the object and the second lens group G2 moves once to an image I and, then, moves to the object such that a distance between the first lens group G1 and the second lens group G2 increases, a distance between the second lens group G2 and the third lens group G3 decreases, and a distance between the third lens group G3 and the fourth lens group G4 increases.

The first lens group G1 is composed of, in order from the object, a cemented lens constructed by a negative meniscus lens having a convex surface facing to the object cemented with a double convex positive lens, and a positive meniscus lens having a convex surface facing to the object.

The second lens group G2 is composed of, in order from the object, a negative meniscus lens having a convex surface facing to the object, a cemented lens constructed by a double concave negative lens cemented with a double convex positive lens, and a negative meniscus lens having a concave surface facing to the object.

The third lens group G3 is composed of, in order from the object, a double convex positive lens, a cemented lens constructed by a double convex positive lens cemented with a double concave negative lens, and a positive meniscus lens having a convex surface facing to the object.

An aperture stop S is arranged to the object side of the third lens group G3 and is moved together with the third lens group G3 upon zooming from the wide-angle end state (W) to the telephoto end state (T).

The fourth lens group G4 is composed of, in order from the object, a 41 lens group G41 having negative refractive power, a 42 lens group G42 having negative refractive power, and a 43 lens group G43 having positive refractive power. The 41 lens group G41 is composed of, in order from the object, a cemented lens constructed by a negative meniscus lens L41 having a convex surface facing to the object cemented with a double convex positive lens L42. The 42 lens group G42 is composed of, in order from the object, a double convex positive lens L43, and a double concave negative lens L44. The 43 lens group G43 is composed of, in order from the object, a double convex positive lens L45, and a negative meniscus lens L46 having concave surface facing to the object.

Upon detecting a camera shake, vibration reduction on the image plane I is carried out by moving only the 42 lens group G42 perpendicular to the optical axis.

Focusing from infinity to a close-range object is carried out by moving the second lens group G2 to the object.

In the wide-angle end state (W) of Example 7 of the second embodiment, vibration reduction coefficient K is 1.059, and the focal length f is 71.40 (mm), so that the image rotation of 0.30° can be corrected by moving the 42 lens group G42 by the amount of 0.353 (mm). In the telephoto end state (T), vibration reduction coefficient K is 1.800, and the focal length f is 294.00 (mm), so that the image rotation of 0.15° can be corrected by moving the 42 lens group G42 by the amount of 0.428 (mm).

Various values associated with Example 7 of the second embodiment of the present invention is listed in Table 7.

In [Moving Amount upon Focusing], δ2 denotes a moving amount of the second lens group G2 to the object side focusing at the shooting distance of 1500 (mm).

TABLE 7

[Specifications]

| f = | 71.40 | 134.90 | 294.00 |
|---|---|---|---|
| FNO = | 3.99 | 4.52 | 5.75 |
| 2ω = | 34.74° | 17.97° | 8.30° |

[Lens Data]

| | r | d | ν | n |
|---|---|---|---|---|
| 1 | 92.3146 | 1.8000 | 34.97 | 1.800999 |
| 2 | 60.1527 | 9.0323 | 81.54 | 1.496999 |
| 3 | −249.0431 | 0.2000 | | |
| 4 | 80.8726 | 2.7760 | 70.23 | 1.487490 |
| 5 | 103.7057 | (d5) | | |
| 6 | 67.7254 | 1.4000 | 28.46 | 1.728250 |
| 7 | 34.1420 | 4.4733 | | |
| 8 | −56.4538 | 1.4000 | 60.29 | 1.620411 |
| 9 | 40.9332 | 3.9004 | 23.78 | 1.846660 |
| 10 | −339.3969 | 1.7837 | | |
| 11 | −50.6122 | 1.4000 | 51.47 | 1.733997 |
| 12 | −623.8156 | (d12) | | |
| 13 | ∞ | 1.0000 | Aperture Stop S | |
| 14 | 102.7196 | 3.8033 | 60.08 | 1.639999 |
| 15 | −83.7403 | 0.2000 | | |
| 16 | 51.7820 | 5.2043 | 81.54 | 1.496999 |
| 17 | −63.2478 | 1.4000 | 34.97 | 1.800999 |
| 18 | 327.7985 | 0.2000 | | |
| 19 | 41.6150 | 3.5656 | 46.57 | 1.804000 |
| 20 | 67.4980 | (d20) | | |

TABLE 7-continued

| | | | | |
|---|---|---|---|---|
| 21 | 65.4401 | 1.4000 | 23.78 | 1.846660 |
| 22 | 20.9137 | 3.9266 | 70.23 | 1.487490 |
| 23 | −450.5603 | 4.1017 | | |
| 24 | 167.1060 | 3.8379 | 28.46 | 1.728250 |
| 25 | −25.2899 | 0.2000 | | |
| 26 | −25.2945 | 1.4000 | 40.92 | 1.806098 |
| 27 | 36.0693 | 4.0874 | | |
| 28 | 32.4764 | 4.5076 | 30.13 | 1.698947 |
| 29 | −134.5935 | 4.2066 | | |
| 30 | −31.0368 | 1.4000 | 60.08 | 1.639999 |
| 31 | −108.8255 | (B.f.) | | |

| | Wide-angle end | Intermediate | Telephoto end |
|---|---|---|---|
| [Variable Distances] | | | |
| f | 71.40000 | 134.90000 | 294.00000 |
| d5 | 4.03725 | 36.57205 | 57.18679 |
| d12 | 34.46408 | 20.96534 | 1.00000 |
| d20 | 23.89184 | 23.91724 | 24.20639 |
| B.f. | 40.00000 | 50.65460 | 74.99996 |
| [Moving Amount upon Focusing] | | | |
| f | 71.400 | 134.900 | 294.000 |
| δ2 | 2.539 | 6.520 | 16.557 |

[Values for Conditional Expressions]

(10) f42/f4 = 0.505
(11) f4/fw = −1.358
(12) (1/f41 + 1/f43) · f4 = −1.079
(13) n41N = n41P = 0.359
(14) ν42N − ν42P = 12.46
(15) M2t = −0.961

Figure 26A:
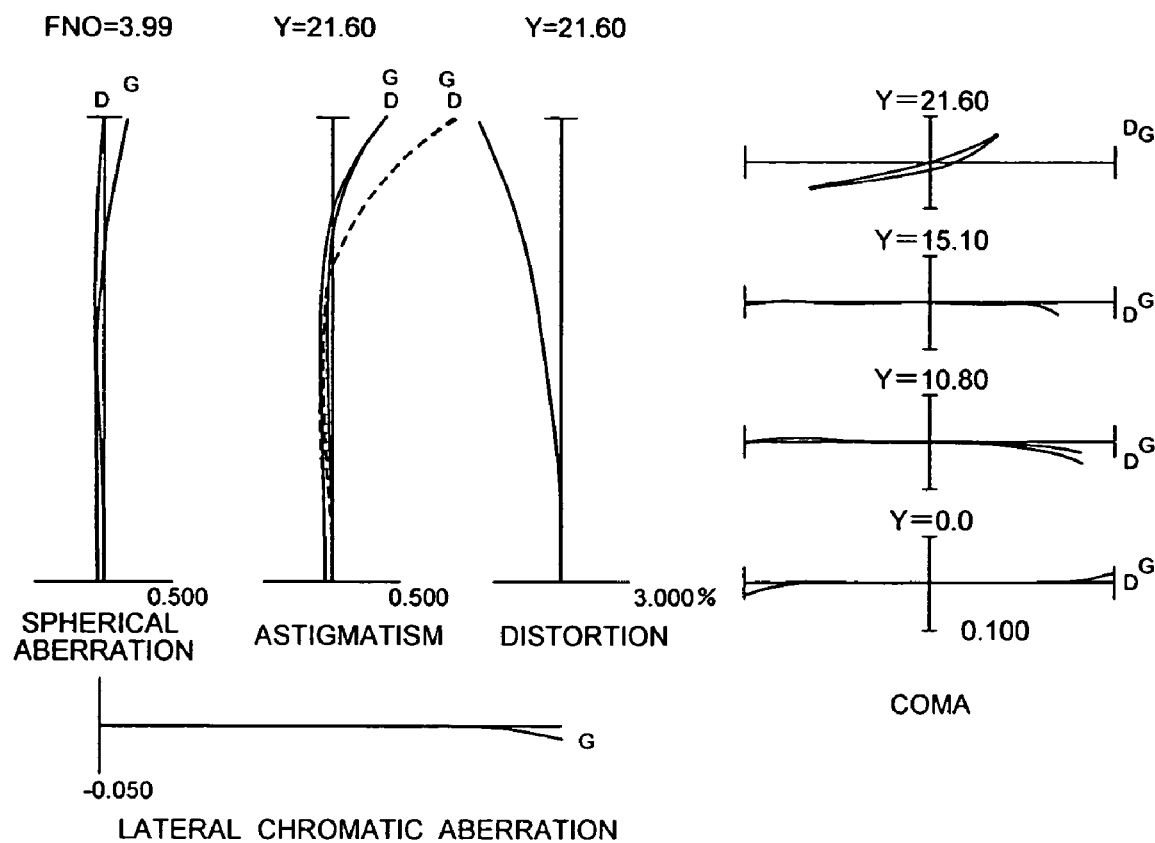
FIGS. 26A and 26B show various aberrations of the zoom lens system according to Example 7 of the second embodiment in a wide-angle end state upon focusing at infinity, and meridional lateral aberration at infinity when vibration reduction is carried out against rotation of 0.30°, respectively.
Figure 26B:
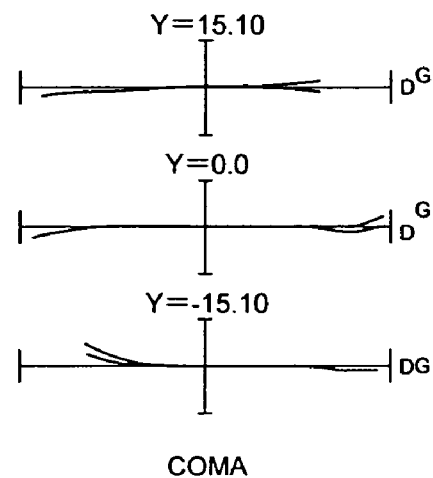
Figure 27:
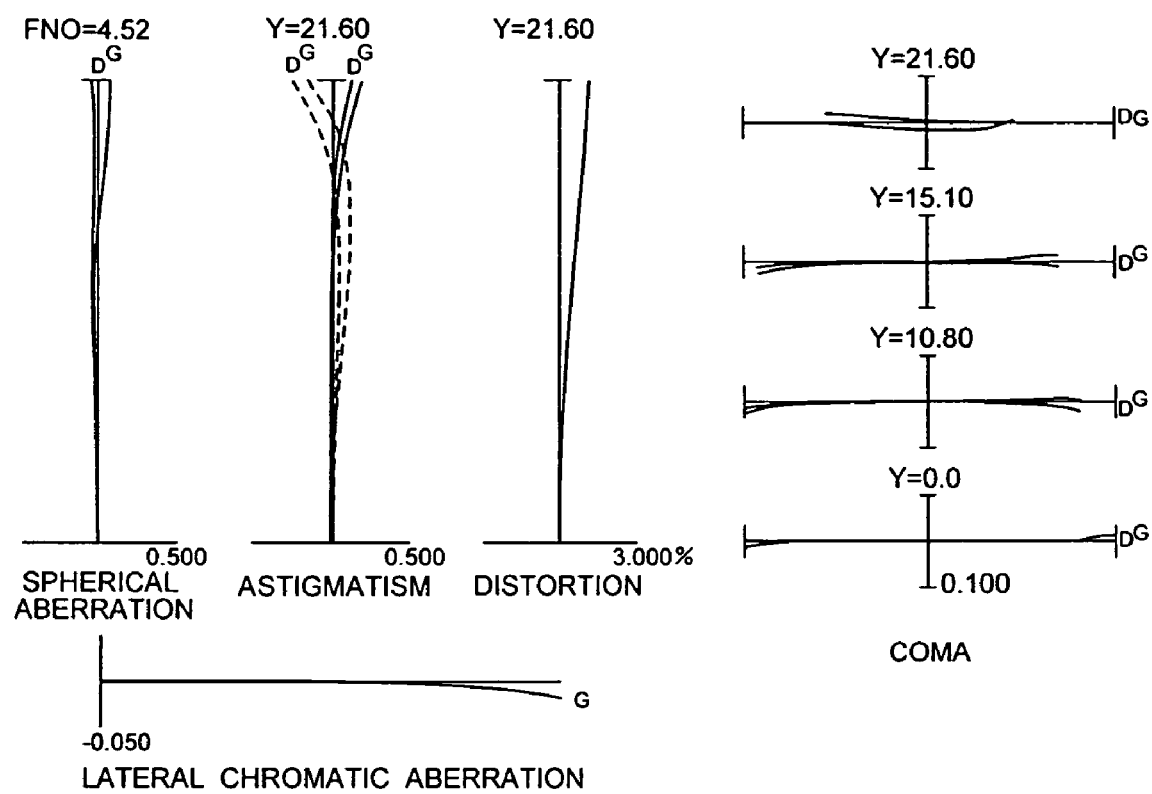
FIG. 27 shows various aberrations of the zoom lens system according to Example 7 of the second embodiment in an intermediate focal length state upon focusing at infinity.
Figure 28A:
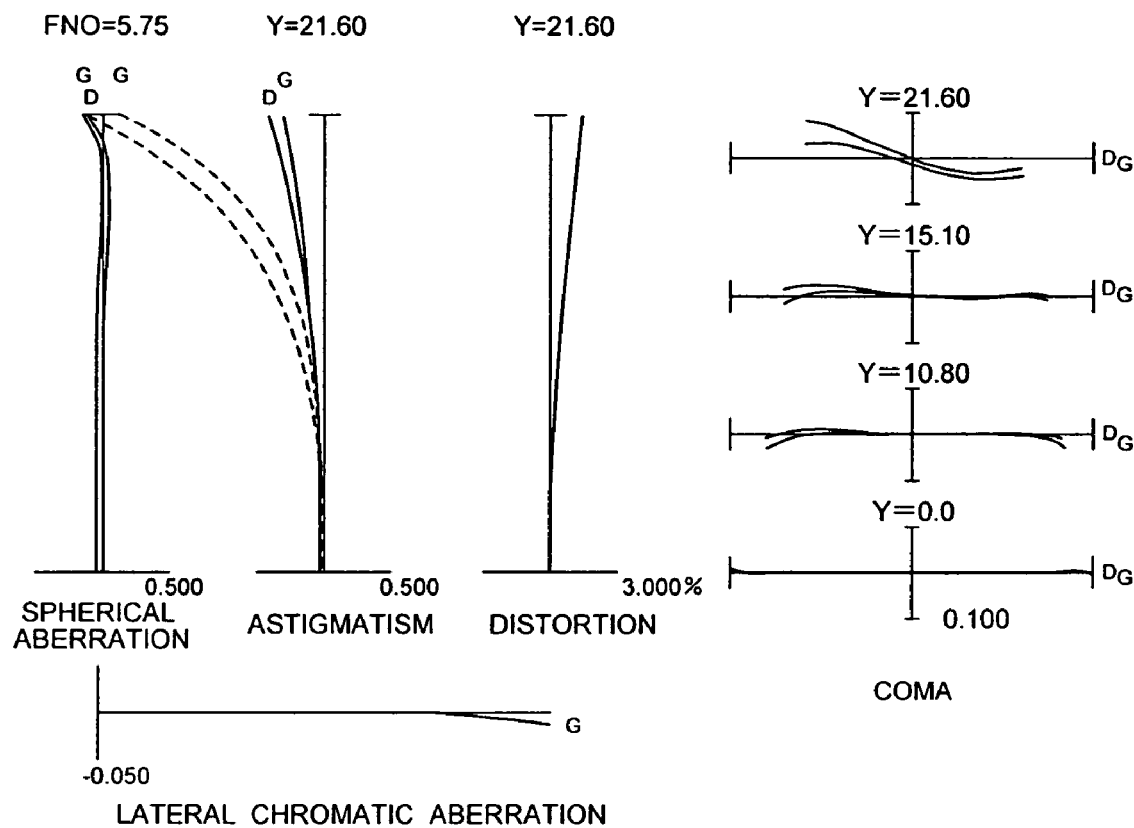
FIGS. 28A and 28B show various aberrations of the zoom lens system according to Example 7 of the second embodiment in a telephoto end state upon focusing at infinity, and meridional lateral aberration at infinity when vibration reduction is carried out against rotation of 0.15°, respectively.
Figure 28B:
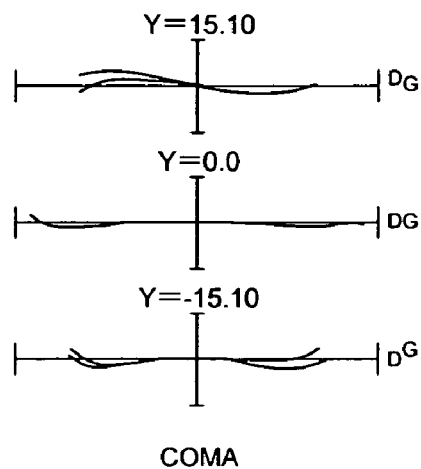

FIGS. 26A and 26B show various aberrations of the zoom lens system according to Example 7 of the second embodiment in a wide-angle end state upon focusing at infinity, and meridional lateral aberration at infinity when vibration reduction is carried out against rotation of 0.30°, respectively. FIG. 27 shows various aberrations of the zoom lens system according to Example 7 of the second embodiment in an intermediate focal length state upon focusing at infinity. FIGS. 28A and 28B show various aberrations of the zoom lens system according to Example 7 of the second embodiment in a telephoto end state upon focusing at infinity, and meridional lateral aberration at infinity when vibration reduction is carried out against rotation of 0.150, respectively.

As is apparent from respective graphs, the zoom lens system according to Example 7 of the second embodiment shows superb optical performance correcting various aberrations.

EXAMPLE 8

FIG. 29 is a diagram showing a sectional view of a zoom lens system according to Example 8 of the second embodiment of the present invention together with a trajectory of each lens group upon zooming.

In FIG. 29, a zoom lens system with a vibration reduction mechanism according to Example 8 is composed of, in order from an object, a first lens group G1 having positive refractive power, a second lens group G2 having negative refractive power, a third lens group G3 having positive refractive power, and a fourth lens group G4 having negative refractive power. When the state of lens group positions varies from a wide-angle end state (W) to a telephoto end state (T), the first lens group G1, the third lens group G3, and the fourth lens group G4 move to the object and the second lens group G2 moves once to an image I and, then, moves to the object such that a distance between the first lens group G1 and the second lens group G2 increases, a distance between the second lens group G2 and the third lens group G3 decreases, and a distance between the third lens group G3 and the fourth lens group G4 varies.

The first lens group G1 is composed of, in order from the object, a 1A lens group G1A having positive refractive power and a 1B lens group G1B having positive refractive power. The 1A lens group G1A is composed of a double convex positive lens. The 1B lens group G1B is composed of, in order from the object, a cemented lens constructed by a negative meniscus lens having a convex surface facing to the object cemented with a double convex positive lens.

The second lens group G2 is composed of, in order from the object, a double concave negative lens, a cemented lens constructed by a double concave negative lens cemented with a double convex positive lens, and a double concave negative lens.

The third lens group G3 is composed of, in order from the object, a double convex positive lens, a cemented lens constructed by a double convex positive lens cemented with a double concave negative lens, and a positive meniscus lens having a convex surface facing to the object.

An aperture stop S is arranged to the object side of the third lens group G3 and is moved together with the third lens group G3 upon zooming from the wide-angle end state (W) to the telephoto end state (T).

The fourth lens group G4 is composed of, in order from the object, a 41 lens group G41 having positive refractive power, a 42 lens group G42 having negative refractive power, and a 43 lens group G43 having positive refractive power. The 41 lens group G41 is composed of, in order from the object, a cemented lens constructed by a negative meniscus lens L41 having a convex surface facing to the object cemented with a double convex positive lens L42. The 42 lens group G42 is composed of, in order from the object, a cemented lens constructed by a double convex positive lens L43 cemented with a double concave negative lens L44. The 43 lens group G43 is composed of, in order from the object, a double convex positive lens L45, and a negative meniscus lens L46 having concave surface facing to the object.

Upon detecting a camera shake, vibration reduction on the image plane I is carried out by moving only the 42 lens group G42 perpendicular to the optical axis.

Focusing from infinity to a close-range object is carried out by moving the 1B lens group G1B to the object.

In the wide-angle end state (W) of Example 8 of the second embodiment, vibration reduction coefficient K is 1.395, and the focal length f is 71.40 (mm), so that the image rotation of 0.300 can be corrected by moving the 42 lens group G42 by the amount of 0.268 (mm). In the telephoto end state (T), vibration reduction coefficient K is 2.261, and the focal length f is 294.00 (mm), so that the image rotation of 0.15° can be corrected by moving the 42 lens group G42 by the amount of 0.340 (mm).

Various values associated with Example 8 of the second embodiment of the present invention is listed in Table 8.

In [Moving Amount upon Focusing], δ1B denotes a moving amount of the 1B lens group G1B to the object side focusing at the shooting distance of 1500 (mm).

TABLE 8

[Specifications]

| f = | 71.40 | 135.20 | 294.00 |
|---|---|---|---|
| FNO = | 3.98 | 4.42 | 5.83 |
| 2ω = | 34.26° | 17.57° | 8.19° |

[Lens Data]

| | r | d | ν | n |
|---|---|---|---|---|
| 1 | 401.1292 | 3.4320 | 64.14 | 1.516330 |
| 2 | −401.1292 | (d2) | | |
| 3 | 73.7120 | 1.8000 | 28.46 | 1.728250 |
| 4 | 49.4588 | 9.2239 | 81.54 | 1.496999 |
| 5 | −634.7712 | (d5) | | |
| 6 | −569.6277 | 1.4000 | 46.57 | 1.804000 |
| 7 | 65.8130 | 2.9470 | | |
| 8 | −66.3802 | 1.4000 | 49.34 | 1.743198 |
| 9 | 37.4535 | 4.4348 | 23.78 | 1.846660 |
| 10 | −157.1502 | 1.2424 | | |
| 11 | −56.4033 | 1.4000 | 46.57 | 1.804000 |
| 12 | 457.6562 | (d12) | | |
| 13 | ∞ | 1.0000 | | Aperture Stop S |
| 14 | 174.8883 | 4.0762 | 60.08 | 1.639999 |
| 15 | −54.3627 | 0.2000 | | 1.000000 |
| 16 | 52.6528 | 6.0766 | 81.54 | 1.496999 |
| 17 | −40.7675 | 1.4000 | 34.97 | 1.800999 |
| 18 | 1440.7843 | 0.2000 | | |
| 19 | 33.5705 | 3.5534 | 61.13 | 1.589130 |
| 20 | 93.9894 | (d20) | | |
| 21 | 479.6438 | 1.4000 | 23.78 | 1.846660 |
| 22 | 43.7293 | 4.5629 | 59.84 | 1.522494 |
| 23 | −51.1261 | 3.0000 | | |
| 24 | 1129.8061 | 3.6174 | 29.23 | 1.721507 |
| 25 | −22.8122 | 1.4000 | 47.93 | 1.717004 |
| 26 | 29.6916 | 4.4859 | | |
| 27 | 35.9110 | 3.4607 | 33.79 | 1.647689 |
| 28 | −167.9338 | 4.3753 | | |
| 29 | −22.4279 | 1.4000 | 46.57 | 1.804000 |
| 30 | −45.1019 | (B.f.) | | |

| | Wide-angle end | Intermediate | Telephoto end |
|---|---|---|---|
| [Variable Distances] | | | |
| f | 71.39999 | 135.19963 | 294.00017 |
| d2 | 13.96876 | 13.96876 | 13.96876 |
| d5 | 1.50000 | 30.16863 | 45.04078 |
| d12 | 26.95417 | 16.63929 | 1.00000 |
| d20 | 15.26706 | 15.23225 | 16.01169 |
| B.f. | 45.82163 | 54.27048 | 80.82164 |
| [Moving Amount upon Focusing] | | | |
| f | 71.400 | 135.200 | 294.000 |
| δ1B | 12.512 | 12.783 | 13.064 |

[Values for Conditional Expressions]

(10) f42/f4 = 0.579
(11) f4/fw = −1.039
(12) (1/f41 + 1/f43) · f4 = −0.816
(13) n41N − n41P = 0.324
(14) ν42N − ν42P = 18.70
(15) M2t = —

Figure 30A:
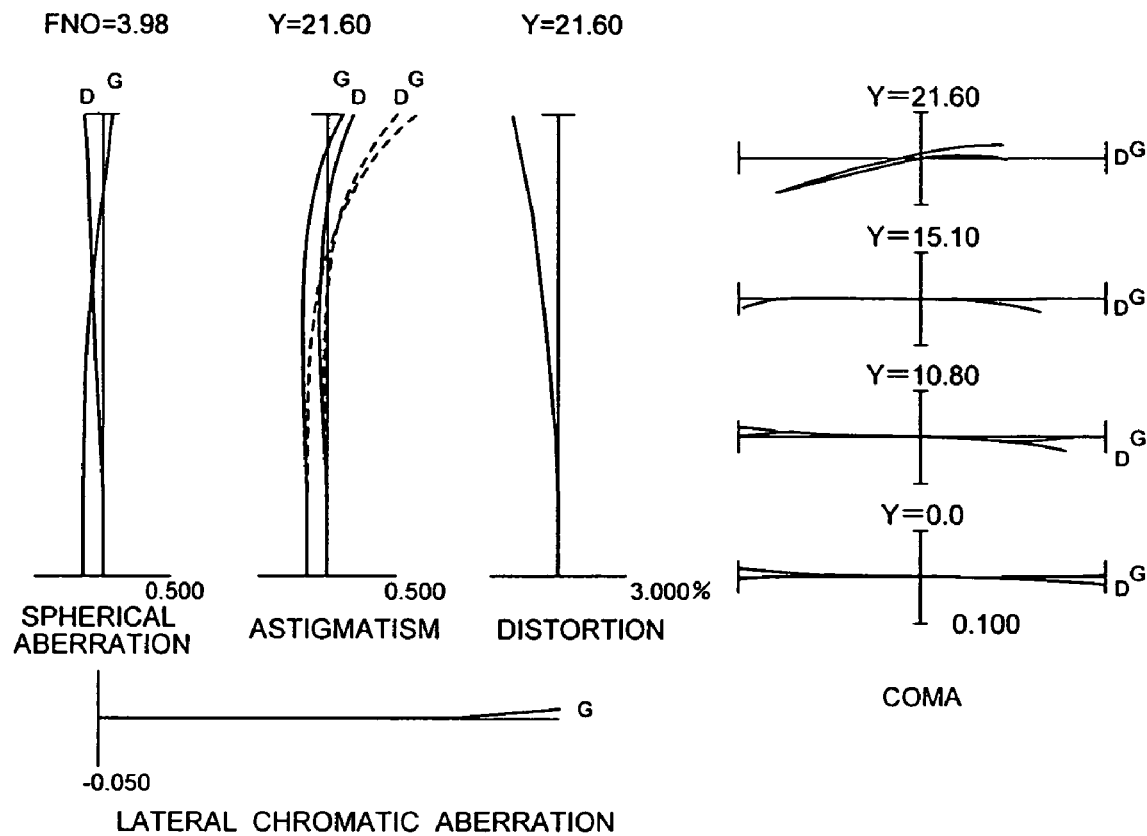
FIGS. 30A and 30B show various aberrations of the zoom lens system according to Example 8 of the second embodiment in a wide-angle end state upon focusing at infinity, and meridional lateral aberration at infinity when vibration reduction is carried out against rotation of 0.30°, respectively.
Figure 30B:
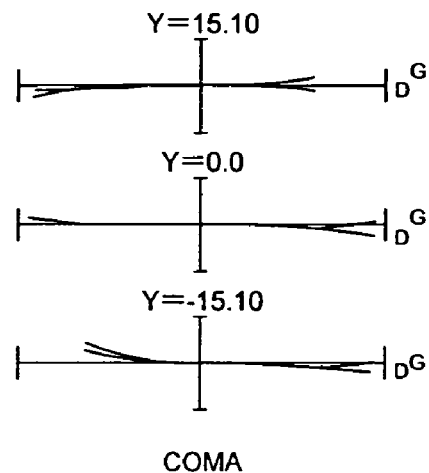
Figure 31:
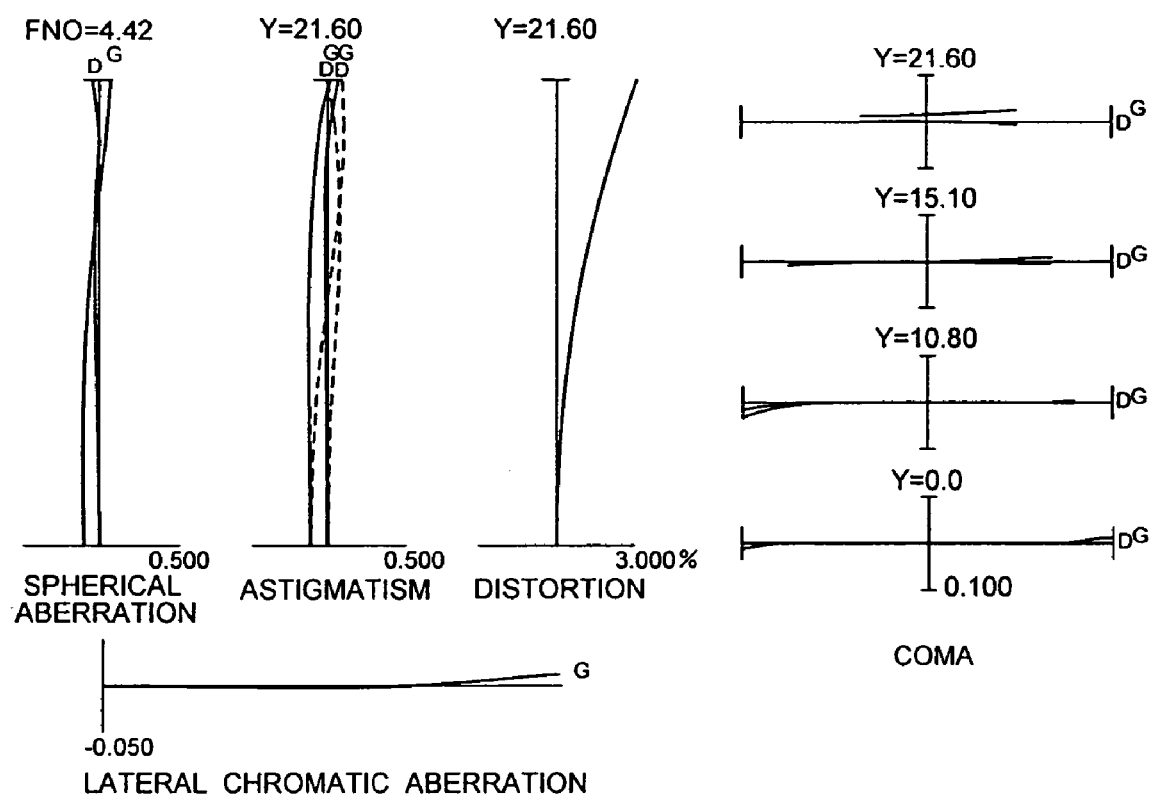
FIG. 31 shows various aberrations of the zoom lens system according to Example 8 of the second embodiment in an intermediate focal length state upon focusing at infinity.
Figure 32A:
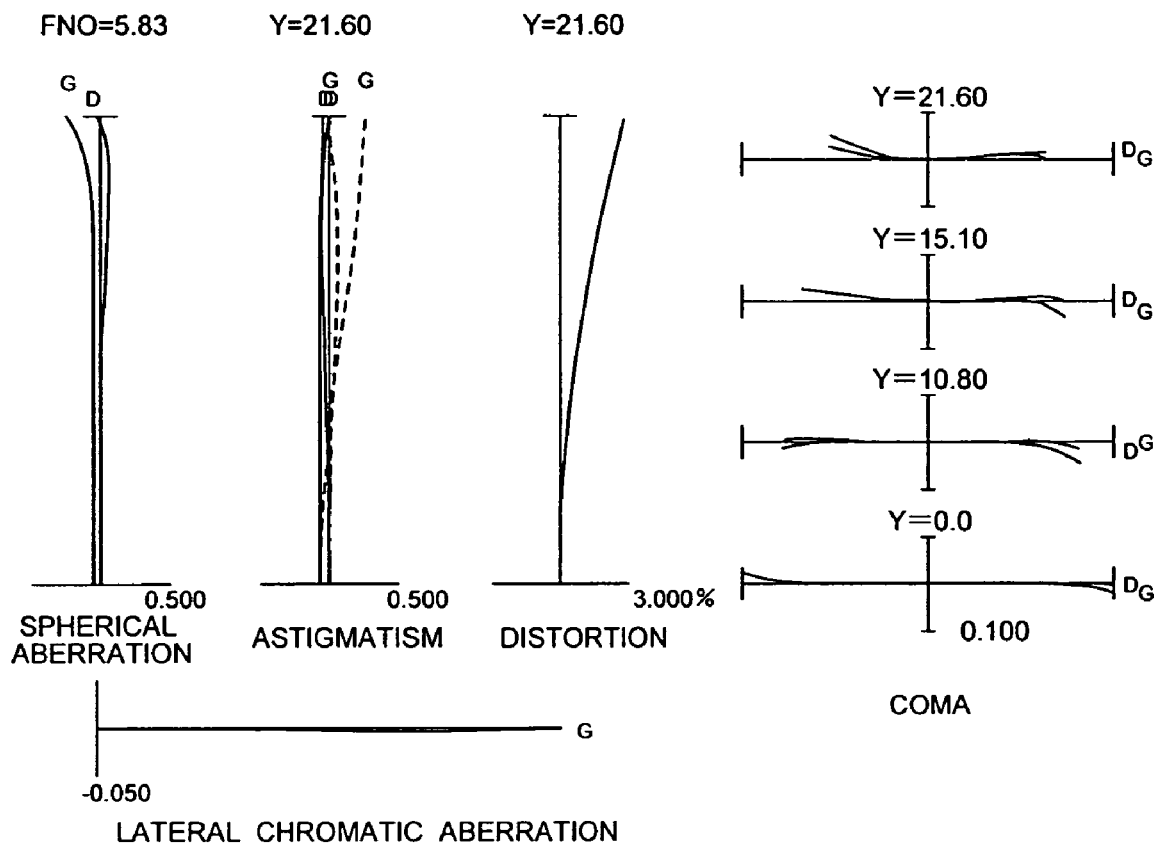
FIGS. 32A and 32B show various aberrations of the zoom lens system according to Example 8 of the second embodiment in a telephoto end state upon focusing at infinity, and meridional lateral aberration at infinity when vibration reduction is carried out against rotation of 0.15°, respectively.
Figure 32B:
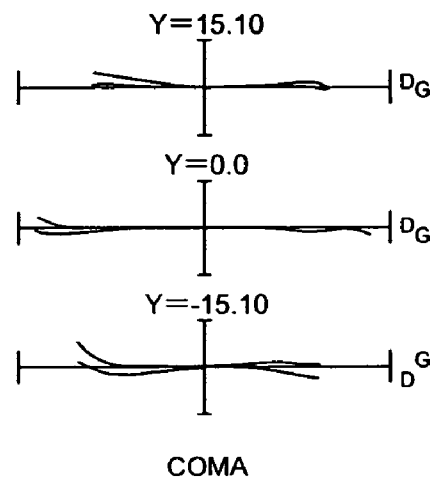

FIGS. 30A and 30B show various aberrations of the zoom lens system according to Example 8 of the second embodiment in a wide-angle end state upon focusing at infinity, and meridional lateral aberration at infinity when vibration reduction is carried out against rotation of 0.30°, respectively. FIG. 31 shows various aberrations of the zoom lens system according to Example 8 of the second embodiment in an intermediate focal length state upon focusing at infinity. FIGS. 32A and 32B show various aberrations of the zoom lens system according to Example 8 of the second embodiment in a telephoto end state upon focusing at infinity, and meridional lateral aberration at infinity when vibration reduction is carried out against rotation of 0.15°, respectively.

As is apparent from respective graphs, the zoom lens system according to Example 8 of the second embodiment shows superb optical performance correcting various aberrations.

EXAMPLE 9

FIG. 33 is a diagram showing a sectional view of a zoom lens system according to Example 9 of the second embodiment of the present invention together with a trajectory of each lens group upon zooming.

In FIG. 33, a zoom lens system with a vibration reduction mechanism according to Example 9 is composed of, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power. When the state of lens group positions varies from a wide-angle end state (W) to a telephoto end state (T), the first lens group G1, the third lens group G3, the fourth lens group G4, and the fifth lens group G5 move to the object and the second lens group G2 moves once to the object and, then, moves to an image I such that a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group decreases.

The first lens group G1 is composed of, in order from the object, a cemented lens constructed by a negative meniscus lens having a convex surface facing to the object cemented with a double convex positive lens, and a positive meniscus lens having a convex surface facing to the object.

The second lens group G2 is composed of, in order from the object, a double concave negative lens, and a cemented lens constructed by a double concave negative lens cemented with a double convex positive lens.

The third lens group G3 is composed of, in order from the object, a plano-convex positive lens having a convex surface facing to the image, a double convex positive lens, a negative meniscus lens having a concave surface facing to the object, and a double convex positive lens.

An aperture stop S is arranged to the object side of the third lens group G3 and is moved together with the third lens group G3 upon zooming from the wide-angle end state (W) to the telephoto end state (T).

The fourth lens group G4 is composed of, in order from the object, a 41 lens group G41 having positive refractive power, a 42 lens group G42 having negative refractive power, and a 43 lens group G43 having negative refractive power. The 41 lens group G41 is composed of a double convex positive lens L41. The 42 lens group G42 is composed of, in order from the object, a double concave negative lens L42, and a positive meniscus lens L43 having a convex surface facing to the object. The 43 lens group G43 is composed of a negative meniscus lens L44 having a concave surface facing to the object.

The fifth lens group G5 is composed of, in order from the object, a negative meniscus lens having a convex surface facing to the object, a double convex positive lens, and a negative meniscus lens having a concave surface facing to the object.

Upon detecting a camera shake, vibration reduction on the image plane I is carried out by moving only the 42 lens group G42 perpendicular to the optical axis.

Focusing from infinity to a close-range object is carried out by moving the second lens group G2 to the object.

In the wide-angle end state (W) of Example 9 of the second embodiment, vibration reduction coefficient K is 1.719, and the focal length f is 69.99 (mm), so that the image rotation of 0.30° can be corrected by moving the 42 lens group G42 by the amount of 0.213 (mm). In the telephoto end state (T), vibration reduction coefficient K is 2.284, and the focal length f is 299.93 (mm), so that the image rotation of 0.15° can be corrected by moving the 42 lens group G42 by the amount of 0.344 (mm).

Various values associated with Example 9 of the second embodiment of the present invention is listed in Table 9.

In [Moving Amount upon Focusing], δ2 denotes a moving amount of the second lens group G2 to the object side focusing at the shooting distance of 1500 (mm).

TABLE 9

[Specifications]

| f = | 69.99 | 134.96 | 299.93 |
|---|---|---|---|
| FNO = | 4.31 | 5.28 | 5.77 |
| 2ω = | 34.39° | 17.94° | 8.06° |

[Lens Data]

| | r | d | ν | n |
|---|---|---|---|---|
| 1 | 105.7828 | 1.5000 | 25.43 | 1.805180 |
| 2 | 74.2801 | 7.7806 | 81.61 | 1.497000 |
| 3 | −314.2885 | 0.5000 | | |
| 4 | 84.1721 | 4.0034 | 81.61 | 1.497000 |
| 5 | 192.0413 | (d5) | | |
| 6 | −289.0462 | 1.5000 | 49.61 | 1.772500 |
| 7 | 37.2942 | 5.1639 | | |
| 8 | −36.2718 | 1.5000 | 53.85 | 1.713000 |
| 9 | 42.3070 | 3.9288 | 23.78 | 1.846660 |
| 10 | −275.6800 | (d10) | | |
| 11 | ∞ | 0.5000 | Aperture Stop S | |
| 12 | ∞ | 2.5521 | 49.61 | 1.772500 |
| 13 | −91.7378 | 0.5000 | | |
| 14 | 44.2611 | 6.7347 | 81.61 | 1.497000 |
| 15 | −34.2879 | 0.6605 | | |
| 16 | −32.1236 | 1.5000 | 37.17 | 1.834000 |
| 17 | −239.8905 | 0.5000 | | |
| 18 | 48.9662 | 4.7058 | 81.61 | 1.497000 |
| 19 | −95.8226 | (d19) | | |
| 20 | 38.7220 | 5.1115 | 81.61 | 1.497000 |
| 21 | −81.1156 | 3.8000 | | |
| 22 | −1244.0407 | 1.5000 | 46.63 | 1.816000 |
| 23 | 18.1395 | 0.5544 | | |
| 24 | 18.4154 | 3.9902 | 34.47 | 1.639800 |
| 25 | 57.0111 | 3.8499 | | |
| 26 | −24.5068 | 1.5000 | 49.32 | 1.743200 |
| 27 | −42.2340 | (d27) | | |
| 28 | 106.2163 | 1.5000 | 23.78 | 1.846660 |
| 29 | 36.1752 | 3.2036 | | |
| 30 | 51.9898 | 4.5496 | 33.04 | 1.666800 |
| 31 | −45.3816 | 3.9985 | | |
| 32 | −24.1064 | 1.5000 | 46.63 | 1.816000 |
| 33 | −36.1573 | (B.f.) | | |

| | Wide-angle end | Intermediate | Telephoto end |
|---|---|---|---|
| [Variable Distances] | | | |
| f | 69.98593 | 134.95979 | 299.92772 |
| d5 | 7.77097 | 31.32565 | 57.66235 |
| d10 | 25.75941 | 15.14446 | 0.50000 |
| d19 | 3.94280 | 7.03157 | 7.76808 |
| d27 | 10.15139 | 2.54225 | 0.50000 |
| B.f. | 50.26987 | 74.11967 | 85.25814 |

TABLE 9-continued

[Moving Amount upon Focusing]

| f | 69.986 | 134.960 | 299.928 |
|---|---|---|---|
| δ2 | 1.324 | 2.865 | 12.223 |

[Values for Conditional Expressions]

(10) f42/f4 = 0.484
(11) f4/fw = −1.353
(12) (1/f41 + 1/f43) · f4 = −0.608
(13) n41N − n41P = —
(14) ν42N − ν42P = —
(15) M2t = −0.973

Figure 34A:
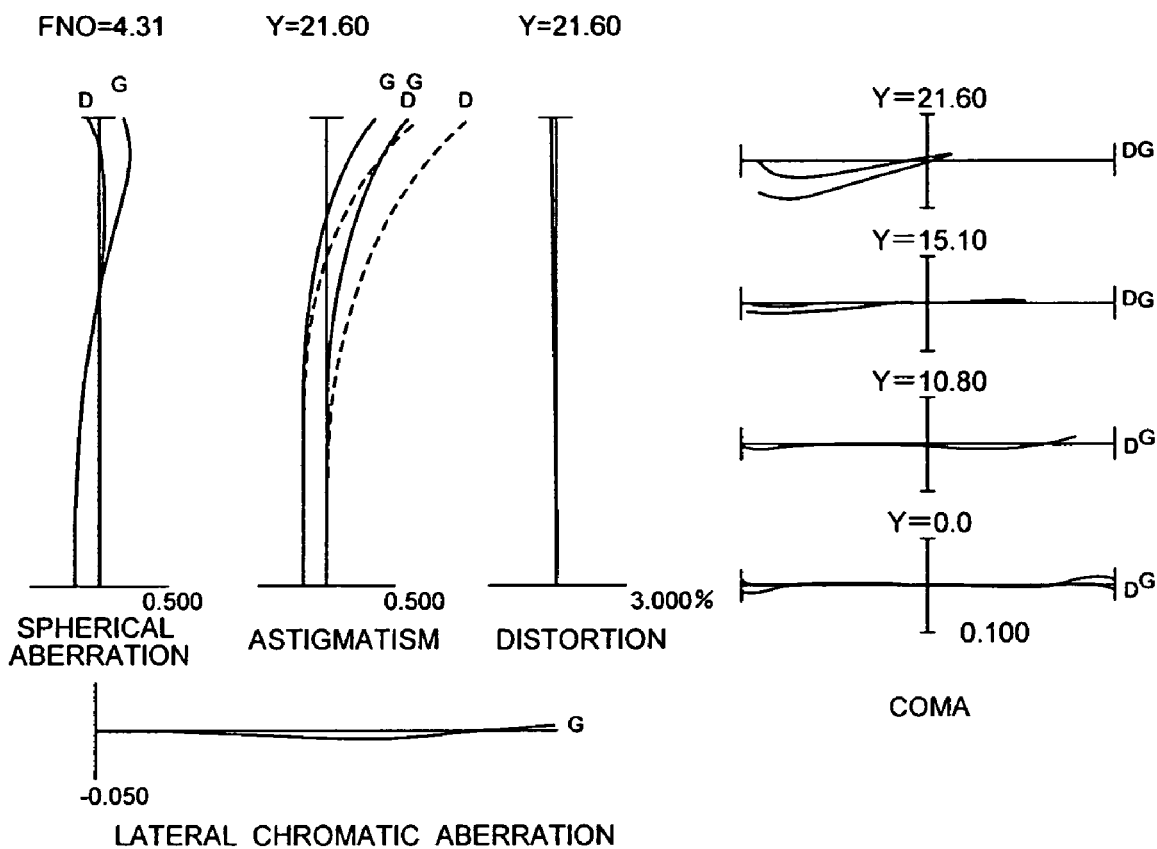
FIGS. 34A and 34B show various aberrations of the zoom lens system according to Example 9 of the second embodiment in a wide-angle end state upon focusing at infinity, and meridional lateral aberration at infinity when vibration reduction is carried out against rotation of 0.30°, respectively.
Figure 34B:
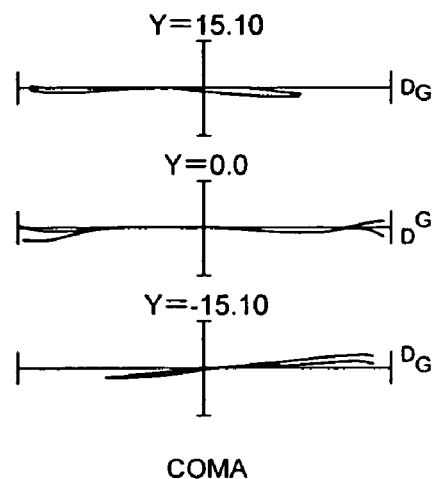
Figure 35:
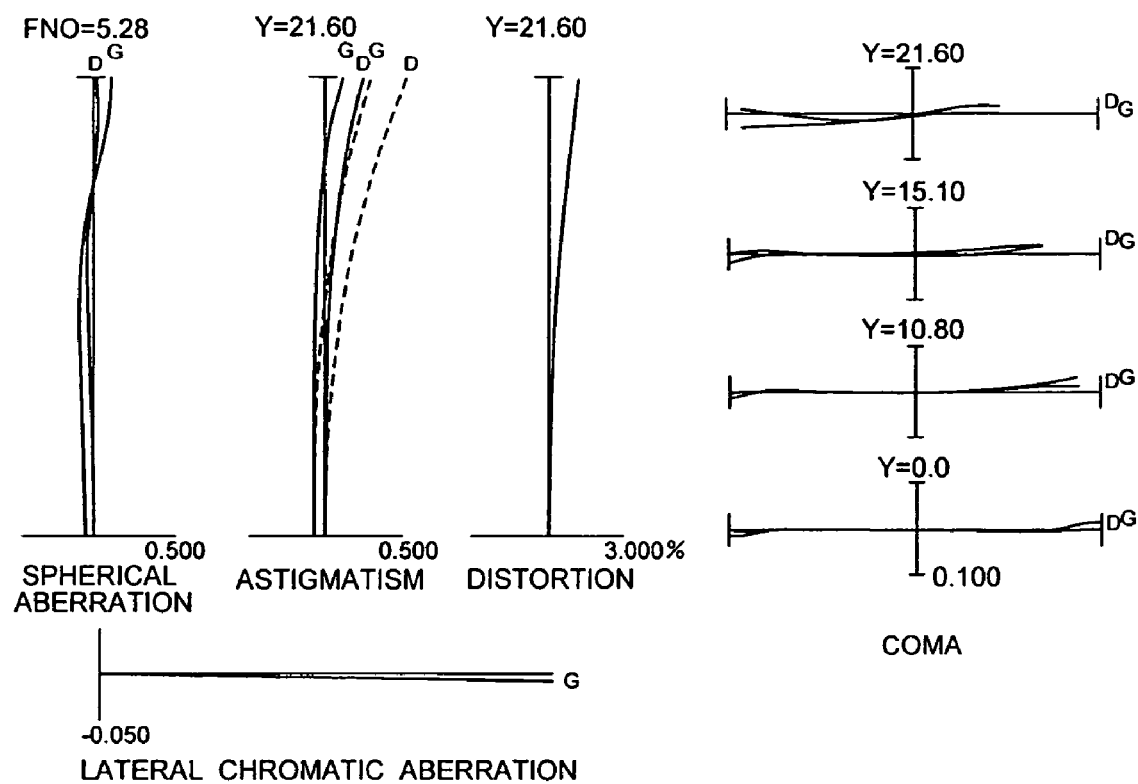
FIG. 35 shows various aberrations of the zoom lens system according to Example 9 of the second embodiment in an intermediate focal length state upon focusing at infinity.
Figure 36A:
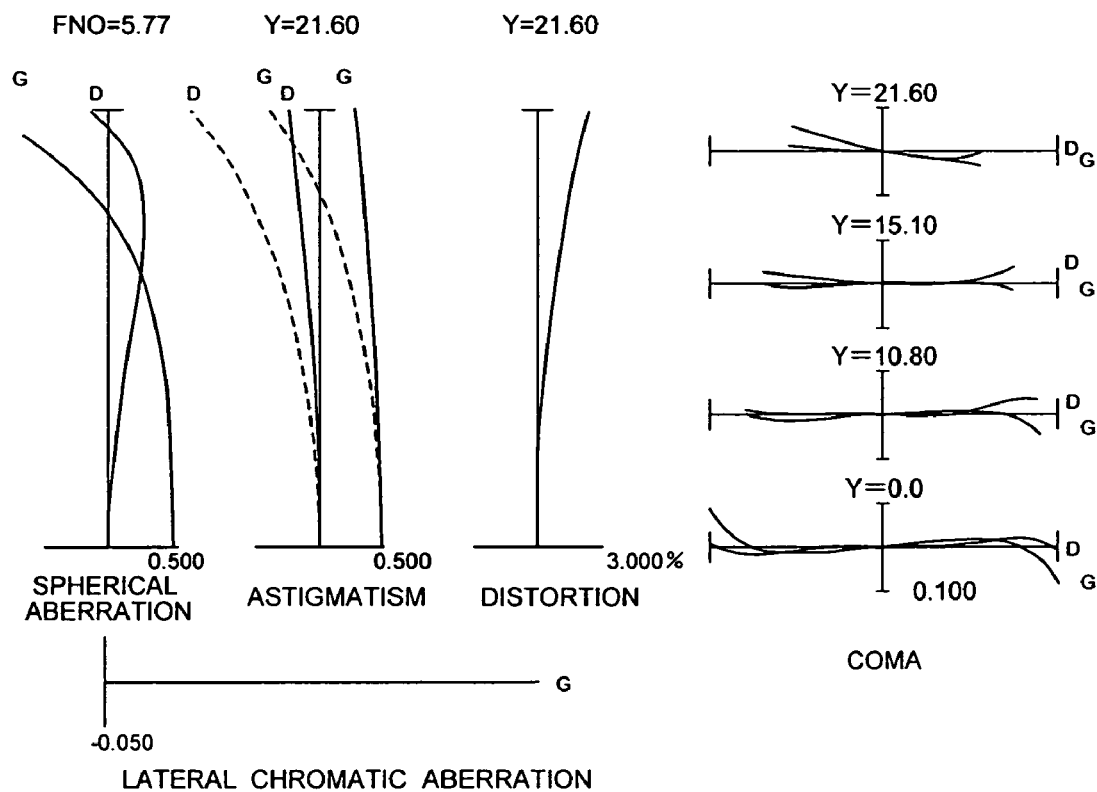
FIGS. 36A and 36B show various aberrations of the zoom lens system according to Example 9 of the second embodiment in a telephoto end state upon focusing at infinity, and meridional lateral aberration at infinity when vibration reduction is carried out against rotation of 0.15°, respectively.
Figure 36B:
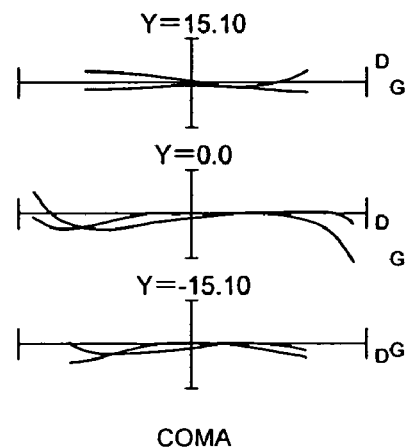

FIGS. 34A and 34B show various aberrations of the zoom lens system according to Example 9 of the second embodiment in a wide-angle end state upon focusing at infinity, and meridional lateral aberration at infinity when vibration reduction is carried out against rotation of 0.30°, respectively. FIG. 35 shows various aberrations of the zoom lens system according to Example 9 of the second embodiment in an intermediate focal length state upon focusing at infinity. FIGS. 36A and 36B show various aberrations of the zoom lens system according to Example 9 of the second embodiment in a telephoto end state upon focusing at infinity, and meridional lateral aberration at infinity when vibration reduction is carried out against rotation of 0.15°, respectively.

As is apparent from respective graphs, the zoom lens system according to Example 9 of the second embodiment shows superb optical performance correcting various aberrations.

[Third Embodiment]

A zoom lens system according to a third embodiment of the present invention is explained below.

The zoom lens system with a vibration reduction mechanism according to the third embodiment of the present invention is composed of, in order from an object, a first lens group having positive refractive power, a second lens group having negative refractive power, and a third lens group having positive refractive power. When the state of lens group positions varies from a wide-angle end state to a telephoto end state, a distance between the first lens group and the second lens group increases, and a distance between the second lens group and the third lens group decreases. The construction is effective for simplifying the construction and shortening the total lens length.

The third lens group G3 is composed of, in order from the object, a 31 lens group having positive refractive power, a 32 lens group having negative refractive power, and a 33 lens group having positive refractive power. Upon detecting a camera shake, vibration reduction is carried out by moving only the 32 lens group perpendicular to the optical axis. By arranging positive refractive power to the 31 lens group and negative refractive power to the 32 lens group, the effective diameter of the 32 lens group can be small relative to those of the first lens group through the 31 lens group. Accordingly, the vibration reduction mechanism can be compact, so that it is effective for the zoom lens system as a whole to be compact. By constructing in this manner, degradation of optical performance caused by moving the 32 lens group perpendicular to the optical axis can be reduced.

In the zoom lens system with a vibration reduction mechanism according to the third embodiment of the present invention, the following conditional expressions (16) through (20) are preferably satisfied:

$$1.40 < f1/fw < 2.00 \quad (16)$$

$$-0.53 < f2/fw < -0.32 \quad (17)$$

$$0.35 < f3/fw < 0.65 \quad (18)$$

$$-2.00 < f32/f3 < -0.80 \quad (19)$$

$$-0.20 < f3/f33 < 0.50 \quad (20)$$

where fw denotes the focal length of the zoom lens system in the wide-angle end state, f1 denotes the focal length of the first lens group, f2 denotes the focal length of the second lens group, f3 denotes the focal length of the third lens group, f32 denotes the focal length of the 32 lens group, and f33 denotes the focal length of the 33 lens group.

Conditional expression (16) defines an appropriate range of the focal length of the first lens group. When the ratio f1/fw is equal to or exceeds the upper limit of conditional expression (16), refractive power of the first lens group becomes weak, so that the total lens length of the zoom lens system becomes large. On the other hand, when the ratio f1/fw is equal to or falls below the lower limit of conditional expression (16), refractive power of the first lens group becomes large, so that it becomes difficult to correct spherical aberration and on-axis chromatic aberration. In order to further secure the effect of the present invention, it is desirable to set the lower limit of conditional expression (16) to 1.50 and the upper limit to 1.90.

Conditional expression (17) defines an appropriate range of the focal length of the second lens group. When the ratio f2/fw is equal to or exceeds the upper limit of conditional expression (17), negative refractive power of the second lens group becomes large, so that it becomes difficult to correct spherical aberration and coma. On the other hand, when the ratio f2/fw is equal to or falls below the lower limit of conditional expression (17), negative refractive power of the second lens group becomes weak, so that it becomes difficult to obtain the zoom ratio of about four. In order to further secure the effect of the present invention, it is desirable to set the lower limit of conditional expression (17) to −0.50 and the upper limit to −0.35.

Conditional expression (18) defines an appropriate range of the focal length of the third lens group. When the ratio f3/fw is equal to or exceeds the upper limit of conditional expression (18), refractive power of the third lens group becomes weak, so that the total lens length of the zoom lens system becomes large. On the other hand, when the ratio f3/fw is equal to or falls below the lower limit of conditional expression (18), refractive power of the third lens group becomes large, so that it becomes difficult to correct various aberrations as well as spherical aberration. In order to further secure the effect of the present invention, it is desirable to set the lower limit of conditional expression (18) to 0.40 and the upper limit to 0.60.

Conditional expression (19) defines an appropriate range of the focal length of the 32 lens group. When the ratio f32/f3 is equal to or exceeds the upper limit of conditional expression (19), negative refractive power of the 32 lens group becomes large, so that the ratio of the moving amount of image relative to the moving amount of the 32 lens group upon vibration reduction becomes large. Accordingly, permissible driving error of the 32 lens group upon vibration reduction becomes small, so that it becomes difficult to control the 32 lens group. On the other hand, when the ratio f32/f3 is equal to or falls below the lower limit of conditional expression (19), negative refractive power of the 32 lens group becomes small, so that the ratio of the moving amount of image relative to the moving amount of the 32 lens group upon vibration reduction becomes small. Accordingly, moving amount of the 32 lens group upon vibration reduction becomes large, so that the vibration reduction mechanism becomes large. In order to further secure the effect of the present invention, it is desirable to set the lower limit of conditional expression (19) to −1.85 and the upper limit to −0.90.

Conditional expression (20) defines an appropriate range of the focal length of the 33 lens group. When the ratio f3/f33 is equal to or exceeds the upper limit of conditional expression (20), positive refractive power of the 33 lens group becomes large, so that the total lens length of the zoom lens system becomes large. On the other hand, when the ratio f3/f33 is equal to or falls below the lower limit of conditional expression (20), negative refractive power of the 33 lens group becomes large, so that it becomes difficult to correct coma and distortion. In order to further secure the effect of the present invention, it is desirable to set the lower limit of conditional expression (20) to −0.15 and the upper limit to 0.40.

In the zoom lens system with a vibration reduction mechanism according to the third embodiment of the present invention, it is preferable that the first lens group and the third lens group move to the object when the state of lens group positions varies from the wide-angle end state to the telephoto end state. By construction like this, the total lens length of the zoom lens system in the wide-angle end state can be short, so that the zoom lens system can be compact.

In the zoom lens system with a vibration reduction mechanism according to the third embodiment of the present invention, it is preferable that the 31 lens group includes at least three positive lens elements and at least one negative lens element, the 32 lens group includes at least one positive lens element and at least one negative lens element, and the 33 lens group includes at least one positive lens element and at least one negative lens element. By constructing like this, decentering aberration caused upon vibration reduction can be satisfactorily corrected.

In the zoom lens system with a vibration reduction mechanism according to the third embodiment of the present invention, it is preferable that the 31 lens group is composed of, in order from the object, a double convex positive lens, a first cemented lens constructed by a double convex positive lens cemented with a negative lens having a concave surface facing to the object, a positive meniscus lens having a convex surface facing to the object, and a second cemented lens. With this construction, decentering aberration caused upon vibration reduction can be satisfactorily corrected.

In the zoom lens system with a vibration reduction mechanism according to the third embodiment of the present invention, the following conditional expressions (21) and (22) are preferably satisfied:

$$0.20 < n31N - n31P \quad (21)$$

$$30.0 < v31P - v31N \quad (22)$$

where n31N denotes refractive index of the negative lens in the first cemented lens at d-line ($\lambda=587.6$ nm), n31P denotes refractive index of the double convex positive lens in the first cemented lens at d-line, v31N denotes Abbe number of the negative lens in the first cemented lens at d-line, and v31P denotes Abbe number of the double convex positive lens in the first cemented lens at d-line.

Conditional expression (21) defines an appropriate range of the difference in refractive indices between the double convex positive lens and the negative lens in the first cemented lens. When the difference n31N−n31P is equal to or falls below the lower limit of conditional expression (21), it becomes difficult to satisfactorily correct spherical aberration. In order to further secure the effect of the present invention, it is desirable to set the lower limit of conditional expression (21) to 0.25.

Conditional expression (22) defines an appropriate range of the difference in Abbe numbers between the double convex positive lens and the negative lens in the first cemented lens. When the difference v31P−v31N I equal to or falls below the lower limit of conditional expression (22), it becomes difficult to satisfactorily correct lateral chromatic aberration. In order to further secure the effect of the present invention, it is desirable to set the lower limit of conditional expression (22) to 35.0.

In the zoom lens system with a vibration reduction mechanism according to the third embodiment of the present invention, it is preferable that the 32 lens group is composed of, in order from the object, a positive lens having a convex surface facing to the object, and a double concave negative lens. With this construction, decentering aberration caused upon vibration reduction can be satisfactorily corrected.

In the zoom lens system with a vibration reduction mechanism according to the third embodiment of the present invention, the following conditional expression (23) is preferably satisfied:

$$10.0 < v32N - v32P \tag{23}$$

where v32N denotes Abbe number of the double concave negative lens in the 32 lens group at d-line (λ=587.6 nm), and v32P denotes Abbe number of the positive lens in the 32 lens group at d-line.

Conditional expression (23) defines an appropriate range of the difference in Abbe numbers between the double concave negative lens and the positive lens in the 32 lens group. When the difference v32N−v32P is equal to or falls below the lower limit of conditional expression (23), it becomes difficult to correct lateral chromatic aberration caused by decentering upon vibration reduction. In order to further secure the effect of the present invention, it is desirable to set the lower limit of conditional expression (23) to 12.0.

In the zoom lens system with a vibration reduction mechanism according to the third embodiment of the present invention, it is preferable that the 32 lens group is composed of, in order from the object, a cemented lens constructed by a positive lens having a convex surface facing to the image cemented with a double concave negative lens. With this construction, decentering aberration caused upon vibration reduction can be satisfactorily corrected.

In the zoom lens system with a vibration reduction mechanism according to the third embodiment of the present invention, the following conditional expression (24) is preferably satisfied:

$$-2.00 < (r32R + r32F)/(r32R - r32F) < -0.70 \tag{24}$$

where r32F denotes the radius of curvature of the object side surface of the positive lens in the 32 lens group, r32R denotes the radius of curvature of the image side surface of the double concave negative lens in the 32 lens group.

Conditional expression (24) defines an appropriate range of the shape of the cemented lens in the 32 lens group. When the value (r32R+r32F)/(r32R−r32F) exceeds the upper limit of conditional expression (24) or falls below the lower limit of conditional expression (24), production of decentering aberration caused upon vibration reduction becomes large. In order to further secure the effect of the present invention, it is desirable to set the lower limit of conditional expression (24) to −1.90 and the upper limit to −0.80.

In the zoom lens system with a vibration reduction mechanism according to the third embodiment of the present invention, the following conditional expression (25) is preferably satisfied:

$$0.40 < r32S/f32 < 0.90 \tag{25}$$

where r32S denotes the radius of curvature of the cemented surface of the cemented lens in the 32 lens group, and f32 denotes the focal length of the 32 lens group.

Conditional expression (25) defines an appropriate range of the radius of curvature of the cemented surface of the cemented lens in the 32 lens group. When the ratio r32S/f32 exceeds the upper limit of conditional expression (25) or falls below the lower limit of conditional expression (25), production of decentering aberration caused upon vibration reduction becomes large. In order to further secure the effect of the present invention, it is desirable to set the lower limit of conditional expression (25) to 0.45 and the upper limit to 0.85.

In the zoom lens system with a vibration reduction mechanism according to the third embodiment of the present invention, it is preferable that the zoom lens system consists only of a first lens group, a second lens group, and a third lens group. By arranging no lens group with refractive power to the image side of the third lens group, the zoom lens system can be simple.

In the zoom lens system with a vibration reduction mechanism according to the third embodiment of the present invention, the first lens group is composed of, in order from the object, it is preferable that a 1A lens group having positive refractive power and a 1B lens group having positive refractive power, and focusing from infinity to a close-range object is carried out by moving only the 1B lens group to the object.

In the zoom lens system with a vibration reduction mechanism according to the third embodiment of the present invention, the following conditional expression (26) is preferably satisfied:

$$1.70 < f1A/f1B < 4.00 \tag{26}$$

where f1A denotes the focal length of the 1A lens group, and f1B denotes the focal length of the 1B lens group.

Conditional expression (26) defines an appropriate range of the ratio of the focal length of the 1A lens group to that of the 1B lens group. When the ratio f1A/f1B is equal to or exceeds the upper limit of conditional expression (26), refractive power of the 1B lens group becomes small, so that variation in various aberrations upon focusing becomes large. On the other hand, when the ratio f1A/f1B is equal to or falls below the lower limit of conditional expression (26), refractive power of the 1A lens group becomes small, so that moving amount of the 1A lens group upon focusing becomes large. Accordingly, the zoom lens system becomes large. In order to further secure the effect of the present invention, it is desirable to set the lower limit of conditional expression (26) to 1.90 and the upper limit to 3.50.

Each example according to the third embodiment of the present invention is explained below with reference to accompanying drawings.

EXAMPLE 10

Figure 37:
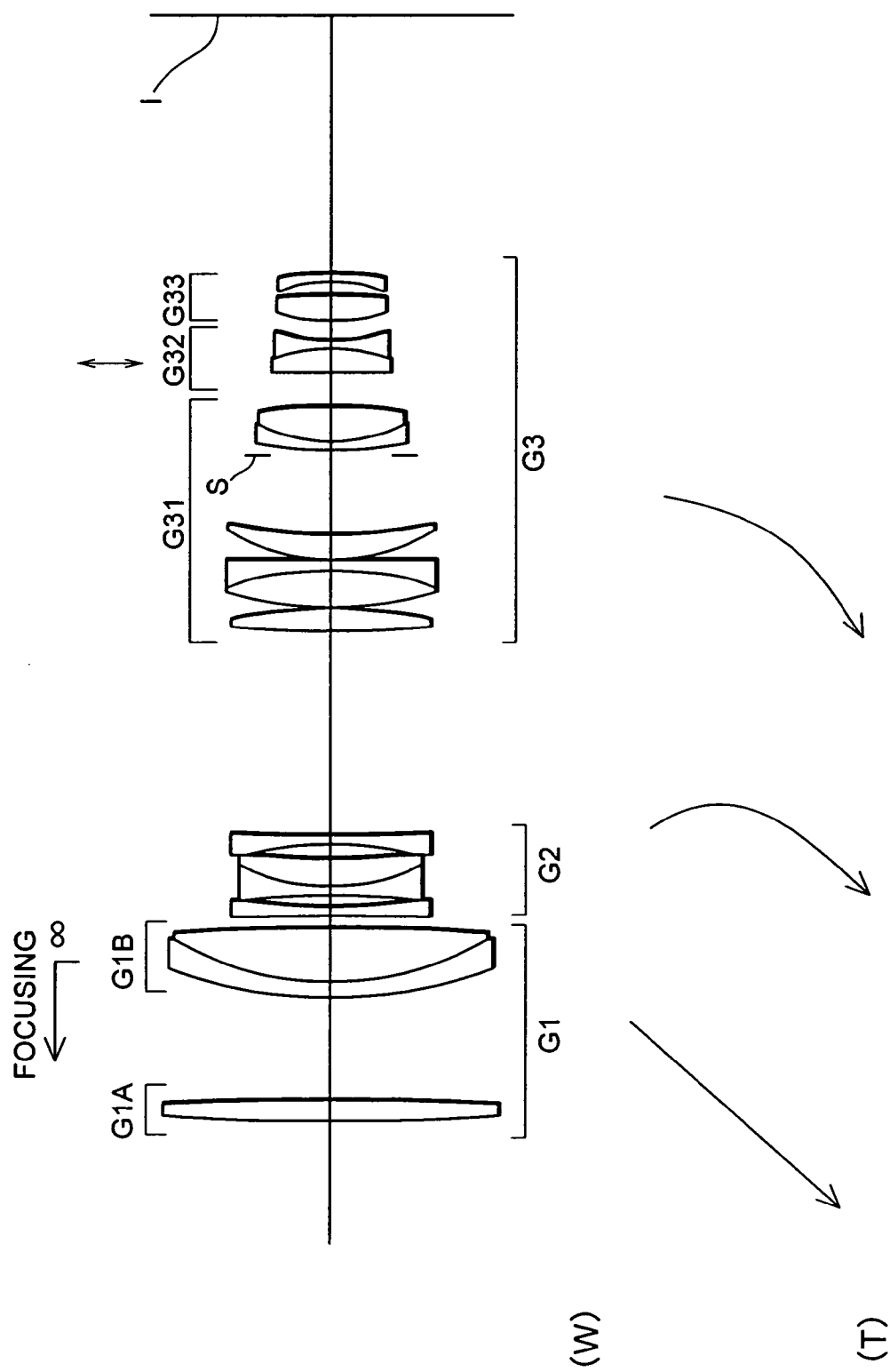
FIG. 37 is a diagram showing a sectional view of a zoom lens system according to Example 10 of a third embodiment of the present invention together with a trajectory of each lens group upon zooming.

FIG. 37 is a diagram showing a sectional view of a zoom lens system according to Example 10 of the third embodiment of the present invention together with a trajectory of each lens group upon zooming.

In FIG. 37, the zoom lens system with a vibration reduction mechanism is composed of, in order from an object, a first lens group G1 having positive refractive power, a second lens group G2 having negative refractive power, and a third lens group G3 having positive refractive power. When the state of lens group positions varies from a wide-angle end state (W) to a telephoto end state (T), the first lens group G1 and the third lens group G3 move to the object and the second lens group G2 moves once to the image I and, then, moves to the object such that a distance between the first lens group G1 and the second lens group G2 increases, and a distance between the second lens group G2 and the third lens group G3 decreases.

The first lens group G1 is composed of, in order from the object, a 1A lens group G1A having positive refractive power, and a 1B lens group G1B having positive refractive power. The 1A lens group G1A is composed of a double convex positive lens. The 1B lens group G1B is composed of, in order from the object, a cemented lens constructed by a negative meniscus lens having a convex surface facing to the object cemented with a double convex positive lens.

The second lens group G2 is composed of, in order from the object, a double concave negative lens, a cemented lens constructed by a double concave negative lens cemented with a positive meniscus lens having a convex surface facing to the object, and a double concave negative lens.

The third lens group G3 is composed of, in order from the object, a 31 lens group G31 having positive refractive power, a 32 lens group G32 having negative refractive power, and a 33 lens group G33 having positive refractive power. The 31 lens group G31 is composed of, in order from the object, a double convex positive lens, a first cemented lens constructed by a double convex positive lens cemented with a double concave negative lens, a positive meniscus lens having a convex surface facing to the object, and a second cemented lens constructed by a negative meniscus lens having a convex surface facing to the object cemented with a double convex positive lens. The 32 lens group G32 is composed of, in order from the object, a cemented lens constructed by a double convex positive lens cemented with a double concave negative lens. The 33 lens group G33 is composed of, in order from the object, a double convex positive lens and a negative meniscus lens having a concave surface facing to the object.

An aperture stop S is arranged between the positive meniscus lens and the second cemented lens in the 31 lens group G31, and is moved together with the third lens group G3 upon zooming from the wide-angle end state (W) to the telephoto end state (T).

Upon detecting a camera shake, vibration reduction on the image plane I is carried out by moving only the 32 lens group G32 perpendicular to the optical axis.

Focusing from infinity to a close-range object is carried out by moving the 1B lens group G1B to the object.

In the wide-angle end state (W) of Example 10 of the third embodiment, vibration reduction coefficient K is 1.47, and the focal length f is 71.40 (mm), so that the image rotation of 0.30° can be corrected by moving the 32 lens group G32 by the amount of 0.254 (mm). In the telephoto end state (T), vibration reduction coefficient K is 2.68, and the focal length f is 294.00 (mm), so that the image rotation of 0.15° can be corrected by moving the 32 lens group G32 by the amount of 0.287 (mm).

Various values associated with Example 10 of the third embodiment of the present invention is listed in Table 10.

In [Moving Amount upon Focusing], δ1B denotes a moving amount of the 1B lens group G1B to the object side focusing at the shooting distance of 1500 (mm).

TABLE 10

[Specifications]

| f = | 71.40 | 134.90 | 294.00 |
|---|---|---|---|
| FNO = | 4.10 | 4.28 | 5.79 |
| 2ω = | 22.50° | 11.75° | 5.44° |

[Lens Data]

| | r | d | ν | n |
|---|---|---|---|---|
| 1 | 485.2517 | 3.3856 | 64.14 | 1.516330 |
| 2 | −485.2517 | (d2) | | |
| 3 | 74.6948 | 2.5000 | 26.52 | 1.761821 |
| 4 | 50.2473 | 8.5338 | 70.23 | 1.487490 |
| 5 | −397.6433 | (d5) | | |
| 6 | −445.5319 | 1.4000 | 49.60 | 1.772499 |
| 7 | 121.5057 | 1.7612 | | |
| 8 | −139.8007 | 1.4000 | 49.60 | 1.772499 |
| 9 | 31.4033 | 4.4544 | 23.78 | 1.846660 |
| 10 | 195.1690 | 2.3037 | | |
| 11 | −63.0020 | 1.4000 | 49.60 | 1.772499 |
| 12 | 863.7974 | (d12) | | |
| 13 | 209.2396 | 3.4957 | 51.47 | 1.733997 |
| 14 | −78.5539 | 0.2000 | | |
| 15 | 53.3010 | 6.1013 | 81.54 | 1.496999 |
| 16 | −47.6905 | 1.4000 | 34.97 | 1.800999 |
| 17 | 743.9564 | 0.2000 | | |
| 18 | 31.2964 | 4.0974 | 60.64 | 1.603112 |
| 19 | 86.8951 | 12.4001 | | |
| 20 | ∞ | 1.0000 | Aperture Stop S | |
| 21 | 67.3937 | 1.3000 | 23.78 | 1.846660 |
| 22 | 26.7354 | 5.4922 | 70.23 | 1.487490 |
| 23 | −88.9999 | 5.5185 | | |
| 24 | 1974.4906 | 3.7052 | 26.52 | 1.761821 |
| 25 | −26.6771 | 1.2000 | 49.60 | 1.772499 |
| 26 | 26.6771 | 3.2607 | | |
| 27 | 29.4872 | 3.9533 | 34.47 | 1.639799 |
| 28 | −93.8522 | 2.2384 | | |
| 29 | −21.9460 | 1.2000 | 49.60 | 1.772499 |
| 30 | −59.2566 | (B.f.) | | |

| | Wide-angle end | Intermediate | Telephoto end |
|---|---|---|---|
| | [Variable Distances] (Infinity) | | |
| f | 71.40000 | 134.90024 | 294.00000 |
| d2 | 16.01875 | 16.01875 | 16.01875 |
| d5 | 2.00000 | 31.41839 | 42.84564 |
| d12 | 32.45495 | 19.43707 | 2.00000 |
| B.f. | 40.62478 | 47.41150 | 80.62502 |
| | [Moving Amount upon Focusing] | | |
| f | 71.40000 | 134.90024 | 294.00000 |
| δ1B | 13.70747 | 13.96627 | 14.28274 |

[Values for Conditional Expressions]

(16) f1/f2 = 1.773
(17) f2/fw = −0.463
(18) f3/fw = 0.500
(19) f32/f3 = −0.9678
(20) f3/f33 = 0.306
(21) n31N − n31P = 0.304
(22) ν31P − ν31N = 46.57
(23) ν32N −ν32P = 23.08
(24) (r32R + r32F)/(r32R −r32F) = −1.027
(25) r32S/f32 = 0.772
(26) f1A/f1B = 2.819

Figure 38A:
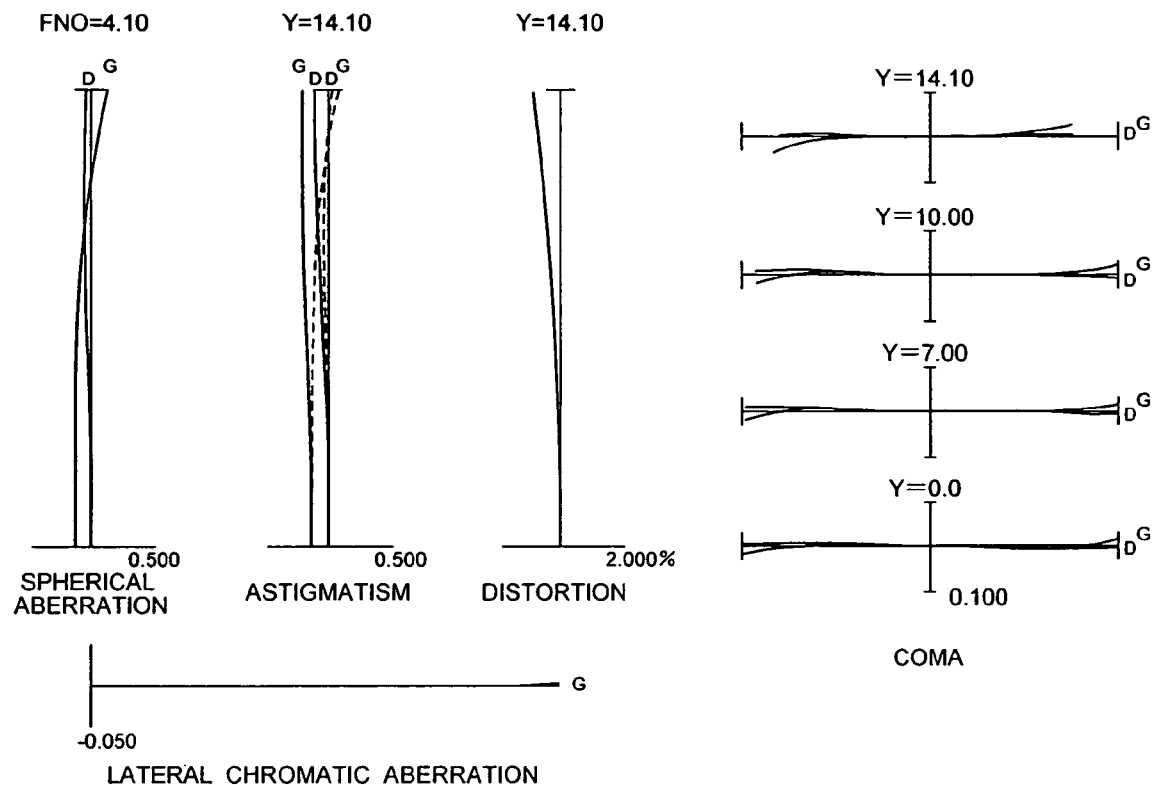
FIGS. 38A and 38B show various aberrations of the zoom lens system according to Example 10 of the third embodiment in a wide-angle end state upon focusing at infinity, and meridional lateral aberration at infinity when vibration reduction is carried out against rotation of 0.30°, respectively.
Figure 38B:
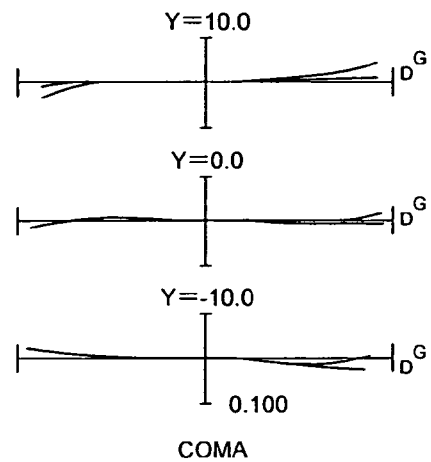
Figure 39:
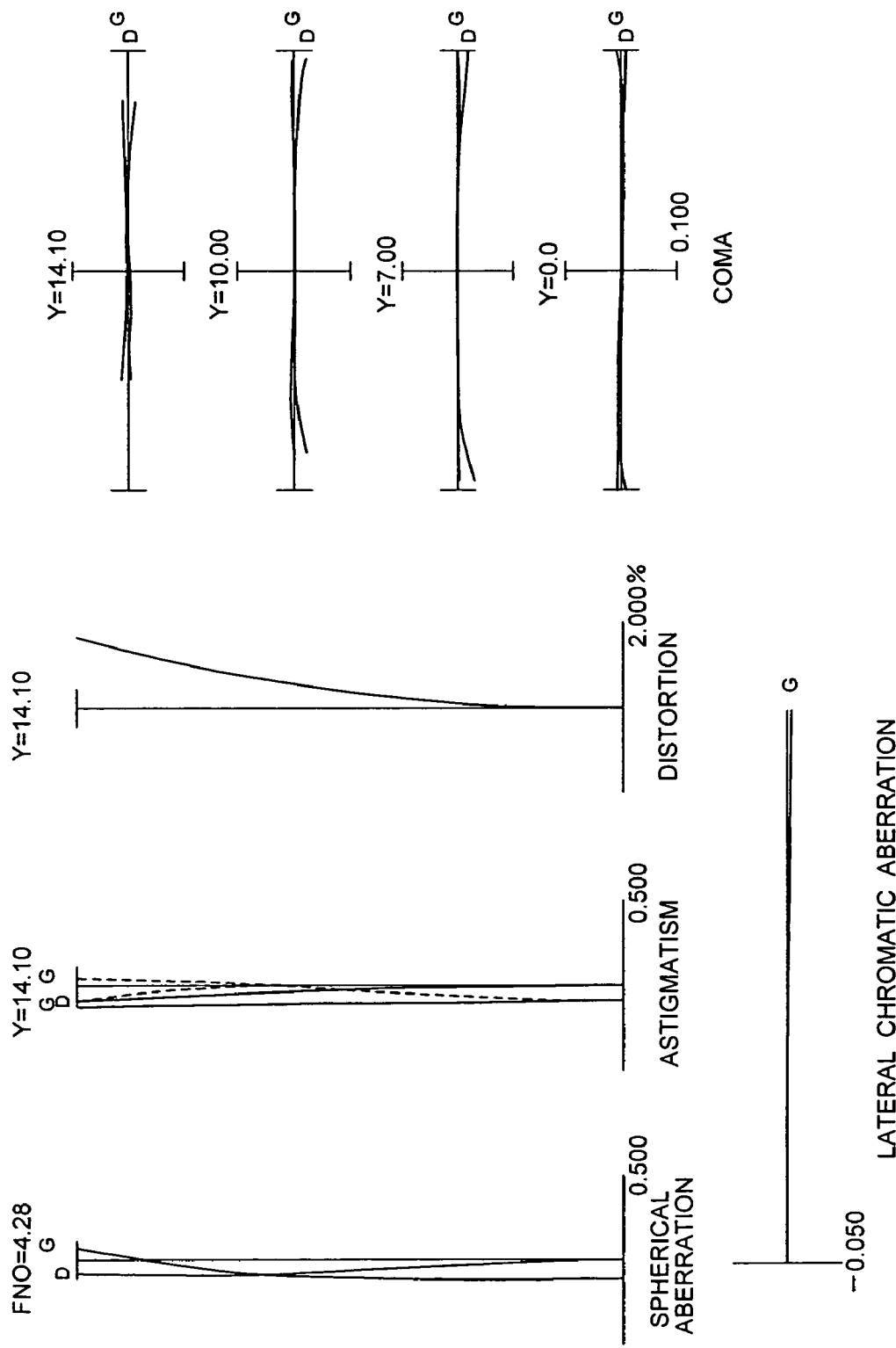
FIG. 39 shows various aberrations of the zoom lens system according to Example 10 of the third embodiment in an intermediate focal length state upon focusing at infinity.
Figure 40A:
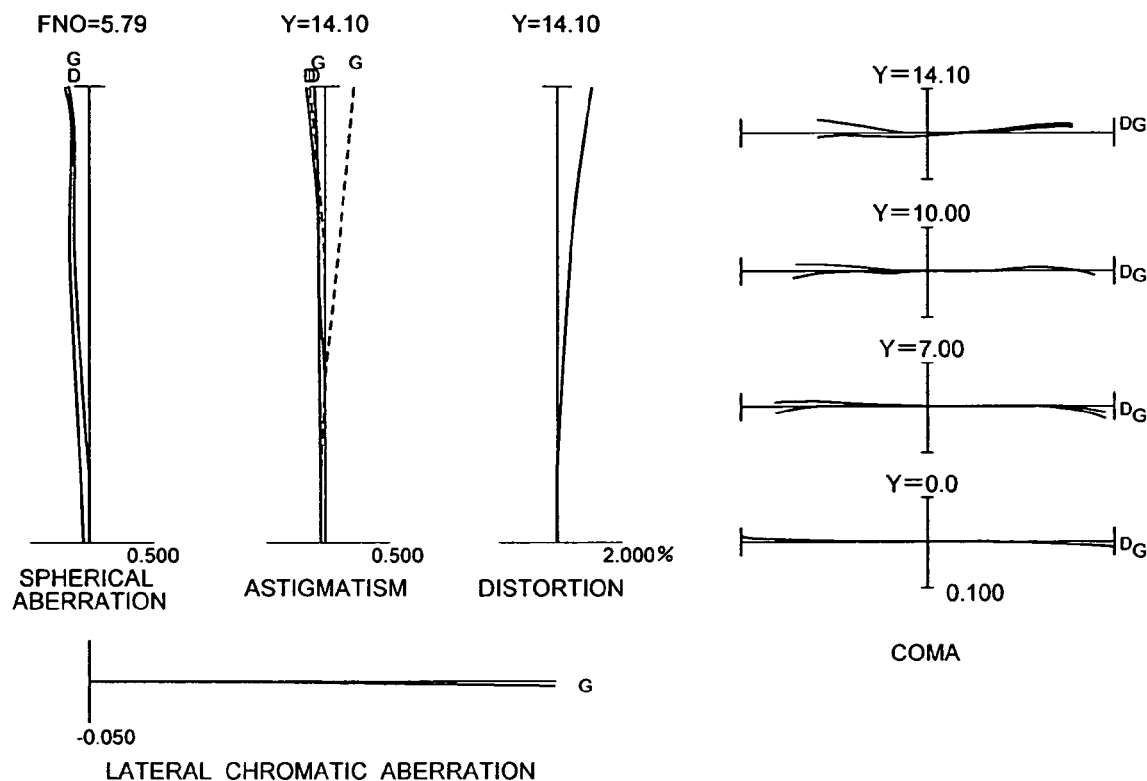
FIGS. 40A and 40B show various aberrations of the zoom lens system according to Example 10 of the third embodiment in a telephoto end state upon focusing at infinity, and meridional lateral aberration at infinity when vibration reduction is carried out against rotation of 0.15°, respectively.
Figure 40B:
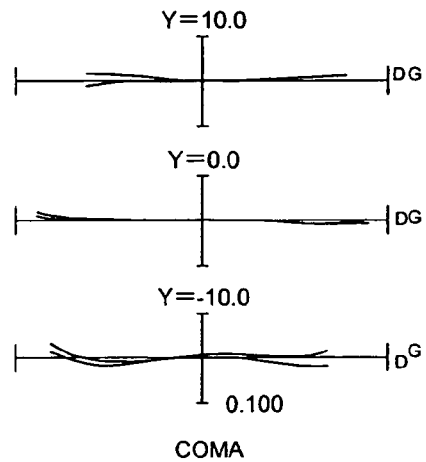

FIGS. 38A and 38B show various aberrations of the zoom lens system according to Example 10 of the third embodiment in a wide-angle end state upon focusing at infinity, and meridional lateral aberration at infinity when vibration reduction is carried out against rotation of 0.30°, respectively. FIG. 39 shows various aberrations of the zoom lens system according to Example 10 of the third embodiment in an intermediate focal length state upon focusing at infinity. FIGS. 40A and 40B show various aberrations of the zoom lens system according to Example 10 of the third embodiment in a telephoto end state upon focusing at infinity, and meridional lateral aberration at infinity when vibration reduction is carried out against rotation of 0.150, respectively.

As is apparent from respective graphs, the zoom lens system according to Example 10 of the third embodiment shows superb optical performance correcting various aberrations.

EXAMPLE 11

FIG. 41 is a diagram showing a sectional view of a zoom lens system according to Example 11 of the third embodiment of the present invention together with a trajectory of each lens group upon zooming.

In FIG. 41, the zoom lens system with a vibration reduction mechanism is composed of, in order from an object, a first lens group G1 having positive refractive power, a second lens group G2 having negative refractive power, and a third lens group G3 having positive refractive power. When the state of lens group positions varies from a wide-angle end state (W) to a telephoto end state (T), the first lens group G1 and the third lens group G3 move to the object and the second lens group G2 moves once to the image I and, then, moves to the object such that a distance between the first lens group G1 and the second lens group G2 increases, and a distance between the second lens group G2 and the third lens group G3 decreases.

The first lens group G1 is composed of, in order from the object, a 1A lens group G1A having positive refractive power, and a 1B lens group G1B having positive refractive power. The 1A lens group G1A is composed of a double convex positive lens. The 1B lens group G1B is composed of, in order from the object, a cemented lens constructed by a negative meniscus lens having a convex surface facing to the object cemented with a double convex positive lens.

The second lens group G2 is composed of, in order from the object, a double concave negative lens, a cemented lens constructed by a double concave negative lens cemented with a positive meniscus lens having a convex surface facing to the object, and a double concave negative lens.

The third lens group G3 is composed of, in order from the object, a 31 lens group G31 having positive refractive power, a 32 lens group G32 having negative refractive power, and a 33 lens group G33 having positive refractive power. The 31 lens group G31 is composed of, in order from the object, a double convex positive lens, a first cemented lens constructed by a double convex positive lens cemented with a double concave negative lens, a positive meniscus lens having a convex surface facing to the object, and a second cemented lens constructed by a negative meniscus lens having a convex surface facing to the object cemented with a double convex positive lens. The 32 lens group G32 is composed of, in order from the object, a cemented lens constructed by a double convex positive lens cemented with a double concave negative lens. The 33 lens group G33 is composed of, in order from the object, a double convex positive lens and a negative meniscus lens having a concave surface facing to the object.

An aperture stop S is arranged between the positive meniscus lens and the second cemented lens in the 31 lens group G31, and is moved together with the third lens group G3 upon zooming from the wide-angle end state (W) to the telephoto end state (T).

Upon detecting a camera shake, vibration reduction on the image plane I is carried out by moving only the 32 lens group G32 perpendicular to the optical axis.

Focusing from infinity to a close-range object is carried out by moving the 1B lens group G1B to the object.

In the wide-angle end state (W) of Example 11 of the third embodiment, vibration reduction coefficient K is 1.02, and the focal length f is 71.40 (mm), so that the image rotation of 0.30° can be corrected by moving the 32 lens group G32 by the amount of 0.367 (mm). In the telephoto end state (T), vibration reduction coefficient K is 1.70, and the focal length f is 294.00 (mm), so that the image rotation of 0.15° can be corrected by moving the 32 lens group G32 by the amount of 0.453 (mm).

Various values associated with Example 11 of the third embodiment of the present invention is listed in Table 11.

TABLE 11

[Specifications]

| f = | 71.40 | 134.90 | 294.00 |
|---|---|---|---|
| FNO = | 4.10 | 4.28 | 5.79 |
| 2ω = | 22.51° | 11.74° | 5.43° |

[Lens Data]

| | r | d | ν | n |
|---|---|---|---|---|
| 1 | 494.1160 | 3.3593 | 64.14 | 1.516330 |
| 2 | −494.1160 | (d2) | | |
| 3 | 74.6142 | 2.5000 | 26.52 | 1.761821 |
| 4 | 50.2492 | 8.5170 | 70.23 | 1.487490 |
| 5 | −409.6962 | (d5) | | |
| 6 | −572.2854 | 1.4000 | 49.60 | 1.772499 |
| 7 | 118.2999 | 1.5934 | | |
| 8 | −150.1597 | 1.4000 | 49.60 | 1.772499 |
| 9 | 28.9590 | 4.2332 | 23.78 | 1.846660 |
| 10 | 159.4762 | 2.3641 | | |
| 11 | −56.2166 | 1.4000 | 49.60 | 1.772499 |
| 12 | 737.8222 | (d12) | | |
| 13 | 255.4424 | 3.4925 | 51.47 | 1.733997 |
| 14 | −65.2491 | 0.2000 | | |
| 15 | 55.4617 | 5.8677 | 81.54 | 1.496999 |
| 16 | −42.2335 | 1.4000 | 34.97 | 1.800999 |
| 17 | 391.1593 | 0.2000 | | |
| 18 | 29.8308 | 4.2307 | 60.64 | 1.603112 |
| 19 | 109.3078 | 9.9568 | | |
| 20 | ∞ | 1.0000 | | Aperture Stop S |
| 21 | 111.2314 | 1.3000 | 23.78 | 1.846660 |
| 22 | 34.2913 | 3.8688 | 70.23 | 1.487490 |
| 23 | −116.1639 | 3.0066 | | |
| 24 | 131.0022 | 2.6204 | 25.42 | 1.805181 |
| 25 | −42.8081 | 1.2000 | 39.58 | 1.804398 |
| 26 | 35.6448 | 6.4837 | | |
| 27 | 44.2831 | 3.9886 | 31.07 | 1.688931 |
| 28 | −53.8284 | 2.7522 | | |
| 29 | −23.7792 | 1.2000 | 49.60 | 1.772499 |
| 30 | −254.9277 | (B.f.) | | |

| | Wide-angle end | Intermediate | Telephoto end |
|---|---|---|---|
| | [Variable Distances] (Infinity) | | |
| f | 71.40000 | 134.90024 | 294.00000 |
| d2 | 16.22141 | 16.22141 | 16.22141 |
| d5 | 2.00000 | 33.62022 | 46.49954 |
| d12 | 29.66797 | 18.37991 | 2.00000 |
| B.f. | 47.57563 | 53.66382 | 85.74428 |

TABLE 11-continued

[Moving Amount upon Focusing]

| f | 71.40000 | 134.90024 | 294.00000 |
|---|---|---|---|
| δ1B | 13.90148 | 14.20164 | 13.03481 |

[Values for Conditional Expressions]

(16) f1/fw = 1.787
(17) f2/f2 = −0.436
(18) f3/fw = 0.500
(19) f32/f3 = −1.738
(20) f3/f33 = 0.063
(21) n31N − n31P = 0.304
(22) ν31P − ν31N = 46.57
(23) ν32N − ν32P = 14.16
(24) (r32R + r32F)/(r32R − r32F) = −1.748
(25) r32S/f32 = 0.690
(26) f1A/f1B = 2.860

Figure 42A:
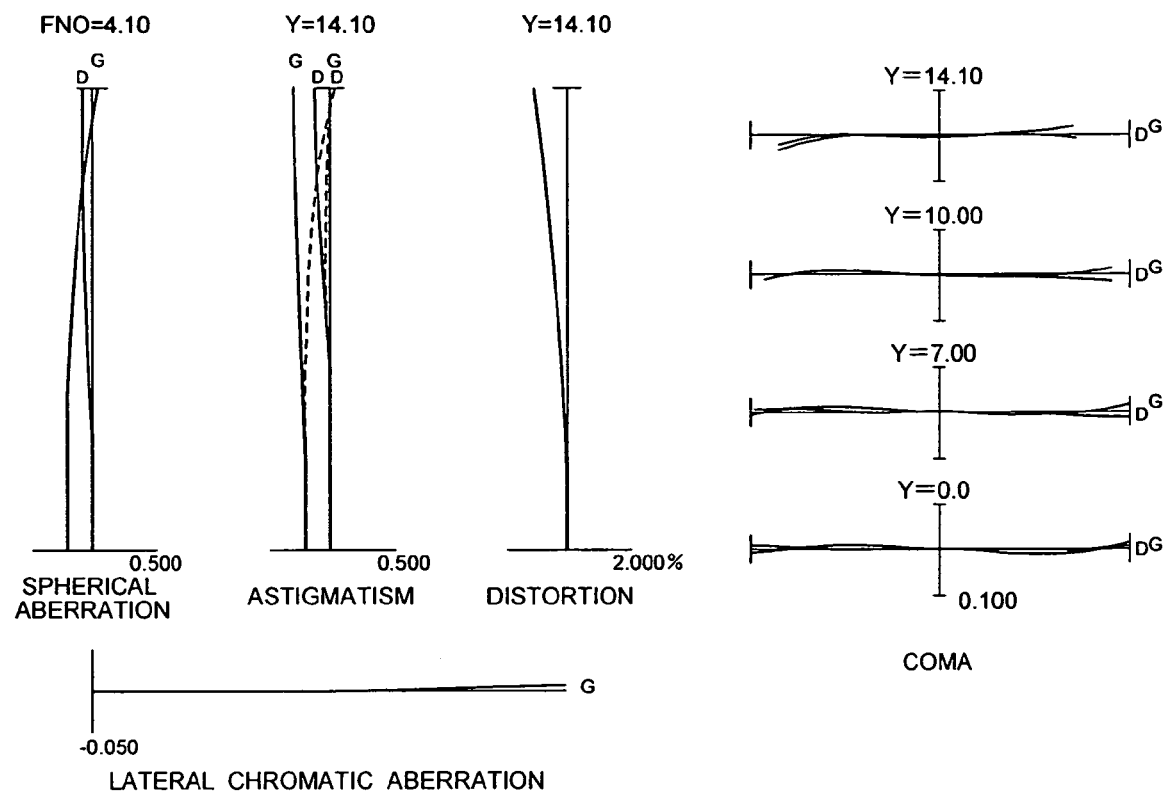
FIGS. 42A and 42B show various aberrations of the zoom lens system according to Example 11 of the third embodiment in a wide-angle end state upon focusing at infinity, and meridional lateral aberration at infinity when vibration reduction is carried out against rotation of 0.30°, respectively.
Figure 42B:
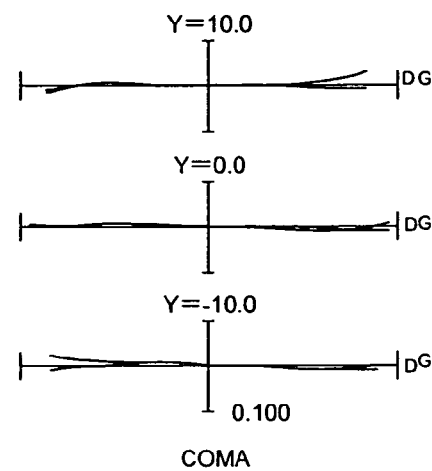
Figure 43:
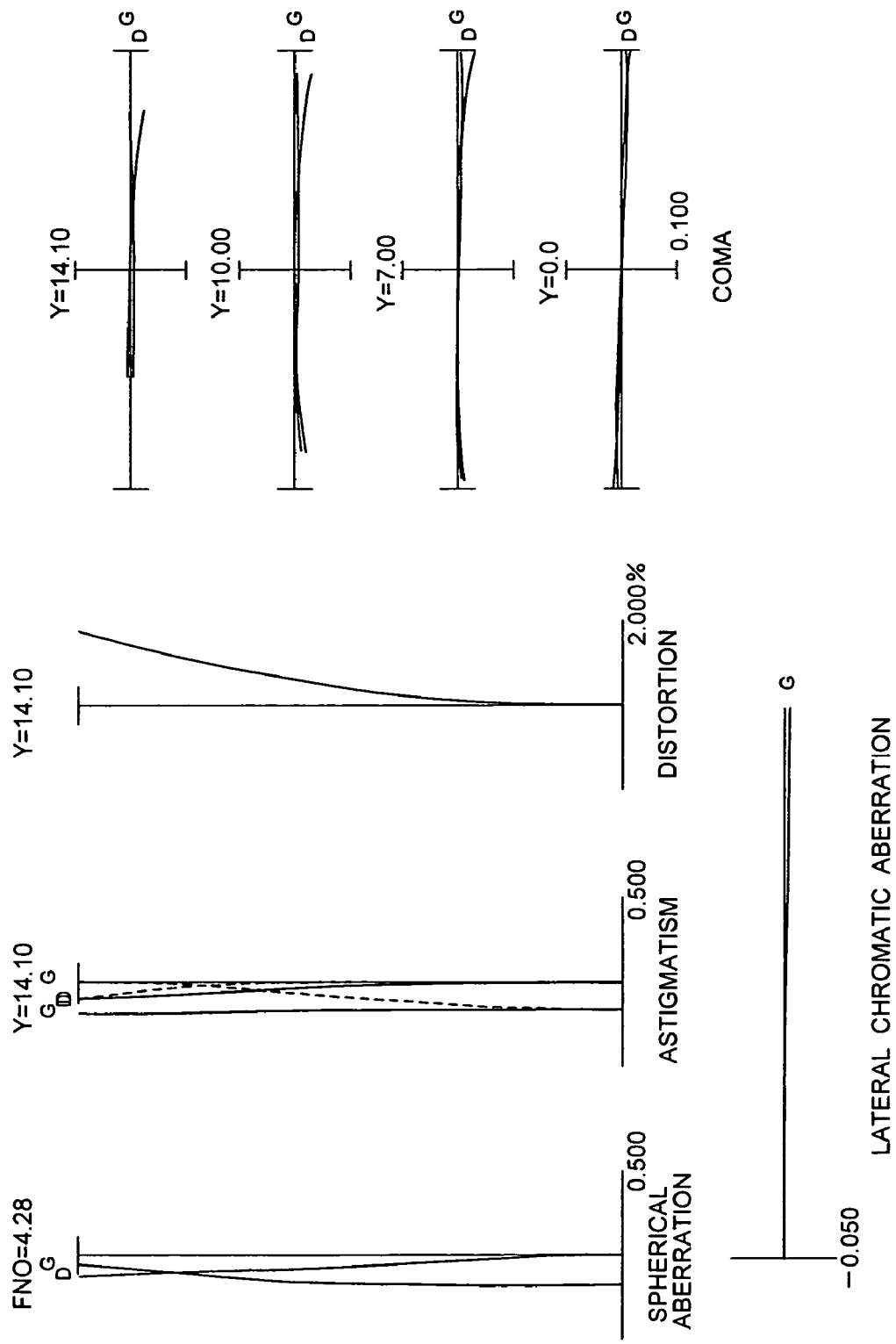
FIG. 43 shows various aberrations of the zoom lens system according to Example 11 of the third embodiment in an intermediate focal length state upon focusing at infinity.
Figure 44A:
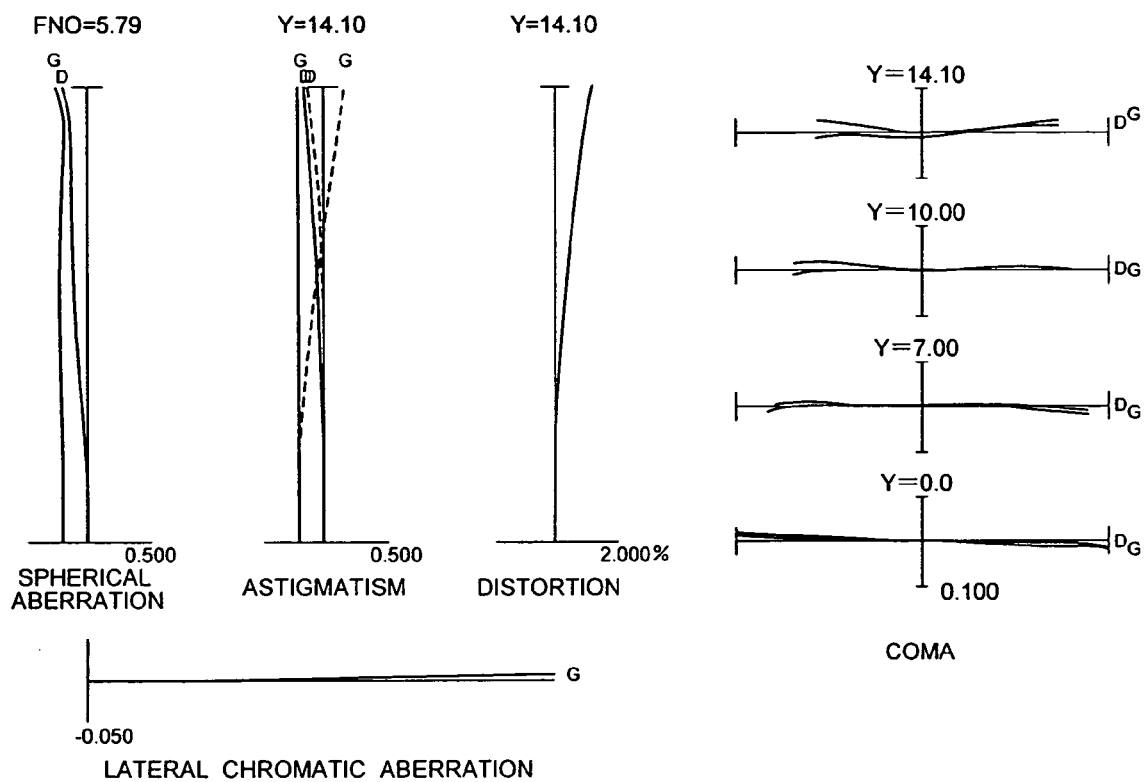
FIGS. 44A and 44B show various aberrations of the zoom lens system according to Example 11 of the third embodiment in a telephoto end state upon focusing at infinity, and meridional lateral aberration at infinity when vibration reduction is carried out against rotation of 0.15°, respectively.
Figure 44B:
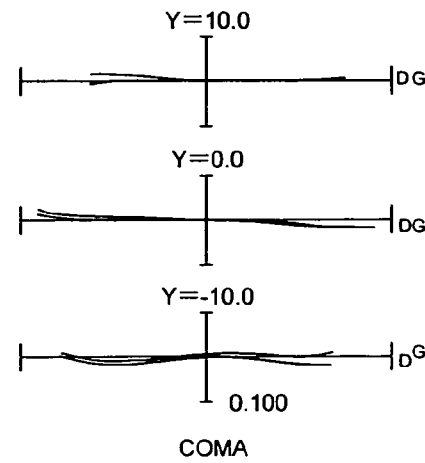

FIGS. 42A and 42B show various aberrations of the zoom lens system according to Example 11 of the third embodiment in a wide-angle end state upon focusing at infinity, and meridional lateral aberration at infinity when vibration reduction is carried out against rotation of 0.30°, respectively. FIG. 43 shows various aberrations of the zoom lens system according to Example 11 of the third embodiment in an intermediate focal length state upon focusing at infinity. FIGS. 44A and 44B show various aberrations of the zoom lens system according to Example 11 of the third embodiment in a telephoto end state upon focusing at infinity, and meridional lateral aberration at infinity when vibration reduction is carried out against rotation of 0.15°, respectively.

As is apparent from respective graphs, the zoom lens system according to Example 11 of the third embodiment shows superb optical performance correcting various aberrations.

EXAMPLE 12

Figure 45:
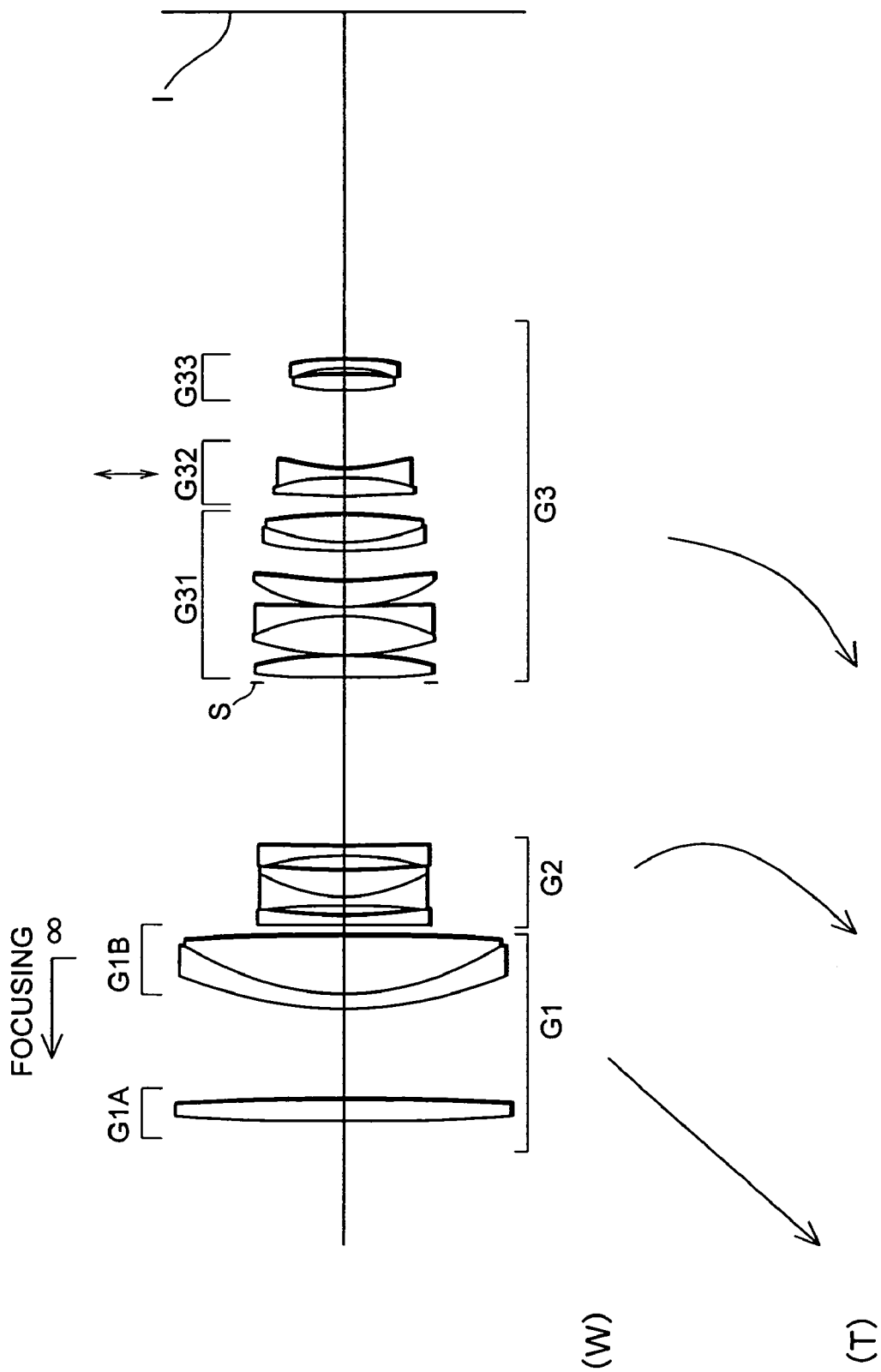
FIG. 45 is a diagram showing a sectional view of a zoom lens system according to Example 12 of the third embodiment of the present invention together with a trajectory of each lens group upon zooming.

FIG. 45 is a diagram showing a sectional view of a zoom lens system according to Example 12 of the third embodiment of the present invention together with a trajectory of each lens group upon zooming.

In FIG. 45, the zoom lens system with a vibration reduction mechanism is composed of, in order from an object, a first lens group G1 having positive refractive power, a second lens group G2 having negative refractive power, and a third lens group G3 having positive refractive power. When the state of lens group positions varies from a wide-angle end state (W) to a telephoto end state (T), the first lens group G1 and the third lens group G3 move to the object and the second lens group G2 moves once to the image I and, then, moves to the object such that a distance between the first lens group G1 and the second lens group G2 increases, and a distance between the second lens group G2 and the third lens group G3 decreases.

The first lens group G1 is composed of, in order from the object, a 1A lens group G1A having positive refractive power, and a 1B lens group G1B having positive refractive power. The 1A lens group G1A is composed of a double convex positive lens. The 1B lens group G1B is composed of, in order from the object, a cemented lens constructed by a negative meniscus lens having a convex surface facing to the object cemented with a double convex positive lens.

The second lens group G2 is composed of, in order from the object, a double concave negative lens, a cemented lens constructed by a double concave negative lens cemented with a positive meniscus lens having a convex surface facing to the object, and a double concave negative lens.

The third lens group G3 is composed of, in order from the object, a 31 lens group G31 having positive refractive power, a 32 lens group G32 having negative refractive power, and a 33 lens group G33 having negative refractive power. The 31 lens group G31 is composed of, in order from the object, a double convex positive lens, a first cemented lens constructed by a double convex positive lens cemented with a double concave negative lens, a positive meniscus lens having a convex surface facing to the object, and a second cemented lens constructed by a negative meniscus lens having a convex surface facing to the object cemented with a double convex positive lens. The 32 lens group G32 is composed of, in order from the object, a cemented lens constructed by a double convex positive lens cemented with a double concave negative lens. The 33 lens group G33 is composed of, in order from the object, a double convex positive lens and a negative meniscus lens having a concave surface facing to the object.

An aperture stop S is arranged to the object side of the 31 lens group G31, and is moved together with the third lens group G3 upon zooming from the wide-angle end state (W) to the telephoto end state (T).

Upon detecting a camera shake, vibration reduction on the image plane I is carried out by moving only the 32 lens group G32 perpendicular to the optical axis.

Focusing from infinity to a close-range object is carried out by moving the 1B lens group G1B to the object.

In the wide-angle end state (W) of Example 12 of the third embodiment, vibration reduction coefficient K is 1.20, and the focal length f is 71.40 (mm), so that the image rotation of 0.30° can be corrected by moving the 32 lens group G32 by the amount of 0.312 (mm). In the telephoto end state (T), vibration reduction coefficient K is 1.80, and the focal length f is 294.00 (mm), so that the image rotation of 0.15° can be corrected by moving the 32 lens group G32 by the amount of 0.428 (mm).

Various values associated with Example 12 of the third embodiment of the present invention is listed in Table 12.

TABLE 12

[Specifications]

| f = | 71.40 | 134.90 | 294.00 |
|---|---|---|---|
| FNO = | 4.11 | 4.34 | 5.80 |
| 2ω = | 22.59° | 11.77° | 5.43° |

[Lens Data]

| | r | d | ν | n |
|---|---|---|---|---|
| 1 | 470.2040 | 3.4304 | 64.14 | 1.516330 |
| 2 | −470.2040 | (d2) | | |
| 3 | 66.8958 | 2.5000 | 26.52 | 1.761821 |
| 4 | 45.5528 | 9.0276 | 70.23 | 1.487490 |
| 5 | −449.7939 | (d5) | | |
| 6 | −402.2639 | 1.4000 | 49.60 | 1.772499 |
| 7 | 87.3056 | 1.8292 | | |
| 8 | −109.2528 | 1.4000 | 49.60 | 1.772499 |
| 9 | 27.2177 | 4.2493 | 23.78 | 1.846660 |
| 10 | 238.8473 | 2.0018 | | |
| 11 | −54.2941 | 1.4000 | 49.60 | 1.772499 |
| 12 | 405.9871 | (d12) | | |
| 13 | ∞ | 1.0000 | | Aperture Stop S |
| 14 | 202.2803 | 3.3407 | 51.47 | 1.733997 |
| 15 | −69.7514 | 0.2000 | | |
| 16 | 49.4756 | 6.2066 | 81.54 | 1.496999 |
| 17 | −36.3641 | 1.4000 | 34.97 | 1.800999 |

TABLE 12-continued

| 18 | 417.1479 | 0.2000 | | |
|---|---|---|---|---|
| 19 | 30.2273 | 4.0221 | 60.64 | 1.603112 |
| 20 | 106.7084 | 4.7396 | | |
| 21 | 66.4249 | 1.3000 | 23.78 | 1.846660 |
| 22 | 38.1999 | 4.3369 | 70.23 | 1.487490 |
| 23 | −91.4989 | 3.0000 | | |
| 24 | 195.2029 | 2.8722 | 25.42 | 1.805181 |
| 25 | −40.8879 | 1.2000 | 39.58 | 1.804398 |
| 26 | 39.1832 | 12.6471 | | |
| 27 | 71.7192 | 2.3982 | 31.07 | 1.688931 |
| 28 | −76.4137 | 1.3004 | | |
| 29 | −21.7636 | 1.2000 | 49.60 | 1.772499 |
| 30 | −61.3686 | (B.f.) | | |

| | Wide-angle end | Intermediate | Telephoto end |
|---|---|---|---|
| | [Variable Distance] (Infinity) | | |
| f | 71.40008 | 134.89998 | 294.00000 |
| d2 | 14.05307 | 14.05307 | 14.05307 |
| d5 | 2.00000 | 33.03379 | 46.59044 |
| d12 | 25.89044 | 16.74440 | 2.00000 |
| B.f. | 54.45490 | 59.34588 | 88.75509 |
| | [Moving Amount upon Focusing] | | |
| f | 71.40008 | 134.89998 | 294.00000 |
| δ1B | 11.82193 | 12.07969 | 12.36388 |

[Values for Conditional Expressions]

(16) f1/f2 = 1.653
(17) f2/fw = −0.379
(18) f3/fw = 0.491
(19) f32/f3 = −1.762
(20) f3/f33 = −0.120
(21) n31N − n31P = 0.304
(22) ν31P − ν31N = 46.57
(23) ν32N − ν32P = 13.93
(24) (r32R + r32F)/(r32R − r32F) = −1.502
(25) r32S/f32 = 0.662
(26) f1A/f1B = 2.960

Figure 46A:
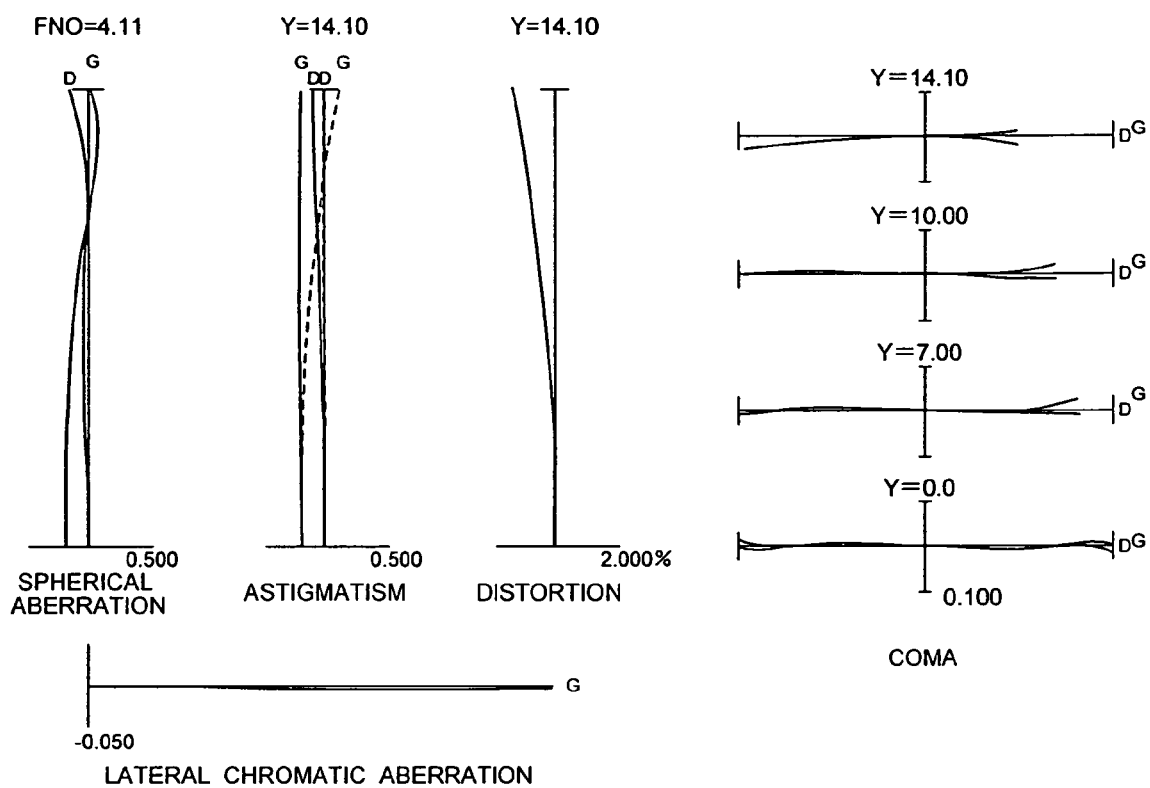
FIGS. 46A and 46B show various aberrations of the zoom lens system according to Example 12 of the third embodiment in a wide-angle end state upon focusing at infinity, and meridional lateral aberration at infinity when vibration reduction is carried out against rotation of 0.30°, respectively.
Figure 46B:
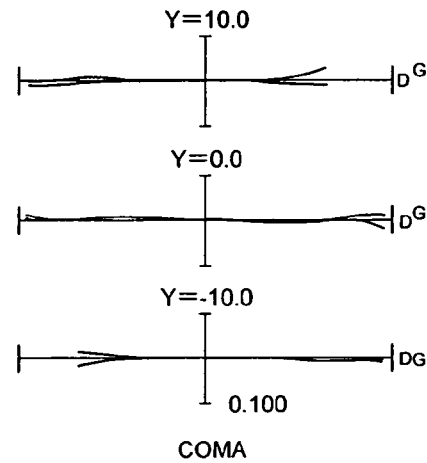
Figure 47:
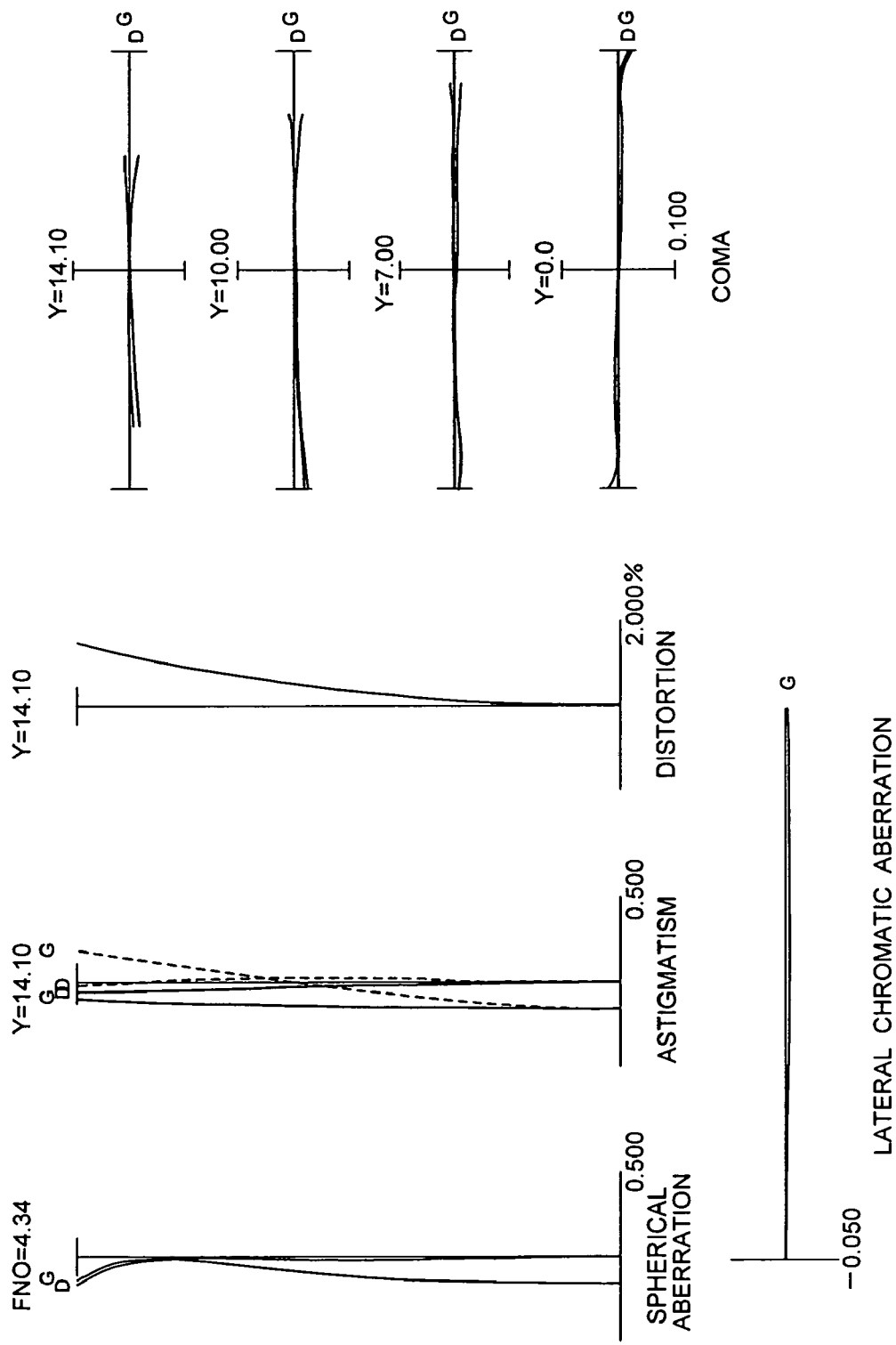
FIG. 47 shows various aberrations of the zoom lens system according to Example 12 of the third embodiment in an intermediate focal length state upon focusing at infinity.
Figure 48A:
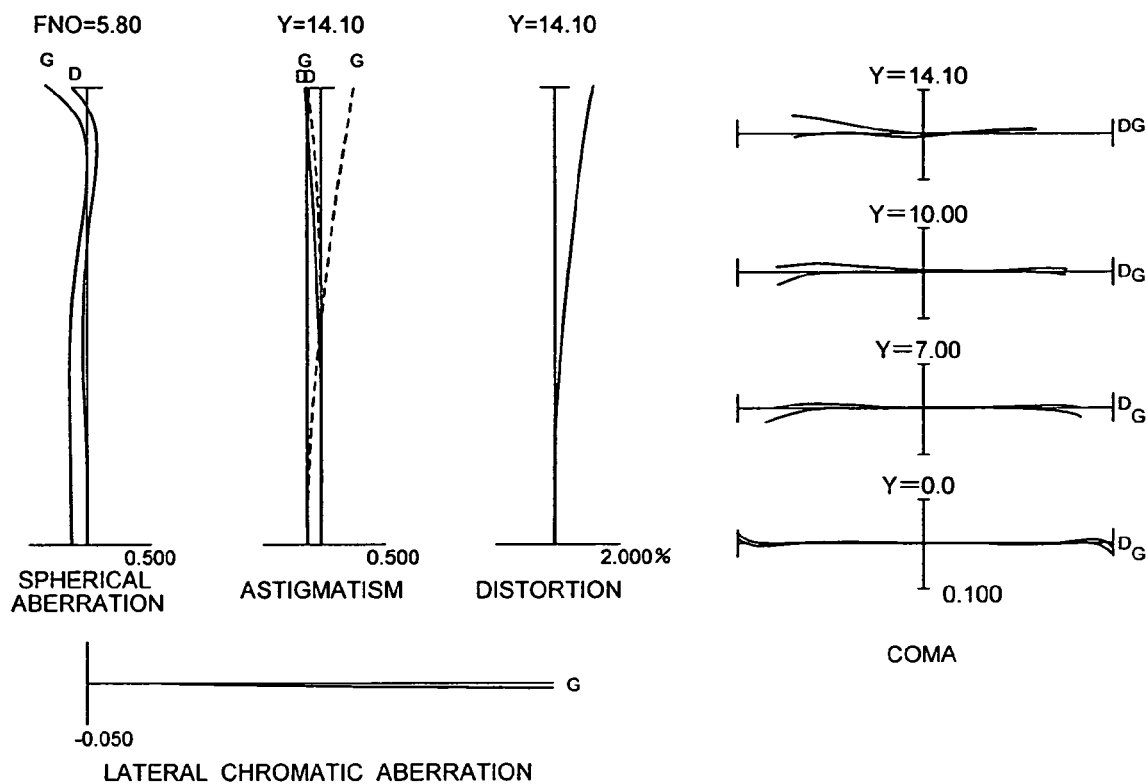
FIGS. 48A and 48B show various aberrations of the zoom lens system according to Example 12 of the third embodiment in a telephoto end state upon focusing at infinity, and meridional lateral aberration at infinity when vibration reduction is carried out against rotation of 0.15°, respectively.
Figure 48B:
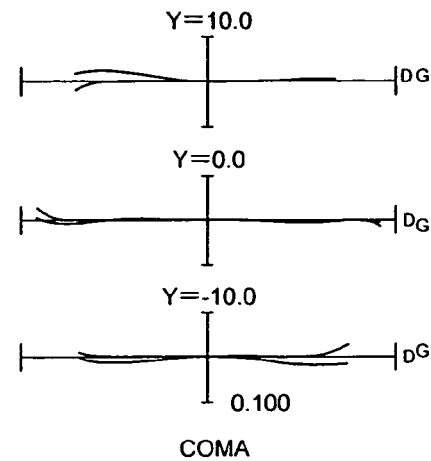

FIGS. 46A and 46B show various aberrations of the zoom lens system according to Example 12 of the third embodiment in a wide-angle end state upon focusing at infinity, and meridional lateral aberration at infinity when vibration reduction is carried out against rotation of 0.30°, respectively. FIG. 47 shows various aberrations of the zoom lens system according to Example 12 of the third embodiment in an intermediate focal length state upon focusing at infinity. FIGS. 48A and 48B show various aberrations of the zoom lens system according to Example 12 of the third embodiment in a telephoto end state upon focusing at infinity, and meridional lateral aberration at infinity when vibration reduction is carried out against rotation of 0.15°, respectively.

As is apparent from respective graphs, the zoom lens system according to Example 12 of the third embodiment shows superb optical performance correcting various aberrations.

EXAMPLE 13

FIG. 49 is a diagram showing a sectional view of a zoom lens system according to Example 13 of the third embodiment of the present invention together with a trajectory of each lens group upon zooming.

In FIG. 49, the zoom lens system with a vibration reduction mechanism is composed of, in order from an object, a first lens group G1 having positive refractive power, a second lens group G2 having negative refractive power, and a third lens group G3 having positive refractive power. When the state of lens group positions varies from a wide-angle end state (W) to a telephoto end state (T), the first lens group G1 and the third lens group G3 move to the object and the second lens group G2 moves once to the image I and, then, moves to the object such that a distance between the first lens group G1 and the second lens group G2 increases, and a distance between the second lens group G2 and the third lens group G3 decreases.

The first lens group G1 is composed of, in order from the object, a 1A lens group G1A having positive refractive power, and a 1B lens group G1B having positive refractive power. The 1A lens group G1A is composed of a double convex positive lens. The 1B lens group G1B is composed of, in order from the object, a cemented lens constructed by a negative meniscus lens having a convex surface facing to the object cemented with a double convex positive lens.

The second lens group G2 is composed of, in order from the object, a double concave negative lens, a cemented lens constructed by a double concave negative lens cemented with a positive meniscus lens having a convex surface facing to the object, and a double concave negative lens.

The third lens group G3 is composed of, in order from the object, a 31 lens group G31 having positive refractive power, a 32 lens group G32 having negative refractive power, and a 33 lens group G33 having negative refractive power. The 31 lens group G31 is composed of, in order from the object, a double convex positive lens, a first cemented lens constructed by a double convex positive lens cemented with a double concave negative lens, a positive meniscus lens having a convex surface facing to the object, and a second cemented lens constructed by a negative meniscus lens having a convex surface facing to the object cemented with a double convex positive lens. The 32 lens group G32 is composed of, in order from the object, a cemented lens constructed by a double convex positive lens cemented with a double concave negative lens. The 33 lens group G33 is composed of, in order from the object, a double convex positive lens and a negative meniscus lens having a concave surface facing to the object.

An aperture stop S is arranged between the 32 lens group G32 and the 33 lens group G33, and is moved together with the third lens group G3 upon zooming from the wide-angle end state (W) to the telephoto end state (T).

Upon detecting a camera shake, vibration reduction on the image plane I is carried out by moving only the 32 lens group G32 perpendicular to the optical axis.

Focusing from infinity to a close-range object is carried out by moving the 1B lens group G1B to the object.

In the wide-angle end state (W) of Example 13 of the third embodiment, vibration reduction coefficient K is 1.22, and the focal length f is 71.40 (mm), so that the image rotation of 0.30° can be corrected by moving the 32 lens group G32 by the amount of 0.306 (mm). In the telephoto end state (T), vibration reduction coefficient K is 1.77, and the focal length f is 294.00 (mm), so that the image rotation of 0.15° can be corrected by moving the 32 lens group G32 by the amount of 0.435 (mm).

Various values associated with Example 13 of the third embodiment of the present invention is listed in Table 13.

TABLE 13

[Specifications]

| f = | 71.40 | 134.90 | 294.00 |
|---|---|---|---|
| FNO = | 3.99 | 4.07 | 5.80 |

TABLE 13-continued

| 2ω = | 22.60° | 11.74° | 5.43° |
|---|---|---|---|

[Lens Data]

| | r | d | ν | n |
|---|---|---|---|---|
| 1 | 435.2356 | 3.5738 | 64.14 | 1.516330 |
| 2 | −435.2356 | (d2) | | |
| 3 | 65.0718 | 2.5000 | 26.52 | 1.761821 |
| 4 | 44.2697 | 9.2741 | 70.23 | 1.487490 |
| 5 | −463.1280 | (d5) | | |
| 6 | −312.4330 | 1.4000 | 49.60 | 1.772499 |
| 7 | 89.0862 | 1.9706 | | |
| 8 | −89.6775 | 1.4000 | 49.60 | 1.772499 |
| 9 | 27.3391 | 4.2567 | 23.78 | 1.846660 |
| 10 | 234.4984 | 1.8028 | | |
| 11 | −63.7183 | 1.4000 | 49.60 | 1.772499 |
| 12 | 421.2241 | (d12) | | |
| 13 | 128.9757 | 3.6394 | 49.34 | 1.743198 |
| 14 | −65.2871 | 0.2000 | | |
| 15 | 45.1211 | 6.2141 | 81.54 | 1.496999 |
| 16 | −34.9173 | 1.4000 | 33.89 | 1.803840 |
| 17 | 179.4381 | 0.2000 | | |
| 18 | 28.1967 | 3.1441 | 61.13 | 1.589130 |
| 19 | 51.4191 | 3.2906 | | |
| 20 | 61.2265 | 1.3000 | 23.78 | 1.846660 |
| 21 | 41.2033 | 4.3881 | 70.23 | 1.487490 |
| 22 | −71.4444 | 3.0000 | | |
| 23 | 2400.8873 | 2.8952 | 25.42 | 1.805181 |
| 24 | −34.5253 | 1.2000 | 40.10 | 1.762001 |
| 25 | 43.6975 | 3.0000 | | |
| 26 | ∞ | 10.7331 | | Aperture Stop S |
| 27 | 109.9589 | 2.6855 | 33.79 | 1.647689 |
| 28 | −56.7968 | 1.6430 | | |
| 29 | −21.1003 | 1.2000 | 50.23 | 1.719995 |
| 30 | −54.1165 | (B.f.) | | |

| | Wide-angle end | Intermediate | Telephoto end |
|---|---|---|---|
| | [Variable Distances] (Infinity) | | |
| f | 71.40000 | 134.90000 | 294.00000 |
| d2 | 13.51363 | 13.51363 | 13.51363 |
| d5 | 2.06047 | 33.56902 | 45.03690 |
| d12 | 27.97643 | 18.33799 | 2.00000 |
| B.f. | 55.73858 | 57.28561 | 87.73867 |
| | [Moving Amount upon Focusing] | | |
| f | 71.40000 | 134.90000 | 294.00000 |
| δ1B | 11.13016 | 11.34131 | 11.58141 |

[Values for Conditional Expressions]

(16) f1/fw = 1.600
(17) f2/fw = −0.382
(18) f3/fw = 0.512
(19) f32/f3 = −1.730
(20) f3/f33 = −0.099
(21) n31N − n31P = 0.307
(22) ν31P − ν31N = 47.65
(23) ν32N − ν32P = 14.68
(24) (r32R + r32F)/(r32R − r32F) = −1.037
(25) r32S/f32 = 0.546
(26) f1A/f1B = 2.791

Figure 50A:
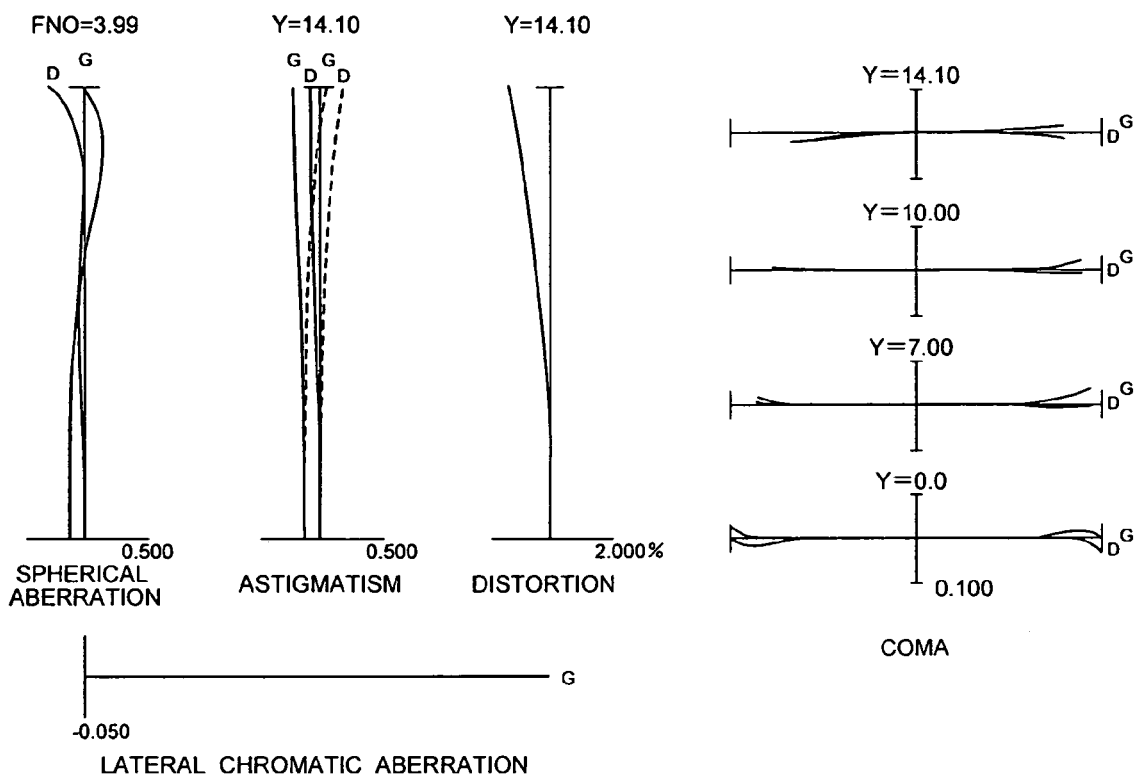
FIGS. 50A and 50B show various aberrations of the zoom lens system according to Example 13 of the third embodiment in a wide-angle end state upon focusing at infinity, and meridional lateral aberration at infinity when vibration reduction is carried out against rotation of 0.30°, respectively.
Figure 50B:
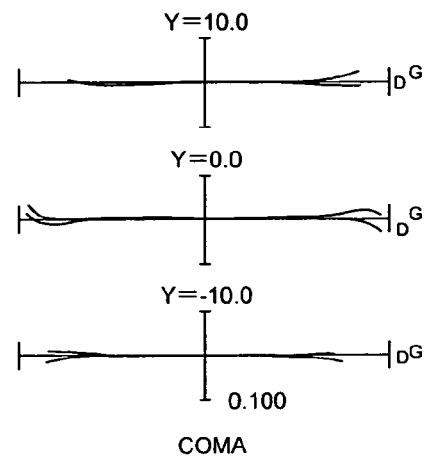
Figure 51:
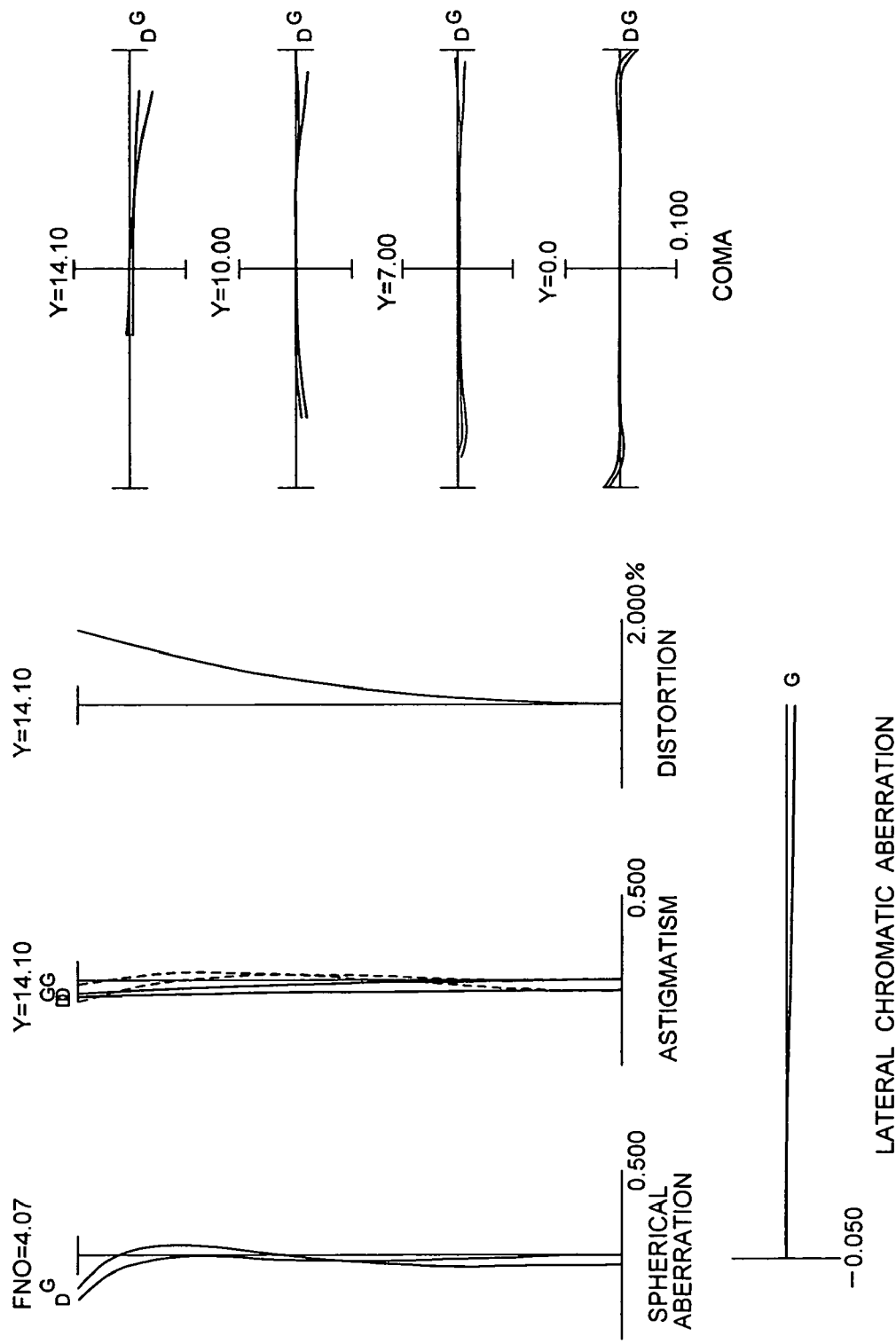
FIG. 51 shows various aberrations of the zoom lens system according to Example 13 of the third embodiment in an intermediate focal length state upon focusing at infinity.
Figure 52A:
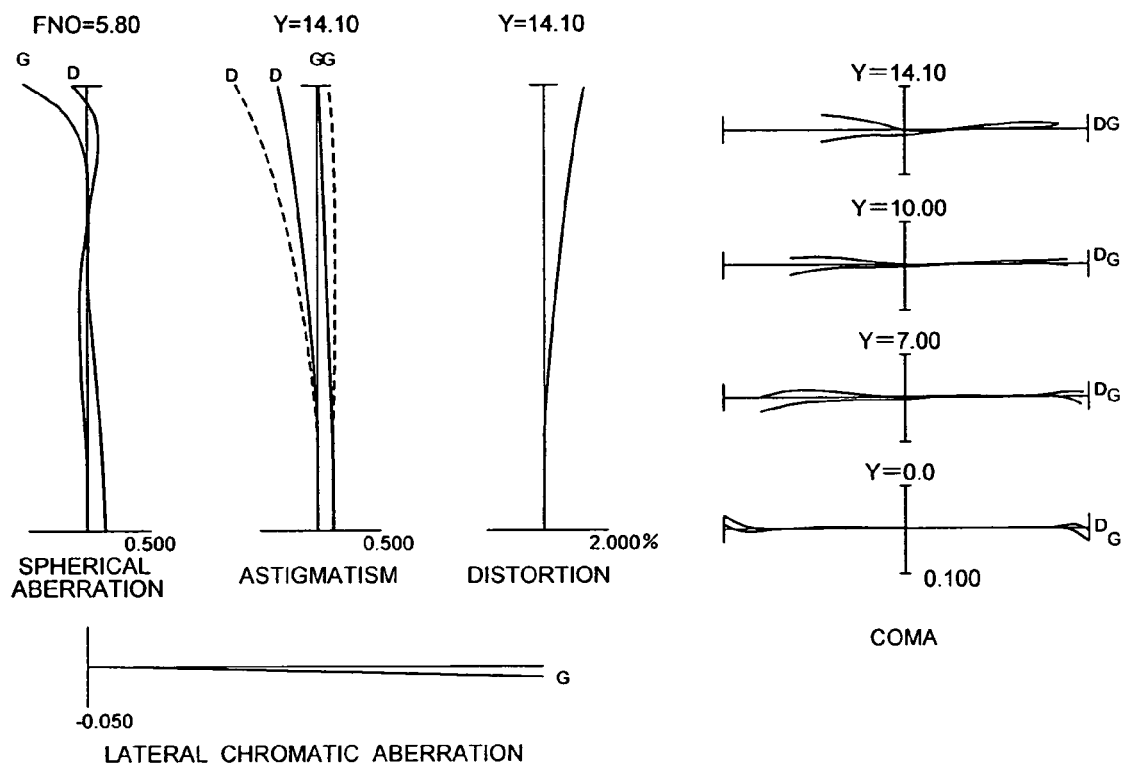
FIGS. 52A and 52B show various aberrations of the zoom lens system according to Example 13 of the third embodiment in a telephoto end state upon focusing at infinity, and meridional lateral aberration at infinity when vibration reduction is carried out against rotation of 0.15°, respectively.
Figure 52B:
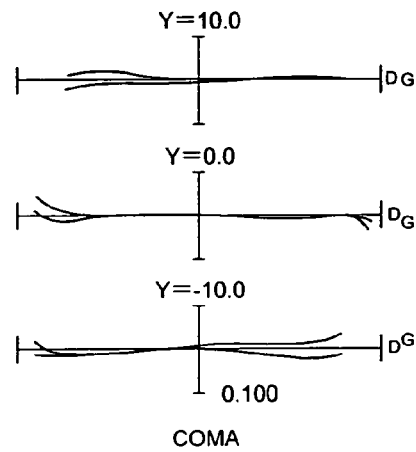

FIGS. 50A and 50B show various aberrations of the zoom lens system according to Example 13 of the third embodiment in a wide-angle end state upon focusing at infinity, and meridional lateral aberration at infinity when vibration reduction is carried out against rotation of 0.30°, respectively. FIG. 51 shows various aberrations of the zoom lens system according to Example 13 of the third embodiment in an intermediate focal length state upon focusing at infinity. FIGS. 52A and 52B show various aberrations of the zoom lens system according to Example 13 of the third embodiment in a telephoto end state upon focusing at infinity, and meridional lateral aberration at infinity when vibration reduction is carried out against rotation of 0.15°, respectively.

As is apparent from respective graphs, the zoom lens system according to Example 13 of the third embodiment shows superb optical performance correcting various aberrations.

EXAMPLE 14

Figure 53:
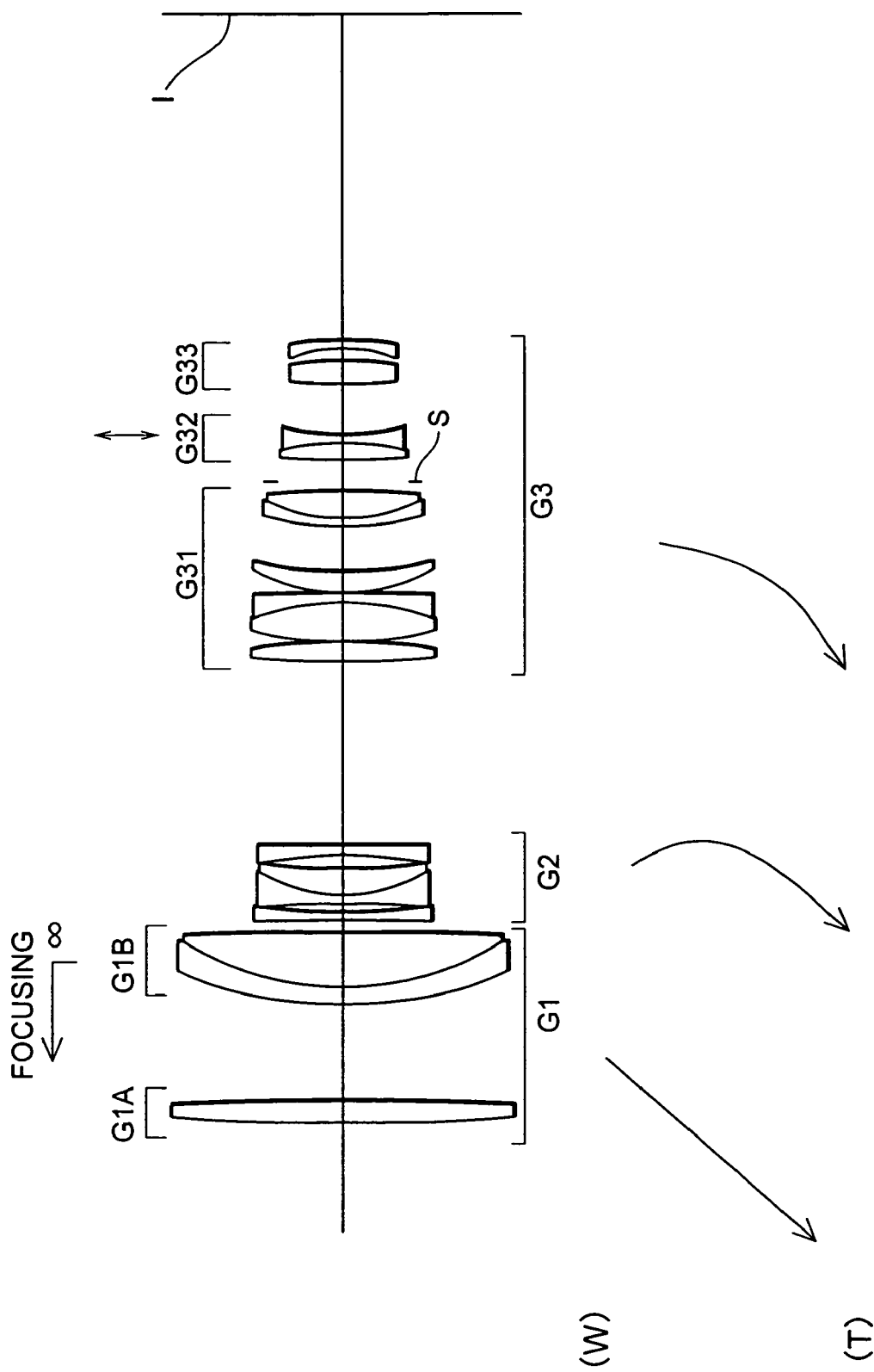
FIG. 53 is a diagram showing a sectional view of a zoom lens system according to Example 14 of the third embodiment of the present invention together with a trajectory of each lens group upon zooming.

FIG. 53 is a diagram showing a sectional view of a zoom lens system according to Example 14 of the third embodiment of the present invention together with a trajectory of each lens group upon zooming.

In FIG. 53, the zoom lens system with a vibration reduction mechanism is composed of, in order from an object, a first lens group G1 having positive refractive power, a second lens group G2 having negative refractive power, and a third lens group G3 having positive refractive power. When the state of lens group positions varies from a wide-angle end state (W) to a telephoto end state (T), the first lens group G1 and the third lens group G3 move to the object and the second lens group G2 moves once to the image I and, then, moves to the object such that a distance between the first lens group G1 and the second lens group G2 increases, and a distance between the second lens group G2 and the third lens group G3 decreases.

The first lens group G1 is composed of, in order from the object, a 1A lens group G1A having positive refractive power, and a 1B lens group G1B having positive refractive power. The 1A lens group G1A is composed of a double convex positive lens. The 1B lens group G1B is composed of, in order from the object, a cemented lens constructed by a negative meniscus lens having a convex surface facing to the object cemented with a double convex positive lens.

The second lens group G2 is composed of, in order from the object, a double concave negative lens, a cemented lens constructed by a double concave negative lens cemented with a positive meniscus lens having a convex surface facing to the object, and a double concave negative lens.

The third lens group G3 is composed of, in order from the object, a 31 lens group G31 having positive refractive power, a 32 lens group G32 having negative refractive power, and a 33 lens group G33 having negative refractive power. The 31 lens group G31 is composed of, in order from the object, a double convex positive lens, a first cemented lens constructed by a double convex positive lens cemented with a negative meniscus lens, a positive meniscus lens having a convex surface facing to the object, and a second cemented lens constructed by a negative meniscus lens having a convex surface facing to the object cemented with a double convex positive lens. The 32 lens group G32 is composed of, in order from the object, a cemented lens constructed by a double convex positive lens cemented with a double concave negative lens. The 33 lens group G33 is composed of, in order from the object, a double convex positive lens and a negative meniscus lens having a concave surface facing to the object.

An aperture stop S is arranged between the 31 lens group G31 and the 32 lens group G32, and is moved together with the third lens group G3 upon zooming from the wide-angle end state (W) to the telephoto end state (T).

Upon detecting a camera shake, vibration reduction on the image plane I is carried out by moving only the 32 lens group G32 perpendicular to the optical axis.

Focusing from infinity to a close-range object is carried out by moving the 1B lens group G1B to the object.

In the wide-angle end state (W) of Example 14 of the third embodiment, vibration reduction coefficient K is 1.20, and the focal length f is 71.40 (mm), so that the image rotation of 0.30° can be corrected by moving the 32 lens group G32 by the amount of 0.312 (mm). In the telephoto end state (T), vibration reduction coefficient K is 1.75, and the focal length f is 294.00 (mm), so that the image rotation of 0.15° can be corrected by moving the 32 lens group G32 by the amount of 0.440 (mm).

Various values associated with Example 14 of the third embodiment of the present invention is listed in Table 14.

TABLE 14

[Specifications]

| f = | 71.40 | 134.91 | 294.00 |
|---|---|---|---|
| FNO = | 4.07 | 4.21 | 5.80 |
| 2ω = | 22.52° | 11.72° | 5.42° |

[Lens Data]

| | r | d | ν | n |
|---|---|---|---|---|
| 1 | 469.3093 | 3.4317 | 64.14 | 1.516330 |
| 2 | −469.3093 | (d2) | | |
| 3 | 70.6717 | 2.5000 | 26.52 | 1.761821 |
| 4 | 47.9817 | 8.6474 | 70.23 | 1.487490 |
| 5 | −513.7728 | (d5) | | |
| 6 | −449.1622 | 1.4000 | 49.60 | 1.772499 |
| 7 | 121.4673 | 1.3256 | | |
| 8 | −170.8246 | 1.4000 | 49.60 | 1.772499 |
| 9 | 25.7253 | 4.1467 | 23.78 | 1.846660 |
| 10 | 114.2679 | 2.1893 | | |
| 11 | −58.0505 | 1.4000 | 49.60 | 1.772499 |
| 12 | 427.6062 | (d12) | | |
| 13 | 184.6338 | 3.0978 | 52.64 | 1.740999 |
| 14 | −77.4294 | 0.2000 | | |
| 15 | 60.5320 | 6.2886 | 81.54 | 1.496999 |
| 16 | −38.0057 | 1.4000 | 34.97 | 1.800999 |
| 17 | −2769.6388 | 0.2000 | | |
| 18 | 29.4015 | 3.3326 | 60.64 | 1.603112 |
| 19 | 65.7395 | 7.2941 | | |
| 20 | 48.4532 | 1.3000 | 23.78 | 1.846660 |
| 21 | 28.7258 | 4.3311 | 70.23 | 1.487490 |
| 22 | −116.3213 | 1.4000 | | |
| 23 | ∞ | 3.6000 | Aperture Stop S | |
| 24 | 192.1240 | 2.6534 | 25.42 | 1.805181 |
| 25 | −39.8609 | 1.2000 | 39.58 | 1.804398 |
| 26 | 36.5000 | 8.1971 | | |
| 27 | 74.0134 | 3.9109 | 31.07 | 1.688931 |
| 28 | −49.3643 | 1.8413 | | |
| 29 | −22.3167 | 1.2000 | 49.60 | 1.772499 |
| 30 | −89.5841 | (B.f.) | | |

| | Wide-angle end | Intermediate | Telephoto end |
|---|---|---|---|
| | [Variable Distances] (Infinity) | | |
| f | 71.40015 | 134.90898 | 294.00094 |
| d2 | 15.55650 | 15.55650 | 15.55650 |
| d5 | 2.00494 | 36.17786 | 49.70524 |
| d12 | 29.70030 | 19.40726 | 2.00000 |
| B.f. | 51.85087 | 54.13440 | 80.85104 |
| | [Moving Amount upon Focusing] | | |
| f | 71.40015 | 134.90898 | 294.00094 |
| δ1B | 13.28566 | 13.56940 | 13.82723 |

[Values for Conditional Expressions]

(16) f1/fw = 1.743
(17) f2/fw = −0.414
(18) f3/fw = 0.506
(19) f32/f3 = −1.569

TABLE 14-continued

(20) f3/f33 = −0.048
(21) n31N − n31P = 0.304
(22) ν31P − ν32P = 46.57
(23) ν32N − ν32P = 14.16
(24) (r32R + r32F)/(r32R − r32F) = −1.469
(25) r32S/f32 = 0.703
(26) f1A/f1B = 2.756

Figure 54A:
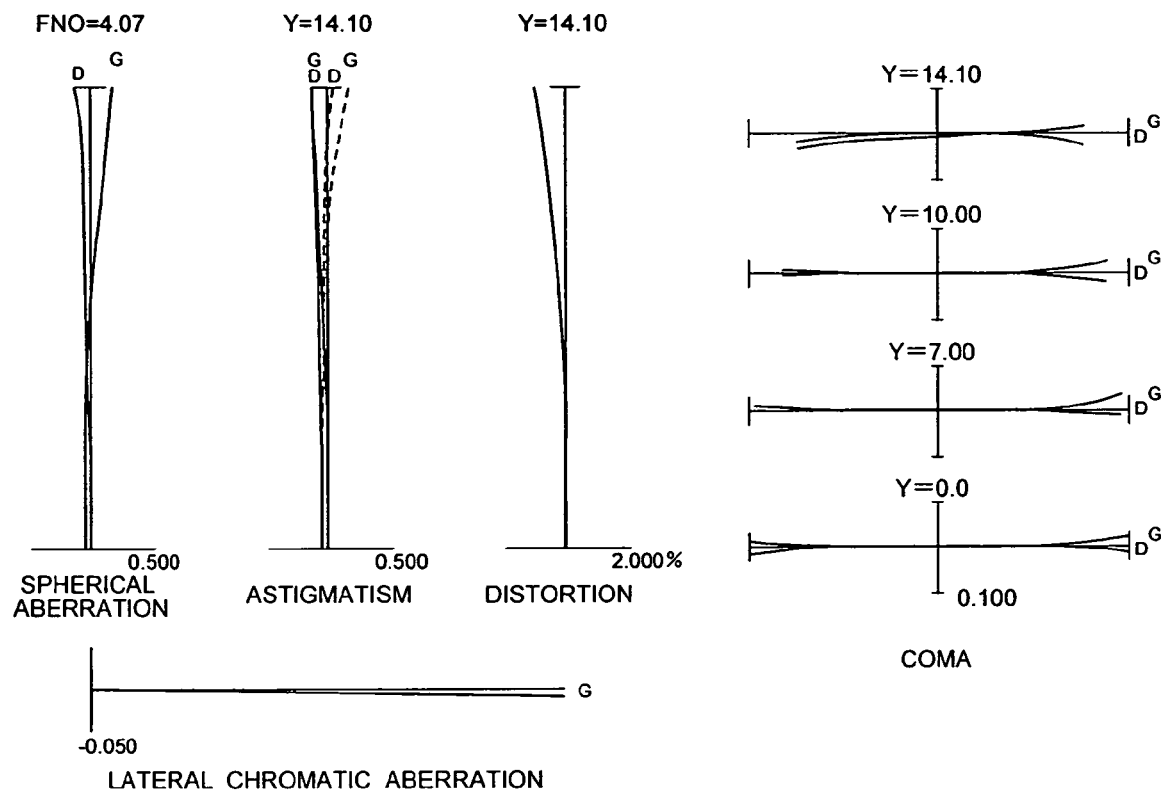
FIGS. 54A and 54B show various aberrations of the zoom lens system according to Example 14 of the third embodiment in a wide-angle end state upon focusing at infinity, and meridional lateral aberration at infinity when vibration reduction is carried out against rotation of 0.30°, respectively.
Figure 54B:
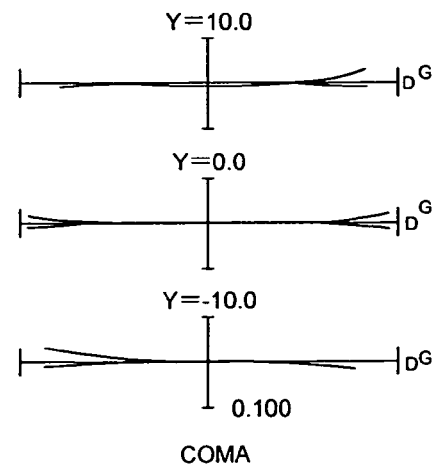
Figure 55:
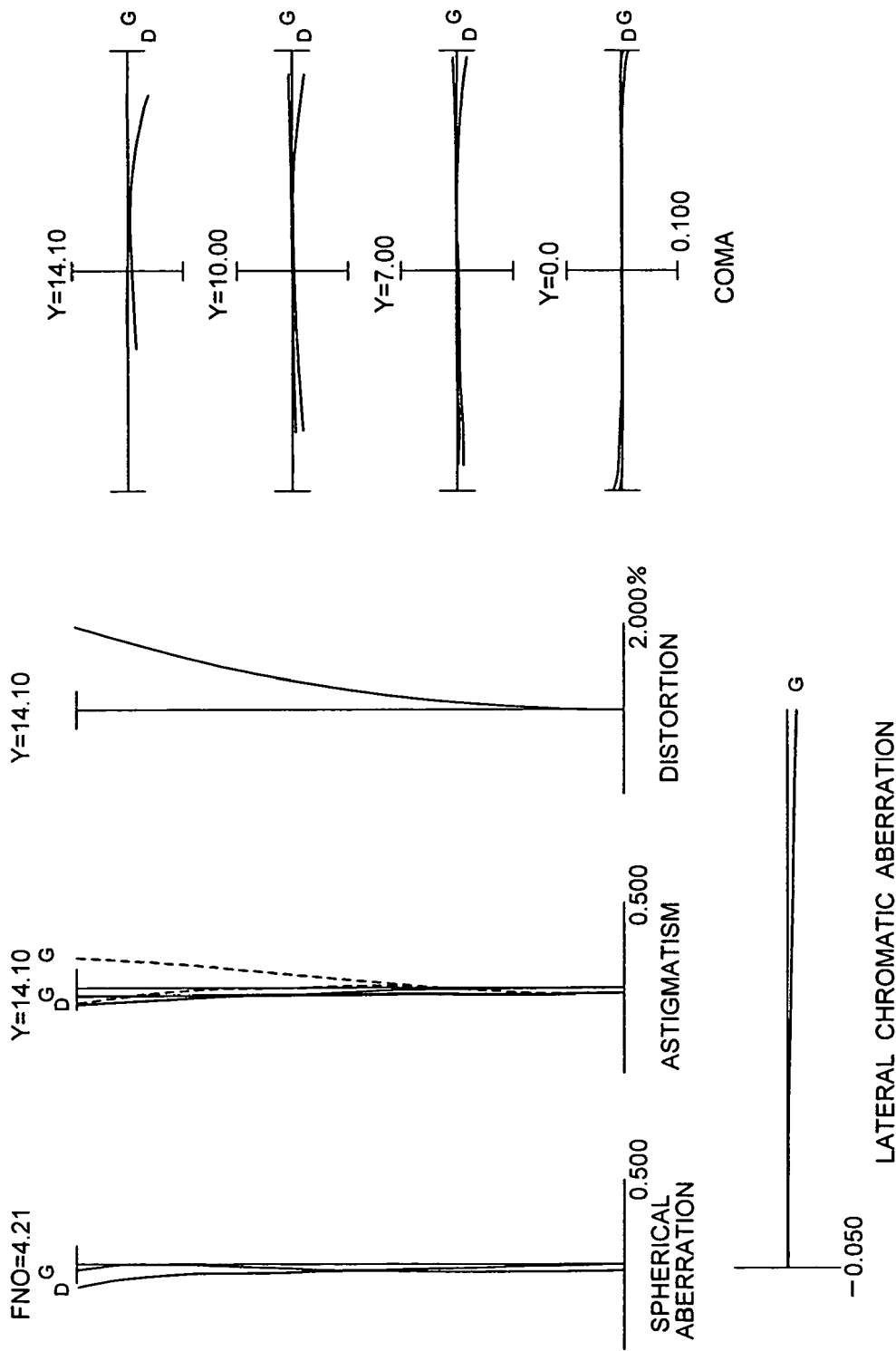
FIG. 55 shows various aberrations of the zoom lens system according to Example 14 of the third embodiment in an intermediate focal length state upon focusing at infinity.
Figure 56A:
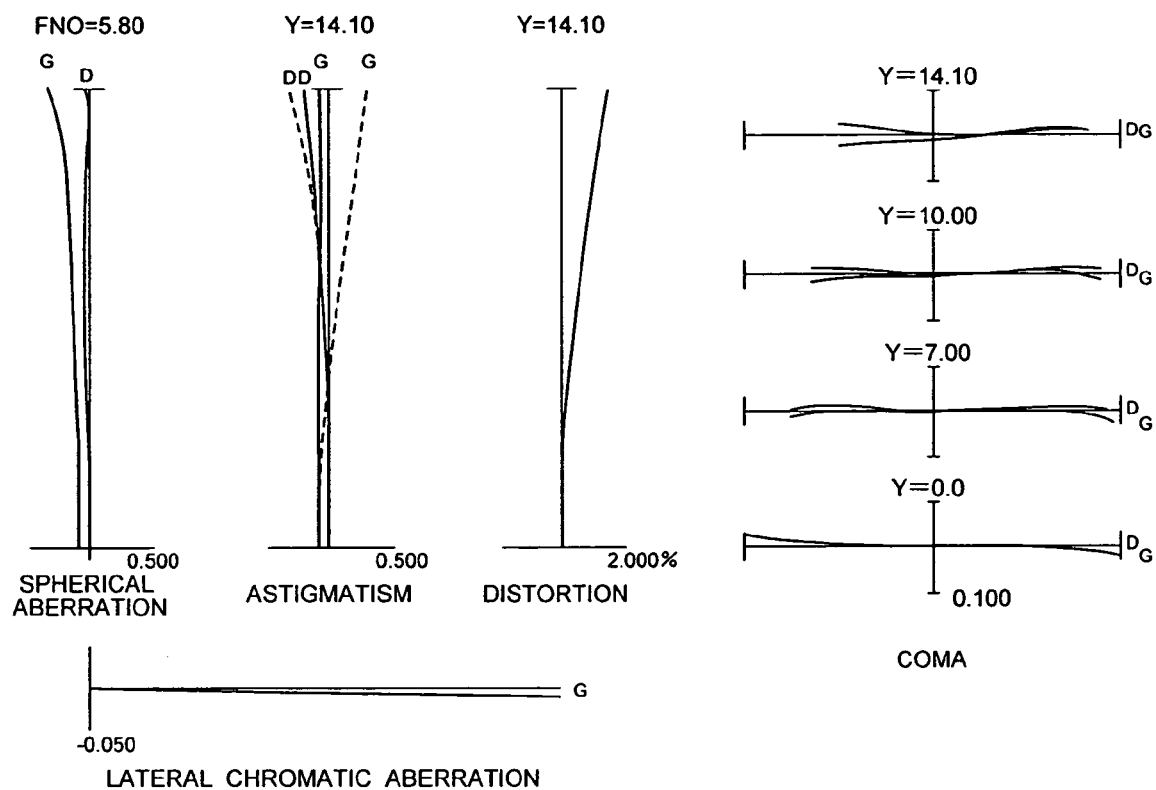
FIGS. 56A and 56B show various aberrations of the zoom lens system according to Example 14 of the third embodiment in a telephoto end state upon focusing at infinity, and meridional lateral aberration at infinity when vibration reduction is carried out against rotation of 0.15°, respectively.
Figure 56B:
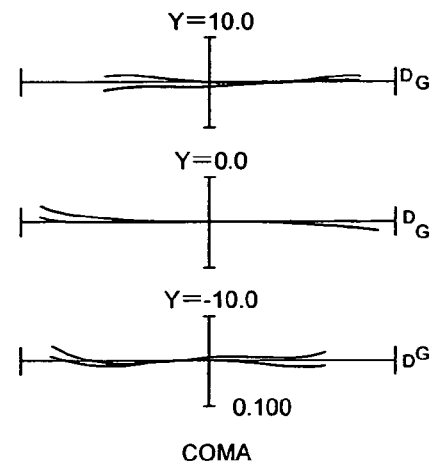

FIGS. 54A and 54B show various aberrations of the zoom lens system according to Example 14 of the third embodiment in a wide-angle end state upon focusing at infinity, and meridional lateral aberration at infinity when vibration reduction is carried out against rotation of 0.30°, respectively. FIG. 55 shows various aberrations of the zoom lens system according to Example 14 of the third embodiment in an intermediate focal length state upon focusing at infinity. FIGS. 56A and 56B show various aberrations of the zoom lens system according to Example 14 of the third embodiment in a telephoto end state upon focusing at infinity, and meridional lateral aberration at infinity when vibration reduction is carried out against rotation of 0.15°, respectively.

As is apparent from respective graphs, the zoom lens system according to Example 14 of the third embodiment shows superb optical performance correcting various aberrations.

EXAMPLE 15

Figure 57:
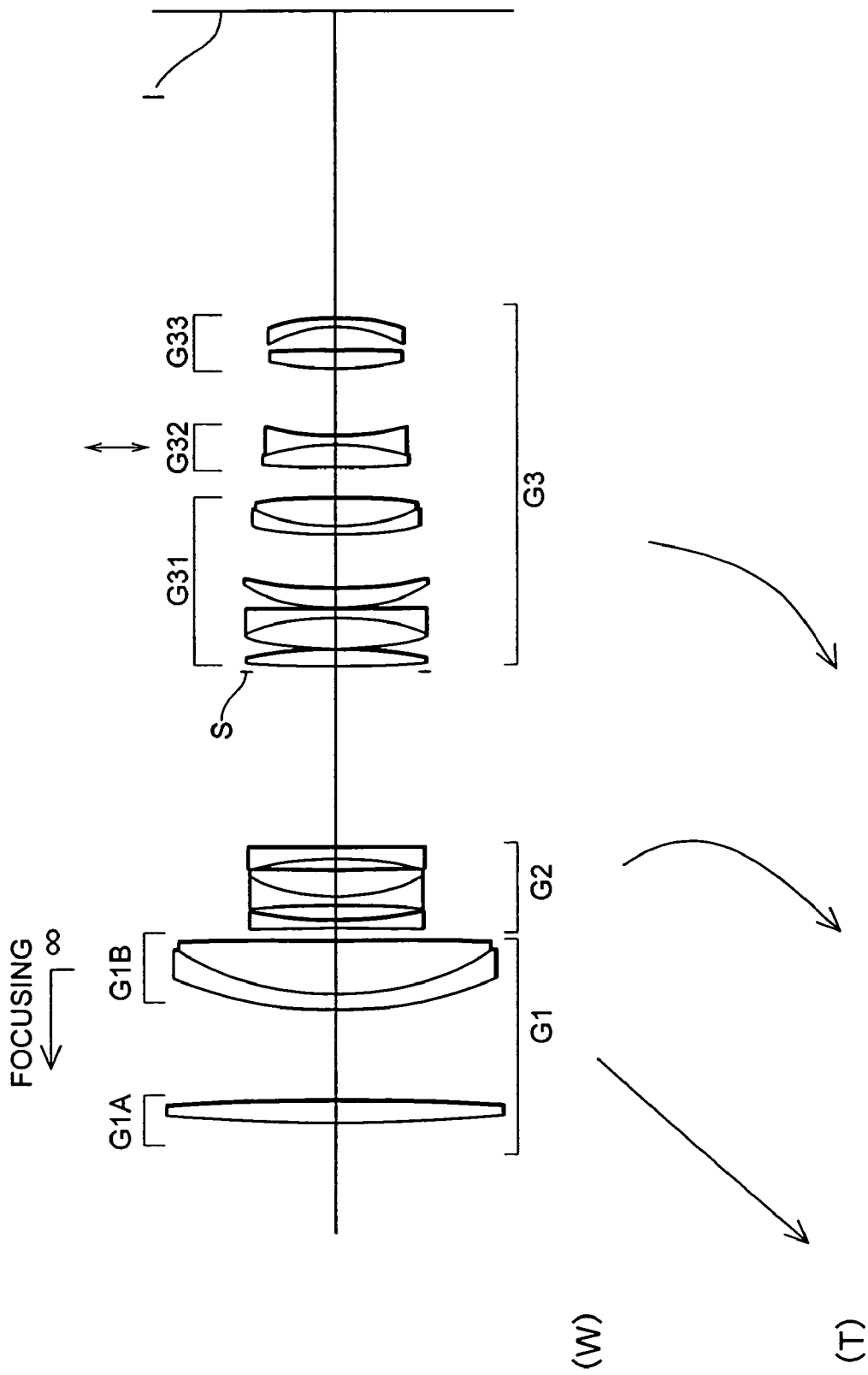
FIG. 57 is a diagram showing a sectional view of a zoom lens system according to Example 15 of the third embodiment of the present invention together with a trajectory of each lens group upon zooming.

FIG. 57 is a diagram showing a sectional view of a zoom lens system according to Example 15 of the third embodiment of the present invention together with a trajectory of each lens group upon zooming.

In FIG. 57, the zoom lens system with a vibration reduction mechanism is composed of, in order from an object, a first lens group G1 having positive refractive power, a second lens group G2 having negative refractive power, and a third lens group G3 having positive refractive power. When the state of lens group positions varies from a wide-angle end state (W) to a telephoto end state (T), the first lens group G1 and the third lens group G3 move to the object and the second lens group G2 moves once to the image I and, then, moves to the object such that a distance between the first lens group G1 and the second lens group G2 increases, and a distance between the second lens group G2 and the third lens group G3 decreases.

The first lens group G1 is composed of, in order from the object, a 1A lens group G1A having positive refractive power, and a 1B lens group G1B having positive refractive power. The 1A lens group G1A is composed of a double convex positive lens. The 1B lens group G1B is composed of, in order from the object, a cemented lens constructed by a negative meniscus lens having a convex surface facing to the object cemented with a double convex positive lens.

The second lens group G2 is composed of, in order from the object, a double concave negative lens, a cemented lens constructed by a double concave negative lens cemented with a positive meniscus lens having a convex surface facing to the object, and a double concave negative lens.

The third lens group G3 is composed of, in order from the object, a 31 lens group G31 having positive refractive power, a 32 lens group G32 having negative refractive power, and a 33 lens group G33 having positive refractive power. The 31 lens group G31 is composed of, in order from the object, a double convex positive lens, a first cemented lens constructed by a double convex positive lens cemented with a negative meniscus lens, a positive meniscus lens having a convex surface facing to the object, and a second cemented lens constructed by a negative meniscus lens having a convex surface facing to the object cemented with a double convex positive lens. The 32 lens group G32 is composed of, in order from the object, a cemented lens constructed by a double convex positive lens cemented with a double concave negative lens. The 33 lens group G33 is composed of, in order from the object, a double convex positive lens and a negative meniscus lens having a concave surface facing to the object.

An aperture stop S is arranged to the object side of the 31 lens group G31, and is moved together with the third lens group G3 upon zooming from the wide-angle end state (W) to the telephoto end state (T).

Upon detecting a camera shake, vibration reduction on the image plane I is carried out by moving only the 32 lens group G32 perpendicular to the optical axis.

Focusing from infinity to a close-range object is carried out by moving the 1B lens group G1B to the object.

In the wide-angle end state (W) of Example 14 of the third embodiment, vibration reduction coefficient K is 1.16, and the focal length f is 71.40 (mm), so that the image rotation of 0.30° can be corrected by moving the 32 lens group G32 by the amount of 0.322 (mm). In the telephoto end state (T), vibration reduction coefficient K is 1.75, and the focal length f is 294.00 (mm), so that the image rotation of 0.15° can be corrected by moving the 32 lens group G32 by the amount of 0.440 (mm).

Various values associated with Example 15 of the third embodiment of the present invention is listed in Table 15.

TABLE 15

[Specifications]

| f = | 71.40 | 134.90 | 294.00 |
|---|---|---|---|
| FNO = | 4.05 | 4.29 | 5.70 |
| 2ω = | 22.57° | 11.76° | 5.44° |

[Lens Data]

| | r | d | ν | n |
|---|---|---|---|---|
| 1 | 381.8649 | 3.2698 | 64.14 | 1.516330 |
| 2 | −381.8649 | (d2) | | |
| 3 | 71.5714 | 2.5000 | 26.52 | 1.761821 |
| 4 | 49.9993 | 8.2004 | 81.54 | 1.496999 |
| 5 | −1251.0960 | (d5) | | |
| 6 | −459.6483 | 1.4000 | 49.60 | 1.772499 |
| 7 | 73.4579 | 2.3256 | | |
| 8 | −148.2025 | 1.4000 | 49.60 | 1.772499 |
| 9 | 30.9506 | 4.0346 | 23.78 | 1.846660 |
| 10 | 507.9596 | 2.1322 | | |
| 11 | −53.4502 | 1.4000 | 49.60 | 1.772499 |
| 12 | 745.1895 | (d12) | | |
| 13 | ∞ | 1.0000 | Aperture Stop S | |
| 14 | 299.4180 | 2.5704 | 52.64 | 1.740999 |
| 15 | −74.3861 | 0.2000 | | |
| 16 | 58.6516 | 5.0344 | 81.54 | 1.496999 |
| 17 | −40.9400 | 1.4000 | 34.97 | 1.800999 |
| 18 | −586.8839 | 0.2000 | | |
| 19 | 32.9311 | 3.0580 | 60.64 | 1.603112 |
| 20 | 86.6358 | 8.7020 | | |
| 21 | 66.7204 | 1.3000 | 23.78 | 1.846660 |
| 22 | 34.9761 | 4.3431 | 70.23 | 1.487490 |
| 23 | −113.9382 | 5.0000 | | |
| 24 | 249.3959 | 3.6484 | 25.42 | 1.805181 |
| 25 | −36.8058 | 1.2000 | 39.58 | 1.804398 |
| 26 | 39.1458 | 10.9499 | | |
| 27 | 57.2414 | 2.6768 | 31.07 | 1.688931 |
| 28 | −326.2393 | 3.9442 | | |
| 29 | −22.0804 | 1.2000 | 49.60 | 1.772499 |

TABLE 15-continued

| 30 | −37.9653 | (B.f.) | |
|---|---|---|---|
| | Wide-angle end | Intermediate | Telephoto end |

[Variable Distances]
(Infinity)

| f | 71.40016 | 134.90320 | 294.00205 |
|---|---|---|---|
| d2 | 14.63133 | 14.63133 | 14.63133 |
| d5 | 2.00000 | 33.48260 | 46.17223 |
| d12 | 28.49089 | 17.74860 | 0.31866 |
| B.f. | 48.78816 | 52.49212 | 81.78883 |

[Moving Amount upon Focusing]

| f | 71.40016 | 134.90320 | 294.00205 |
|---|---|---|---|
| δ1B | 12.86620 | 13.12031 | 13.38598 |

[Values for Conditional Expressions]

(16) f1/fw = 1.693
(17) f2/fw = −0.410
(18) f3/fw = 0.522
(19) f32/f3 = −1.566
(20) f3/f33 = 0.030
(21) n31N − n31P = 0.304
(22) ν31P − ν31N = 46.57
(23) ν32N − ν32P = 14.16
(24) (r32R + r32F)/(r32R − r32F) = −1.372
(25) r32S/f32 = 0.619
(26) f1A/f1B = 2.151

Figure 58A:
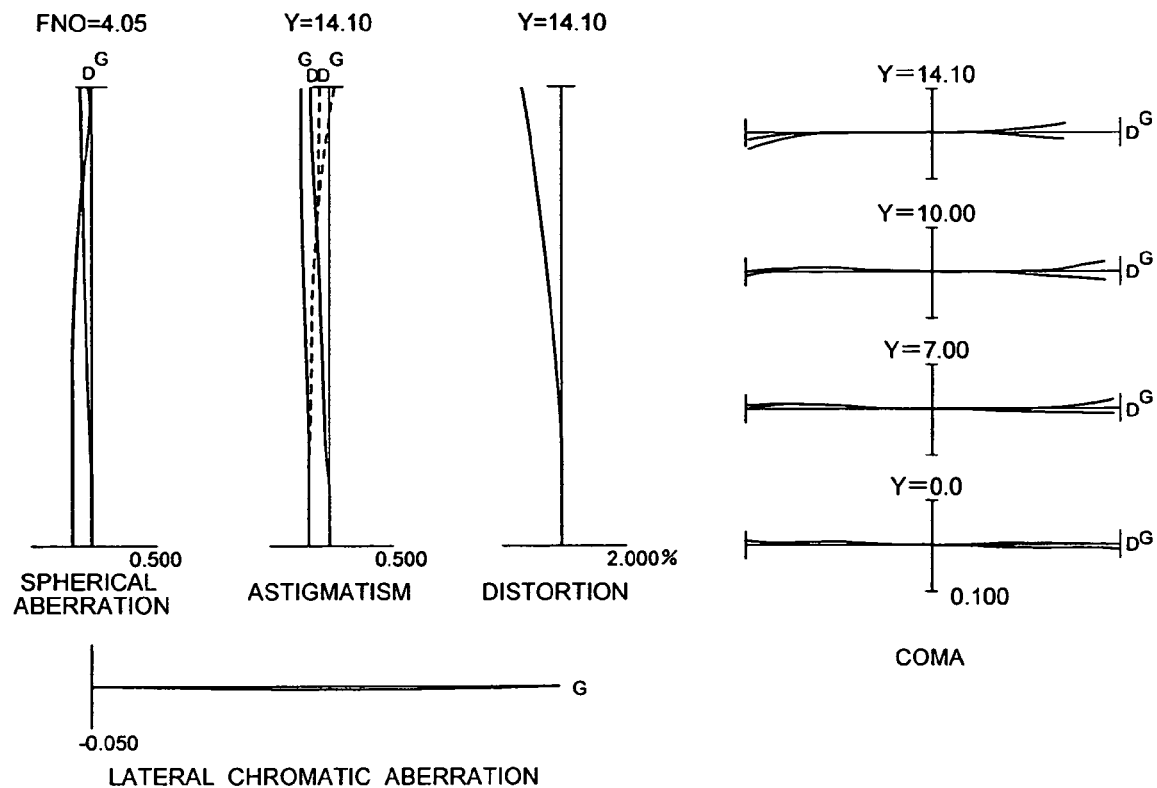
FIGS. 58A and 58B show various aberrations of the zoom lens system according to Example 15 of the third embodiment in a wide-angle end state upon focusing at infinity, and meridional lateral aberration at infinity when vibration reduction is carried out against rotation of 0.30°, respectively.
Figure 58B:
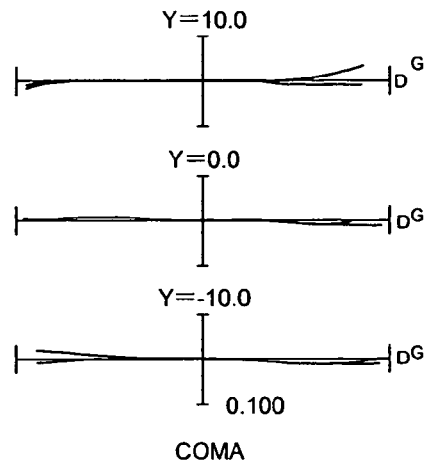
Figure 59:
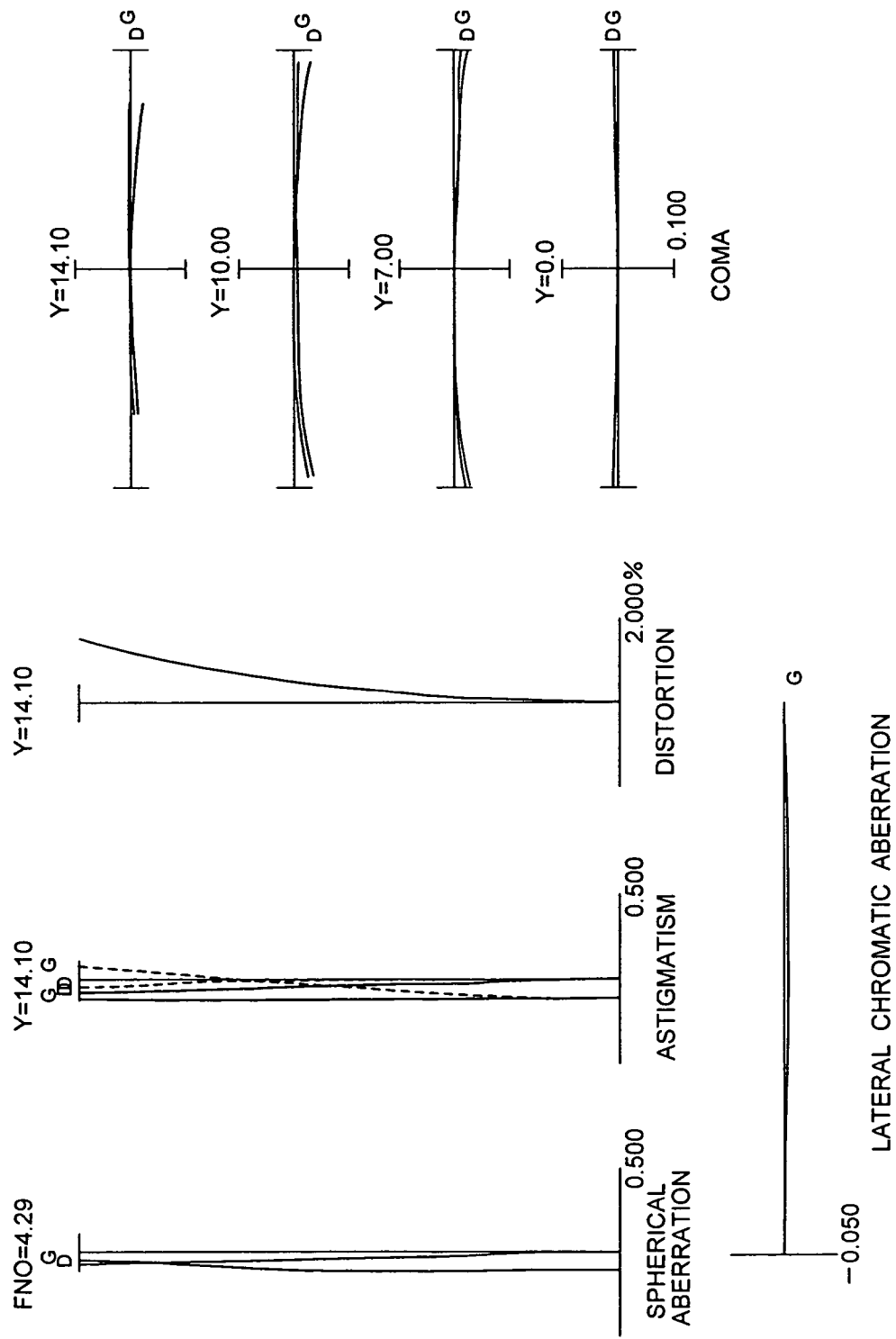
FIG. 59 shows various aberrations of the zoom lens system according to Example 15 of the third embodiment in an intermediate focal length state upon focusing at infinity.
Figure 60A:
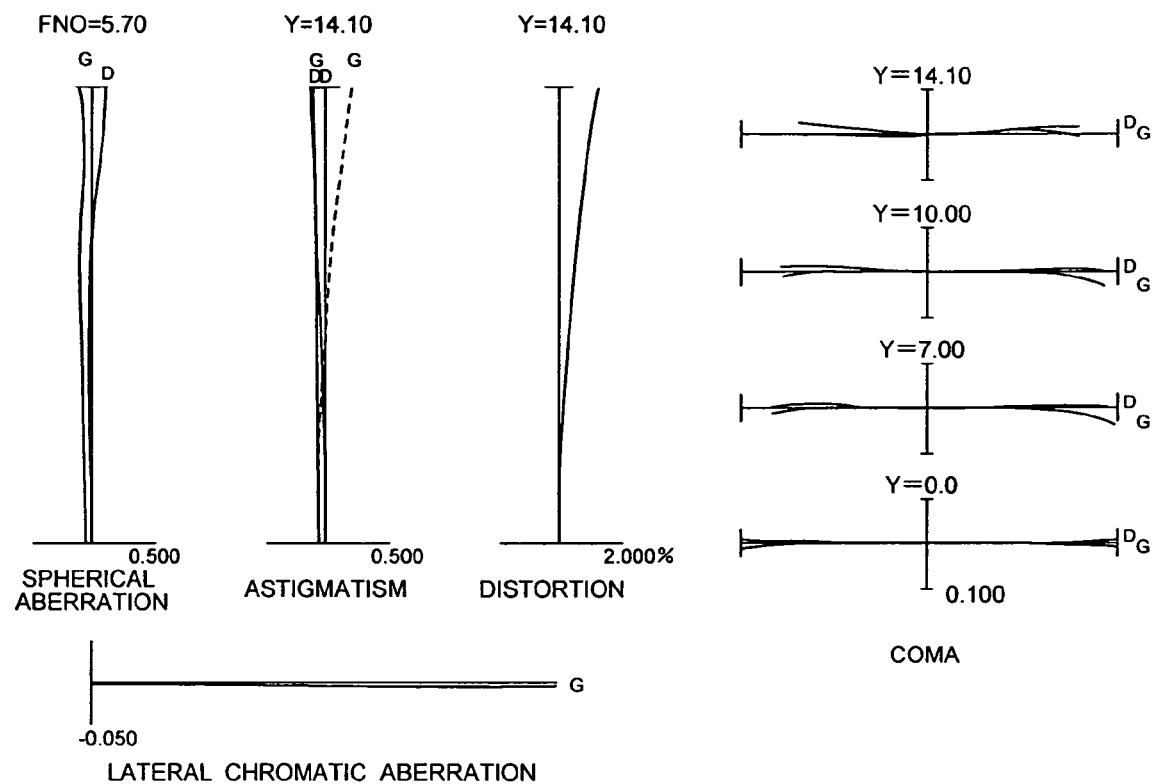
FIGS. 60A and 60B show various aberrations of the zoom lens system according to Example 15 of the third embodiment in a telephoto end state upon focusing at infinity, and meridional lateral aberration at infinity when vibration reduction is carried out against rotation of 0.15°, respectively.
Figure 60B:
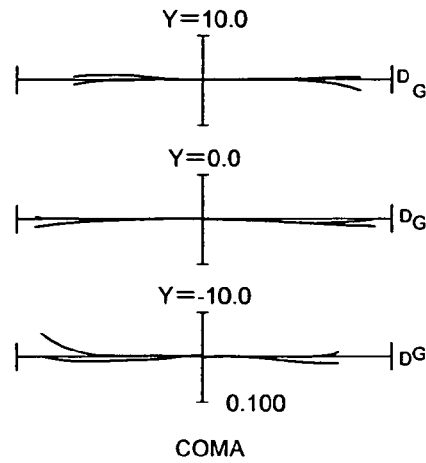

FIGS. 58A and 58B show various aberrations of the zoom lens system according to Example 15 of the third embodiment in a wide-angle end state upon focusing at infinity, and meridional lateral aberration at infinity when vibration reduction is carried out against rotation of 0.30°, respectively. FIG. 59 shows various aberrations of the zoom lens system according to Example 15 of the third embodiment in an intermediate focal length state upon focusing at infinity. FIGS. 60A and 60B show various aberrations of the zoom lens system according to Example 15 of the third embodiment in a telephoto end state upon focusing at infinity, and meridional lateral aberration at infinity when vibration reduction is carried out against rotation of 0.150°, respectively.

As is apparent from respective graphs, the zoom lens system according to Example 15 of the third embodiment shows superb optical performance correcting various aberrations.

EXAMPLE 16

FIG. 61 is a diagram showing a sectional view of a zoom lens system according to Example 16 of the third embodiment of the present invention together with a trajectory of each lens group upon zooming.

In FIG. 61, the zoom lens system with a vibration reduction mechanism is composed of, in order from an object, a first lens group G1 having positive refractive power, a second lens group G2 having negative refractive power, and a third lens group G3 having positive refractive power. When the state of lens group positions varies from a wide-angle end state (W) to a telephoto end state (T), the first lens group G1 and the third lens group G3 move to the object and the second lens group G2 moves once to the image I and, then, moves to the object such that a distance between the first lens group G1 and the second lens group G2 increases, and a distance between the second lens group G2 and the third lens group G3 decreases.

The first lens group G1 is composed of, in order from the object, a 1A lens group G1A having positive refractive power, and a 1B lens group G1B having positive refractive power. The 1A lens group G1A is composed of a double convex positive lens. The 1B lens group G1B is composed of, in order from the object, a cemented lens constructed by a negative meniscus lens having a convex surface facing to the object cemented with a double convex positive lens.

The second lens group G2 is composed of, in order from the object, a double concave negative lens, a cemented lens constructed by a double concave negative lens cemented with a positive meniscus lens having a convex surface facing to the object, and a double concave negative lens.

The third lens group G3 is composed of, in order from the object, a 31 lens group G31 having positive refractive power, a 32 lens group G32 having negative refractive power, and a 33 lens group G33 having positive refractive power. The 31 lens group G31 is composed of, in order from the object, a double convex positive lens, a first cemented lens constructed by a double convex positive lens cemented with a negative meniscus lens, a positive meniscus lens having a convex surface facing to the object, and a second cemented lens constructed by a negative meniscus lens having a convex surface facing to the object cemented with a double convex positive lens. The 32 lens group G32 is composed of, in order from the object, a cemented lens constructed by a double convex positive lens cemented with a double concave negative lens. The 33 lens group G33 is composed of, in order from the object, a fixed stop S2, a double convex positive lens and a negative meniscus lens having a concave surface facing to the object.

An aperture stop S is arranged to the object side of the 31 lens group G31, and is moved together with the third lens group G3 upon zooming from the wide-angle end state (W) to the telephoto end state (T).

Upon detecting a camera shake, vibration reduction on the image plane I is carried out by moving only the 32 lens group G32 perpendicular to the optical axis.

Focusing from infinity to a close-range object is carried out by moving the 1B lens group G1B to the object.

In the wide-angle end state (W) of Example 14 of the third embodiment, vibration reduction coefficient K is 1.25, and the focal length f is 71.40 (mm), so that the image rotation of 0.30° can be corrected by moving the 32 lens group G32 by the amount of 0.299 (mm). In the telephoto end state (T), vibration reduction coefficient K is 1.90, and the focal length f is 294.00 (mm), so that the image rotation of 0.15° can be corrected by moving the 32 lens group G32 by the amount of 0.405 (mm).

Various values associated with Example 16 of the third embodiment of the present invention is listed in Table 16.

TABLE 16

[Specifications]

| f = | 71.40 | 135.00 | 294.00 |
|---|---|---|---|
| FNO = | 4.05 | 4.29 | 5.70 |
| 2ω = | 22.57° | 11.76° | 5.44° |

[Lens Data]

| | r | d | ν | n |
|---|---|---|---|---|
| 1 | 340.6588 | 4.2 | 64.14 | 1.51633 |
| 2 | −340.659 | (d2) | | |
| 3 | 65.1639 | 1.8 | 26.3 | 1.784696 |
| 4 | 45.8381 | 8.8 | 81.61 | 1.496999 |
| 5 | −1308.92 | (d5) | | |

TABLE 16-continued

| 6 | −271.25 | 1.4 | 49.61 | 1.772499 |
|---|---|---|---|---|
| 7 | 71.7854 | 1.3 | | |
| 8 | −566.934 | 1.4 | 49.61 | 1.772499 |
| 9 | 24.4437 | 4.7 | 23.78 | 1.84666 |
| 10 | 133.0962 | 3.75 | | |
| 11 | −46.0918 | 1.4 | 49.61 | 1.772499 |
| 12 | 1927.614 | (d12) | | |
| 13 | ∞ | 2 | | Aperture Stop S |
| 14 | 188.6747 | 3.4 | 60.09 | 1.639999 |
| 15 | −72.245 | 0.2 | | |
| 16 | 73.7218 | 6 | 81.61 | 1.496999 |
| 17 | −38.1983 | 1.4 | 34.96 | 1.800999 |
| 18 | −154.661 | 0.2 | | |
| 19 | 32.255 | 4.2 | 52.42 | 1.517417 |
| 20 | 143.854 | 7.9 | | |
| 21 | 333.5741 | 1.3 | 23.78 | 1.84666 |
| 22 | 54.3293 | 4.1 | 70.24 | 1.48749 |
| 23 | −89.5707 | 10.2 | | |
| 24 | 256.9205 | 3.6 | 25.43 | 1.805181 |
| 25 | −35.5686 | 1.2 | 39.59 | 1.804398 |
| 26 | 35.5686 | 3.4 | | |
| 27 | ∞ | 3.1 | | Fixed Stop S2 |
| 28 | 47.0802 | 4 | 34.47 | 1.639799 |
| 29 | −96.8946 | 2.4 | | |
| 30 | −23.3234 | 1.2 | 49.61 | 1.772499 |
| 31 | −42.5579 | (B.f.) | | |

| | Wide-angle end | Intermediate | Telephoto end |
|---|---|---|---|
| | [Variable Distances] (Infinity) | | |
| f | 71.39993 | 134.99982 | 294.00047 |
| d2 | 13.43865 | 13.43865 | 13.43865 |
| d5 | 2.49989 | 31.01849 | 43.01129 |
| d12 | 28.21141 | 18.59271 | 2.50011 |
| B.f. | 53.40008 | 57.30852 | 87.10064 |
| | [Moving Amount upon Focusing] | | |
| f | 71.39991 | 134.99979 | 294.00046 |
| δ1B | 11.08175 | 11.28593 | 11.5251 |

[Values for Conditional Expression]

(16) f1/fw = 1.563
(17) f2/fw = −0.368
(18) f3/fw = 0.525
(19) f32/f3 = −1.384
(20) f3/f33 = 0.238
(21) n31N − n31P = 0.304
(22) ν31P − ν31N = 46.57
(23) ν32N − ν32P = 14.16
(24) (r32R + r32F)/(r32R − r32F) = −1.321
(25) r32S/f32 = 0.685
(26) f1A/f1B = 2.051

Figure 62A:
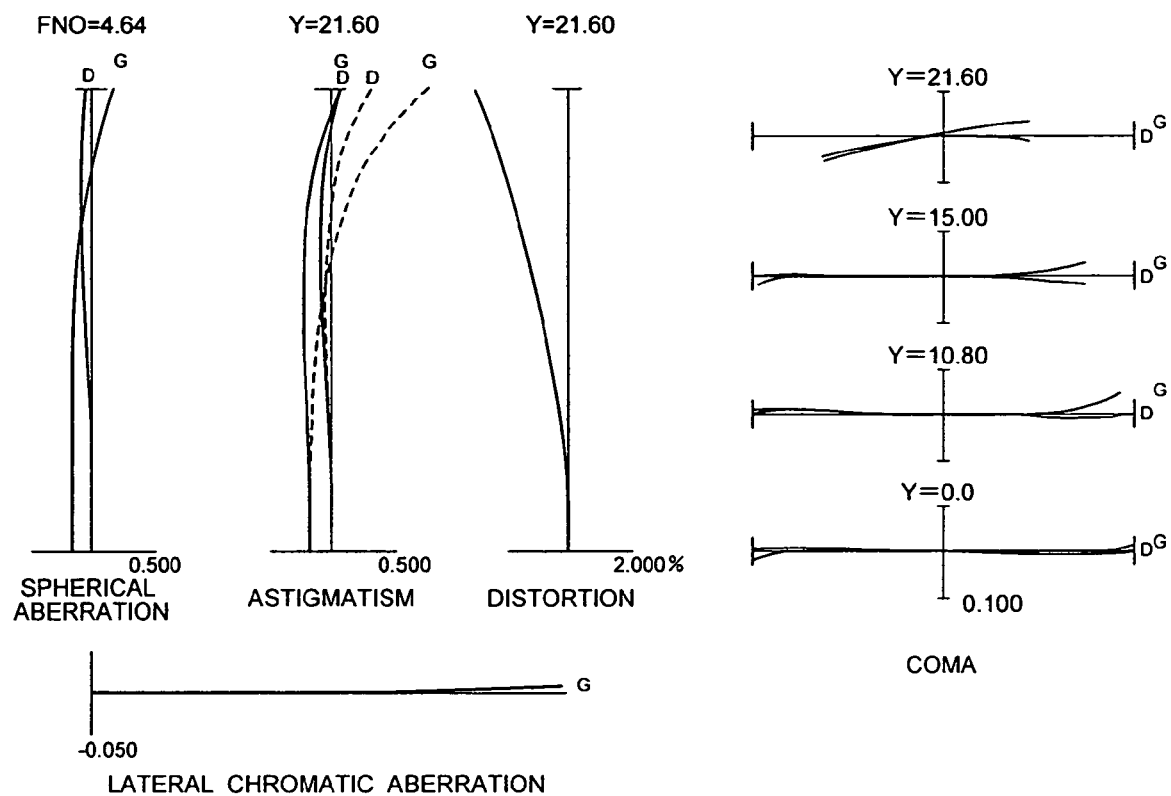
FIGS. 62A and 62B show various aberrations of the zoom lens system according to Example 16 of the third embodiment in a wide-angle end state upon focusing at infinity, and meridional lateral aberration at infinity when vibration reduction is carried out against rotation of 0.30°, respectively.
Figure 62B:
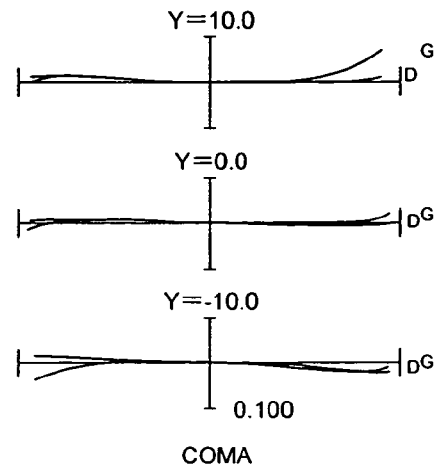
Figure 63:
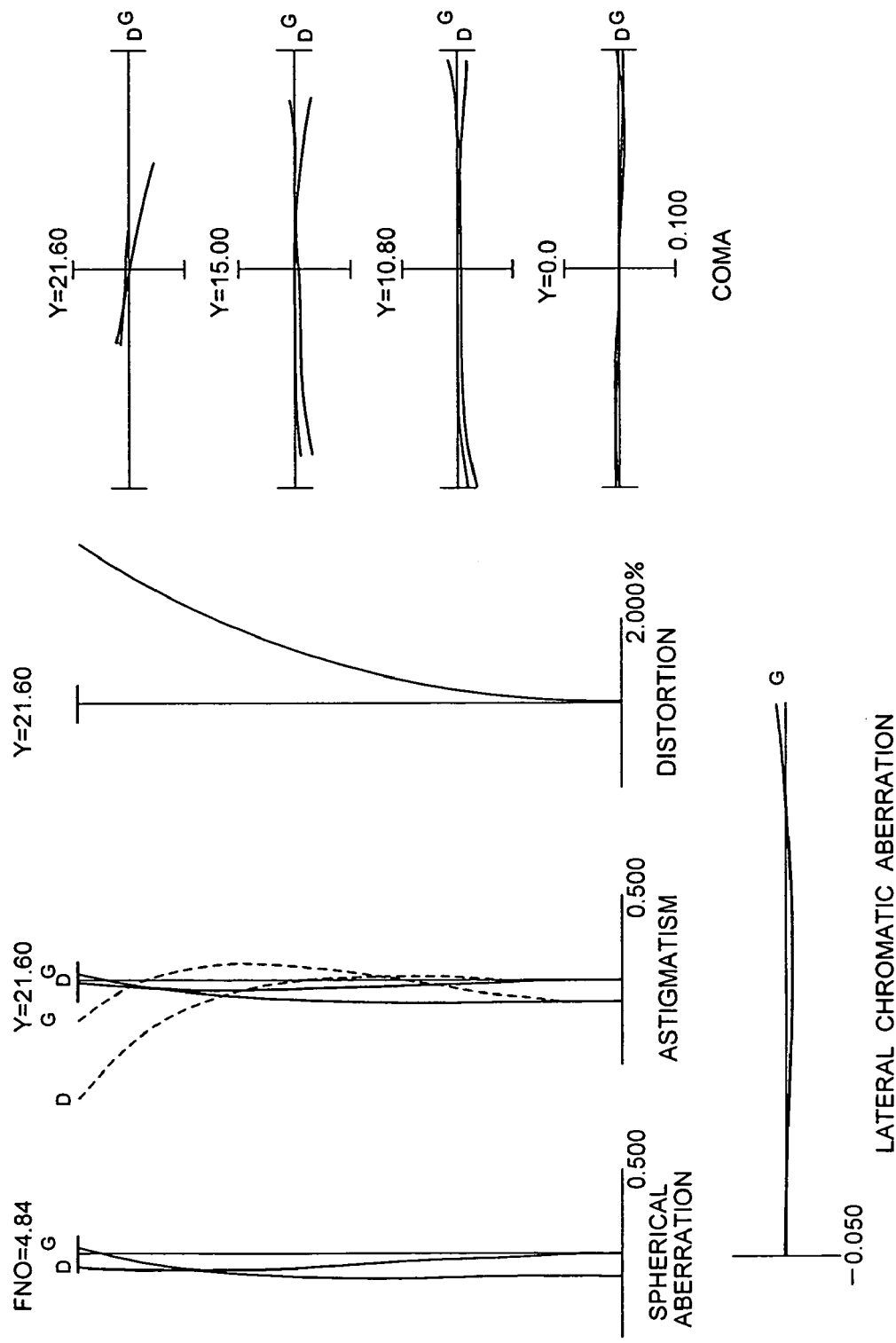
FIG. 63 shows various aberrations of the zoom lens system according to Example 16 of the third embodiment in an intermediate focal length state upon focusing at infinity.
Figure 64A:
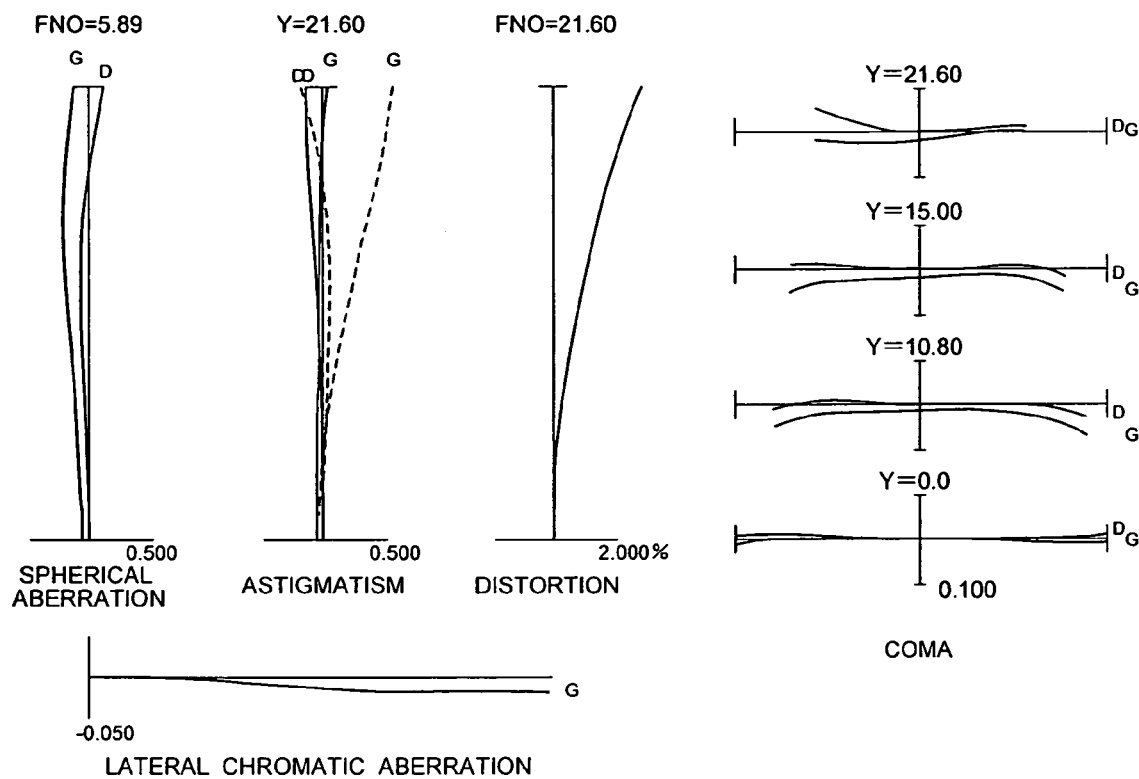
FIGS. 64A and 64B show various aberrations of the zoom lens system according to Example 16 of the third embodiment in a telephoto end state upon focusing at infinity, and meridional lateral aberration at infinity when vibration reduction is carried out against rotation of 0.15°, respectively.
Figure 64B:
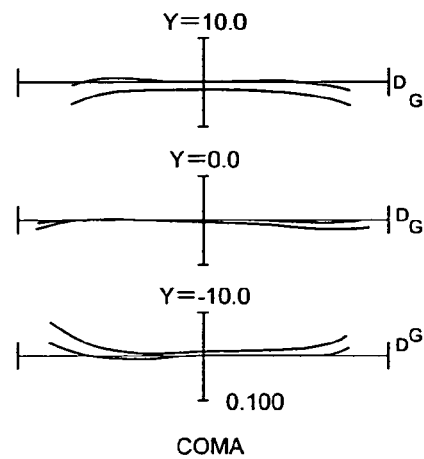

FIGS. 62A and 62B show various aberrations of the zoom lens system according to Example 16 of the third embodiment in a wide-angle end state upon focusing at infinity, and meridional lateral aberration at infinity when vibration reduction is carried out against rotation of 0.30°, respectively. FIG. 63 shows various aberrations of the zoom lens system according to Example 16 of the third embodiment in an intermediate focal length state upon focusing at infinity. FIGS. 64A and 64B show various aberrations of the zoom lens system according to Example 16 of the third embodiment in a telephoto end state upon focusing at infinity, and meridional lateral aberration at infinity when vibration reduction is carried out against rotation of 0.15°, respectively.

As is apparent from respective graphs, the zoom lens system according to Example 16 of the third embodiment shows superb optical performance correcting various aberrations.

In examples of the third embodiment, although three-group-type zoom lens systems have been proposed, it is needless to say that a zoom lens system merely adding a lens group to the three-group type zoom system is within the scope of the present invention. Moreover, in the construction of each lens group, it is needless to say that a zoom lens system merely adding a lens element to any one of lens groups of the zoom lens system according to the third embodiment is within the scope of the present invention.

Additional advantages and modification will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
   a first lens group having positive refractive power;
   a second lens group having negative refractive power; and
   a third lens group having positive refractive power,
   when a state of the zoom lens system varies from a wide-angle end state to a telephoto end state, a distance between the first lens group and the second lens group increasing, and a distance between the second lens group and the third lens group decreasing,
   the first lens group being composed of, in order from the object, a 1A lens group having positive refractive power, and a 1B lens group having positive refractive power,
   focusing from infinity to a close-range object being carried out by moving only the 1B lens group to the object, and
   the following conditional expressions being satisfied:

$1.55 < f1/fw < 2.20$ $-0.55 < f2/fw < -0.30$ $2.0 < f1A/f1B < 4.0$ $0.16 < DAB/fw < 0.30$ where fw denotes the focal length of the zoom lens system in the wide-angle end state, f1 denotes the focal length of the first lens group, f2 denotes the focal length of the second lens group, f1A denotes the focal length of the 1A lens group, f1B denotes the focal length of the 1B lens group, and DAB denotes the distance between the 1A lens group and the 1B lens group when the zoom lens system is focused infinity.

2. The zoom lens system according to claim 1, wherein when the state of lens group positions varies from the wide-angle end state to the telephoto end state, the first lens group and the third lens group move to the object.

3. The zoom lens system according to claim 2, further comprising a fourth lens group having negative refractive power to an image side of the third lens group, wherein when the state of lens group positions varies from the wide-angle end state to the telephoto end state, a distance between the third lens group and the fourth lens group varies, and the following conditional expressions are satisfied:

$0.35 < f3/fw < 0.70$ $-1.50 < f4/fw < -0.70$ $-0.10 < (D34w - D34t)/fw < 0.10$ where f3 denotes the focal length of the third lens group, f4 denotes the focal length of the fourth lens group, D34w denotes the distance between the third lens group and the fourth lens group in the wide-angle end state, and D34t denotes the distance between the third lens group and the fourth lens group in the telephoto end state.

4. The zoom lens system according to claim 3, wherein the 1A lens group is composed of only one positive lens, the 1B lens group is composed of, in order from the object, a negative meniscus lens having a convex surface facing to the object, and a positive lens having a convex surface facing to the object, and the following conditional expressions are satisfied:

$50 < v1A$ $35 < v1BP - v1BN$ where v1A denotes Abbe number of the positive lens in the 1A lens group at d-line ($\lambda = 587.6$ nm), v1BP denotes Abbe number of the positive lens in the 1B lens group G1B at d-line, and v1BN denotes Abbe number of the negative meniscus lens in the 1B lens group G1B at d-line.

5. The zoom lens system according to claim 2, wherein the 1A lens group is composed of only one positive lens, the 1B lens group is composed of, in order from the object, a negative meniscus lens having a convex surface facing to the object, and a positive lens having a convex surface facing to the object, and the following conditional expressions are satisfied:

$50 < v1A$ $35 < v1BP - v1BN$ where v1A denotes Abbe number of the positive lens in the 1A lens group at d-line ($\lambda = 587.6$ nm), v1BP denotes Abbe number of the positive lens in the 1B lens group G1B at d-line, and v1BN denotes Abbe number of the negative meniscus lens in the 1B lens group G1B at d-line.

6. The zoom lens system according to claim 1, further comprising a fourth lens group having negative refractive power to an image side of the third lens group, wherein when the state of lens group positions varies from the wide-angle end state to the telephoto end state, a distance between the third lens group and the fourth lens group varies, and the following conditional expressions are satisfied:

$0.35 < f3/fw < 0.70$ $-1.50 < f4/fw < -0.70$ $-0.10 < (D34w - D34t)/fw < 0.10$ where f3 denotes the focal length of the third lens group, f4 denotes the focal length of the fourth lens group, D34w denotes the distance between the third lens group and the fourth lens group in the wide-angle end state, and D34t denotes the distance between the third lens group and the fourth lens group in the telephoto end state.

7. The zoom lens system according to claim 6, wherein the 1A lens group is composed of only one positive lens, the 1B lens group is composed of, in order from the object, a negative meniscus lens having a convex surface facing to the object, and a positive lens having a convex surface facing to the object, and the following conditional expressions are satisfied:

$50 < v1A$ $35 < v1BP - v1BN$ where ν1A denotes Abbe number of the positive lens in the 1A lens group at d-line (λ=587.6 nm), ν1BP denotes Abbe number of the positive lens in the 1B lens group G1B at d-line, and ν1BN denotes Abbe number of the negative meniscus lens in the 1B lens group G1B at d-line.

8. The zoom lens system according to claim 1, wherein the 1A lens group is composed of only one positive lens, the 1B lens group is composed of, in order from the object, a negative meniscus lens having a convex surface facing to the object, and a positive lens having a convex surface facing to the object, and the following conditional expressions are satisfied:

$50 < \nu 1A$ $35 < \nu 1BP - \nu 1BN$ where ν1A denotes Abbe number of the positive lens in the 1A lens group at d-line (λ=587.6 nm), ν1BP denotes Abbe number of the positive lens in the 1B lens group G1B at d-line, and ν1BN denotes Abbe number of the negative meniscus lens in the 1B lens group G1B at d-line.

9. The zoom lens system according to claim 8, wherein the negative meniscus lens and the positive lens in the 1B lens group are cemented with each other.

10. A method for forming an image of an object and varying a focal length, comprising:
providing a zoom lens system that includes, in order from the object, a first lens group having positive refractive power, a second lens group having negative refractive power, and a third lens group having positive refractive power, the first lens group including, in order from the object, a 1A lens group having positive refractive power and a 1B lens group having positive refractive power;
varying the focal length by increasing a distance between the first lens group and the second lens group, and decreasing a distance between the second lens group and the third lens group, when the state of the zoom lens system varies from a wide-angle end state to a telephoto end state;
moving only the 1B lens group to the object to carry out focusing from infinity to a close-range object,
wherein the following conditional expressions are satisfied:

$1.55 < f1/fw < 2.20$ $-0.55 < f2/fw < -0.30$ $2.0 < f1A/f1B < 4.0$ $0.16 < DAB/fw < 0.30$ where fw denotes the focal length of the zoom lens system in the wide-angle end state, f1 denotes the focal length of the first lens group, f2 denotes the focal length of the second lens group, f1A denotes the focal length of the 1A lens group, f1B denotes the focal length of the 1B lens group, and DAB denotes the distance between the 1A lens group and the 1B lens group when the zoom lens system is focused on infinity.

11. The method according to claim 10,
wherein the first lens group and the third lens group are moved to the object, when the state of the zoom lens system varies from the wide-angle end state to the telephoto end state.

12. The method according to claim 10,
wherein the zoom lens system further includes a fourth lens group having negative refractive power to an image side of the third lens group,
wherein when the state of the zoom lens system varies from the wide-angle end state to the telephoto end state, a distance between the third lens group and the fourth lens group varies, and
wherein the following conditional expressions are satisfied:

$0.35 < f3/fw < 2.70$ $-1.50 < f4/fw < -0.70$ $-0.10 < (D34w - D34t)/fw < 0.10$ where f3 denotes the focal length of the third lens group, f4 denotes the focal length of the fourth lens group, D34w denotes the distance between the third lens group and the fourth lens group in the wide-angle end state, and D34t denotes the distance between the third lens group and the fourth lens group in the telephoto end state.

13. The method according to claim 10,
wherein the 1A lens group is composed only of one positive lens, and the 1B lens group is composed of, in order from the object, a negative meniscus lens having a convex surface facing the object and a positive lens having a convex surface facing the object, and
wherein the following conditional expressions are satisfied:

$50 < \nu 1A$ $35 < \nu 1BP - \nu 1BN$ where ν1A denotes Abbe number of the positive lens in the 1A lens group at d-line (λ=587.6 nm), ν1BP denotes Abbe number of the positive lens in the 1B lens group G1B at d-line, and ν1BN denotes Abbe number of the negative meniscus lens in the 1B lens group G1B at d-line.

* * * * *